DIRECT ACCESS MAGNETIC DISC STORAGE DEVICE

Original Filed Dec. 24, 1954 35 Sheets-Sheet 1

INVENTORS.

WILLIAM A. GODDARD
JOHN J. LYNOTT
BY
John B. Sponsler
AGENT

March 24, 1970 W. A. GODDARD ET AL 3,503,060

DIRECT ACCESS MAGNETIC DISC STORAGE DEVICE

Original Filed Dec. 24, 1954 35 Sheets-Sheet 3

ADDRESS LOCATION

| DIGIT OF | FUNCTION | SELECTS |
|---|---|---|
| 1ST COLUMN | SECTOR SELECTION | ONE OF FOUR RECORDS |
| 2ND & 3RD COLUMNS | DISC SELECTION | ONE OF 32 DISCS |
| 3RD COLUMN. (LEAST SIGNIFICANT ONLY) | SIDE OF DISC | ONE SIDE OR OTHER SIDE |
| 4TH OR 5TH COLUMNS | TRACK SELECTION | TRACK "0" TO "99" INCL. |

X X X X X ( FIRST FIVE COLUMNS)

DIRECT ACCESS MAGNETIC DISC STORAGE DEVICE

Original Filed Dec. 24, 1954

DIRECT ACCESS MAGNETIC DISC STORAGE DEVICE

March 24, 1970 W. A. GODDARD ET AL 3,503,060

DIRECT ACCESS MAGNETIC DISC STORAGE DEVICE

Original Filed Dec. 24, 1954 35 Sheets-Sheet 8

March 24, 1970 W. A. GODDARD ET AL 3,503,060

DIRECT ACCESS MAGNETIC DISC STORAGE DEVICE

Original Filed Dec. 24, 1954 35 Sheets-Sheet 12

March 24, 1970 W. A. GODDARD ET AL 3,503,060

DIRECT ACCESS MAGNETIC DISC STORAGE DEVICE

Original Filed Dec. 24, 1954 35 Sheets-Sheet 13

DIRECT ACCESS MAGNETIC DISC STORAGE DEVICE

DIRECT ACCESS MAGNETIC DISC STORAGE DEVICE

Original Filed Dec. 24, 1954 35 Sheets-Sheet 17

DIRECT ACCESS MAGNETIC DISC STORAGE DEVICE

March 24, 1970 W. A. GODDARD ET AL 3,503,060

DIRECT ACCESS MAGNETIC DISC STORAGE DEVICE

Original Filed Dec. 24, 1954 35 Sheets-Sheet 28

DIRECT ACCESS MAGNETIC DISC STORAGE DEVICE

Original Filed Dec. 24, 1954 35 Sheets-Sheet 30

March 24, 1970 W. A. GODDARD ET AL 3,503,060

DIRECT ACCESS MAGNETIC DISC STORAGE DEVICE

Original Filed Dec. 24, 1954 35 Sheets-Sheet 33

3,503,060

DIRECT ACCESS MAGNETIC DISC STORAGE DEVICE

William A. Goddard, 16133 Hillvale, Monte Sereno, Calif. 95030, and John J. Lynott, 38 Kimble, Los Gatos, Calif. 95030

Continuation of application Ser. No. 242,339, Nov. 1, 1962, which is a division of application Ser. No. 477,468, Dec. 24, 1954, now Patent No. 3,134,097. This application Sept. 16, 1968, Ser. No. 788,666
Int. Cl. G11b *5/58, 21/08, 21/20*
U.S. Cl. 340—174.1 25 Claims

ABSTRACT OF THE DISCLOSURE

A magnetic disc drive for positioning a magnetic transducer in cooperative relationship with a selected one of a plurality of concentric circular recording tracks of a magnetic surface of a disc in response to an externally supplied track address signal. A motor rotates the disc about an axis at a constant speed. A loading means resiliently urges the transducer into transducing relationship with said surface. A positioner responds to the track address signal for selectively positioning the transducer at the track designated by the track address signal by movement along a line extending radially of the axis and parallel to the magnetic surface of the disc.

This application is a continuation of application Ser. No. 242,339, filed Nov. 1, 1962, and now abandoned, said application being a division of application Ser. No. 477,468 filed Dec. 24, 1954, and now U.S. Patent No. 3,134,097.

This invention relates to random access accounting machines, and, more particularly, to magnetic recording machines capable of storing large quantities of data wherein direct access to each record of stored information can be obtained immediately.

It has been common practice in accounting machines to store data in magnetic recording tracks of rotating drums or in magnetic tapes; however, ordinarily such data can only be read out from storage in preselected sequence. In the present invention the memory component is able to refer at random directly to any storage location and quickly read out the information of that location under control of specific external addresses.

In the preferred embodiment of the invention herein described, a machine is provided having multiple access magnetic storage upon a plurality of magnetic discs for quickly reproducing into a perforated record card information recorded in a specific location of one of the discs where the read-out mechanism proceeds directly to the record selected without a systematic scan of all the discs.

Very briefly, the machine utilizes a rotating shaft upon which are mounted a plurality of magnetic discs spaced from one another sufficiently so that a magnetic transducer can be moved therebetween for coacting to record or to read data at a plurality of positions corresponding to predetermined circular tracks on each side of each disc. More than one transducer may coact with a specific track at a time so that the same data may be read out from the memory at different space locations and at different time intervals. For each transducer coacting with the discs there is provided an access mechanism responsive to address instructions to position its respective tranducer at the appropriate disc location upon a selected track. Each access is capable of placing its associated transducer upon any track of any disc regardless of whether or not another access has already placed its transducer upon the same track of the same disc.

The operation may be compared with the manner in which skilled operators select cards from a card file index. Essentially, the complete device consists of a magnetic storage unit including a plurality of rotatable magnetic discs, an input-output device comprising a printing punch capable not only of punching and printing record cards, but also of sensing perforated record cards, and control circuits.

The primary object of this invention is to provide a memory device of high storage capacity having rapid random access to any storage location.

It is a further object of this invention to provide a magnetic memory device utilizing multiple magnetic discs mounted on a common shaft wherein a single magnetic transducer may coact with more than one magnetic disc.

Another object of this invention is to provide a magnetic memory device utilizing a plurality of magnetic tracks wherein a single magnetic transducer may coact with more than one track.

Still a further object is to provide a magnetic storage device having a plurality of recording media wherein a magnetic transducer is positioned with respect to any one of the media in accordance with an analog voltage corresponding to the identity of the media.

It is another object of this invention to provide a magnetic memory device capable of multiple random access to stored data.

Another object of the invention is to provide a magnetic storage device wherein the magnetic transducers are continually movable from record to record.

It is a still further object of this invention to provide a magnetic memory having multiple recording heads independently capable of random access to stored data.

A further object is to provide a magnetic memory device having removable discs for dead storage.

Still another object of this invention is to provide a magnetic memory wherein the magnetic transducers for write-in and read-out of data are automatically moved to specific write-in- and read-out positions in response to address instructions.

Other objects of the invention will be pointed out in the following description and claims and illustrated in the accompanying drawings, which disclose, by way of example, the principle of the invention and the best mode which has been contemplated of applying that principle.

Figures 3, 4:
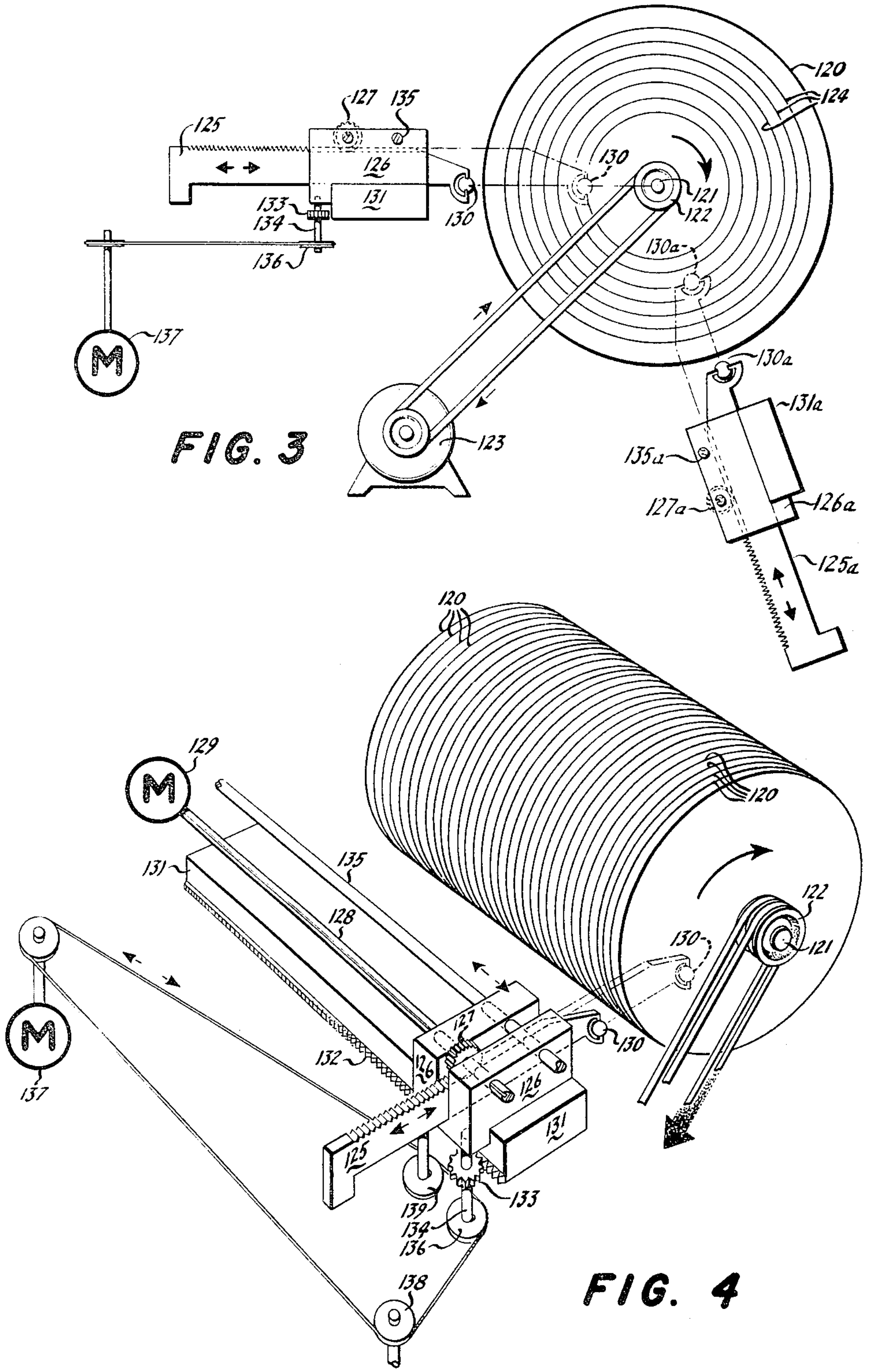
FIGS. 3 and 4 are diagrammatic views of the basic magnetic disc storage component of the invention, including access mechanism which is necessary to position magnetic transducers for coaction with the magnetic recording media.

FIGS. *5a* and *5b* are diagrammatic views of the access mechanism and controls therefor pertaining to the mechanism of FIGS. 3 and 4.

Figures 6, 7, 9:
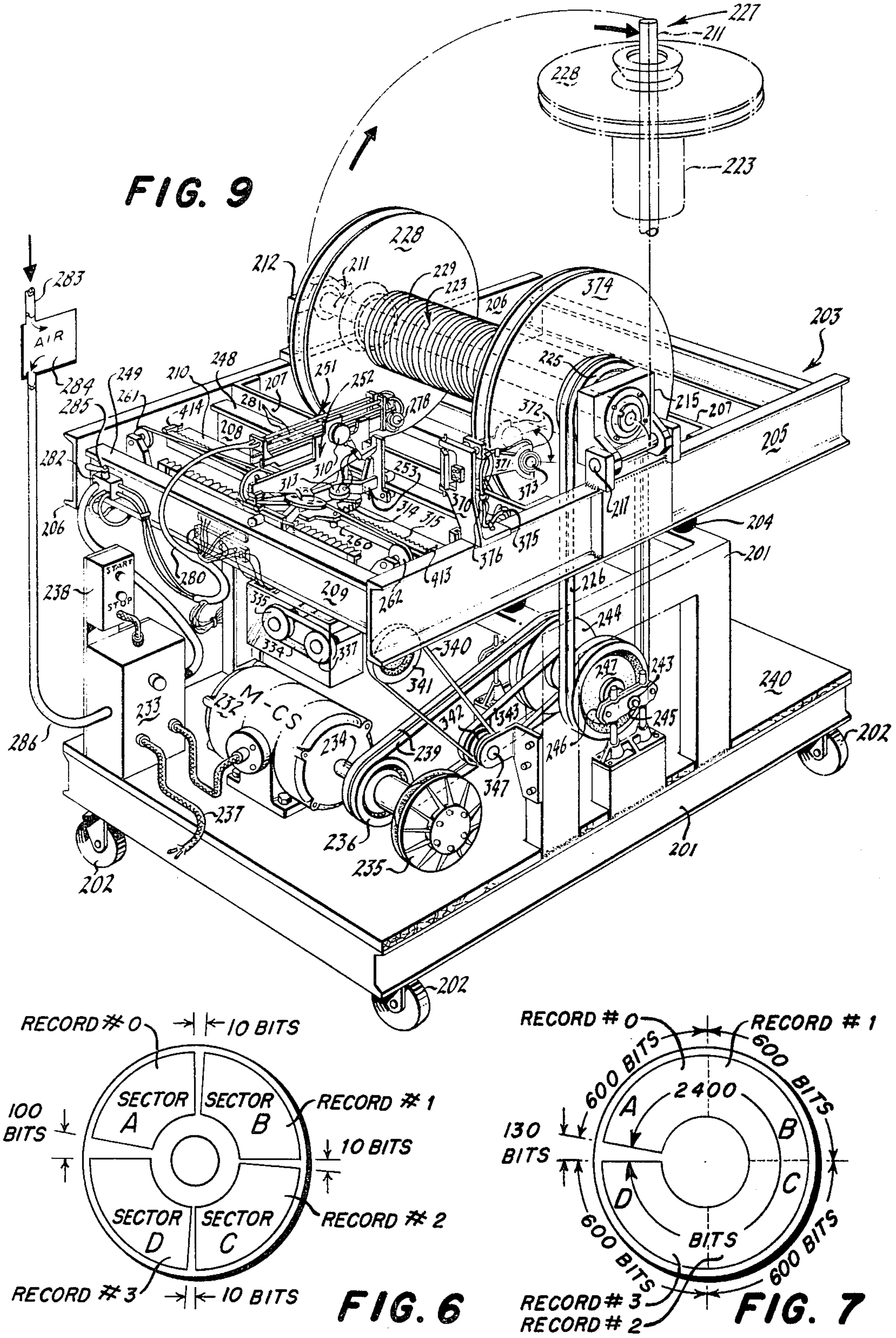

FIG. 6 is a schematic view of a theoretical storage track of which 100 such tracks are provided upon each side of each magnetic recording disc.

FIG. 7 is a schematic view of a storage track as actually used in the preferred embodiment of the invention.

Figure 8:
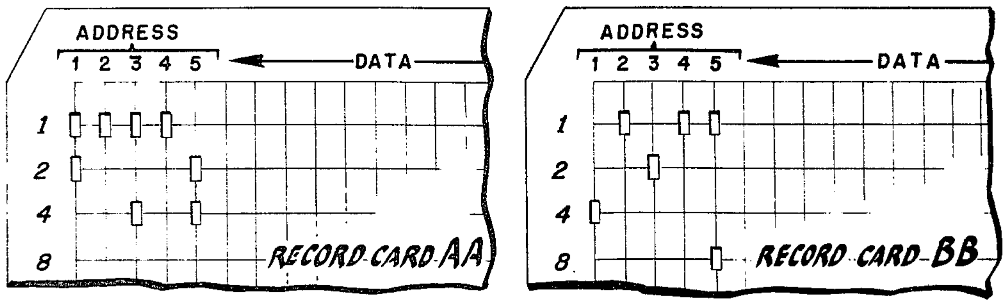

FIG. 8 is a tabular illustration of the address location obtained from a record card input and the functional selection resulting therefrom.

FIG. 9 is a perspective view of the principal mechanical components of the magnetic memory or storage unit.

Figures 10, 11:
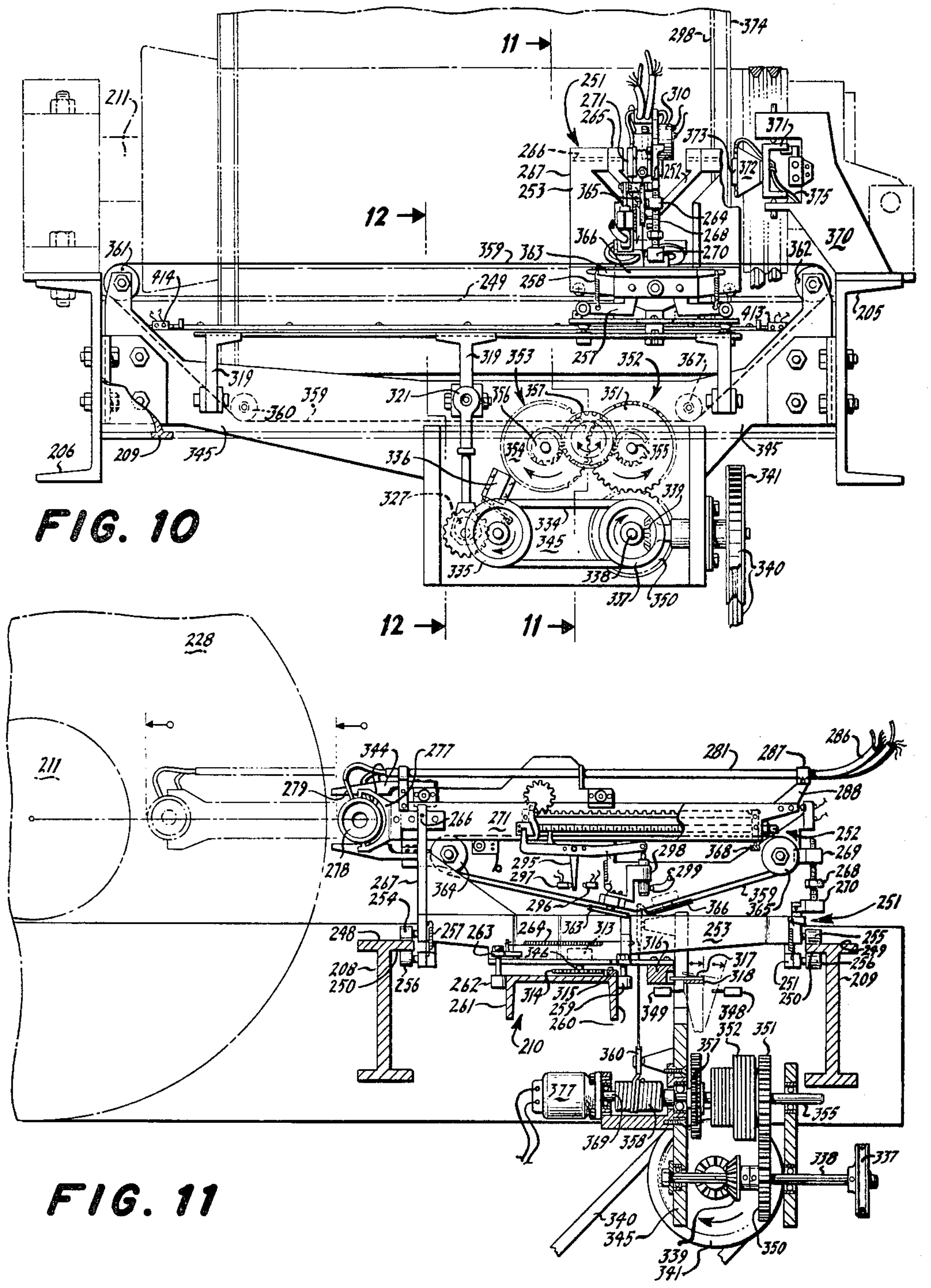

FIG. 10 is a rear view of the upper structure of FIG. 9, showing the access control mechanism for both disc-to-disc and track-to-track selection.

FIG. 11 is a sectional view of FIG. 10 along the lines 11—11 showing the track-to-track access mechanism in more detail.

Figures 12, 13, 14:
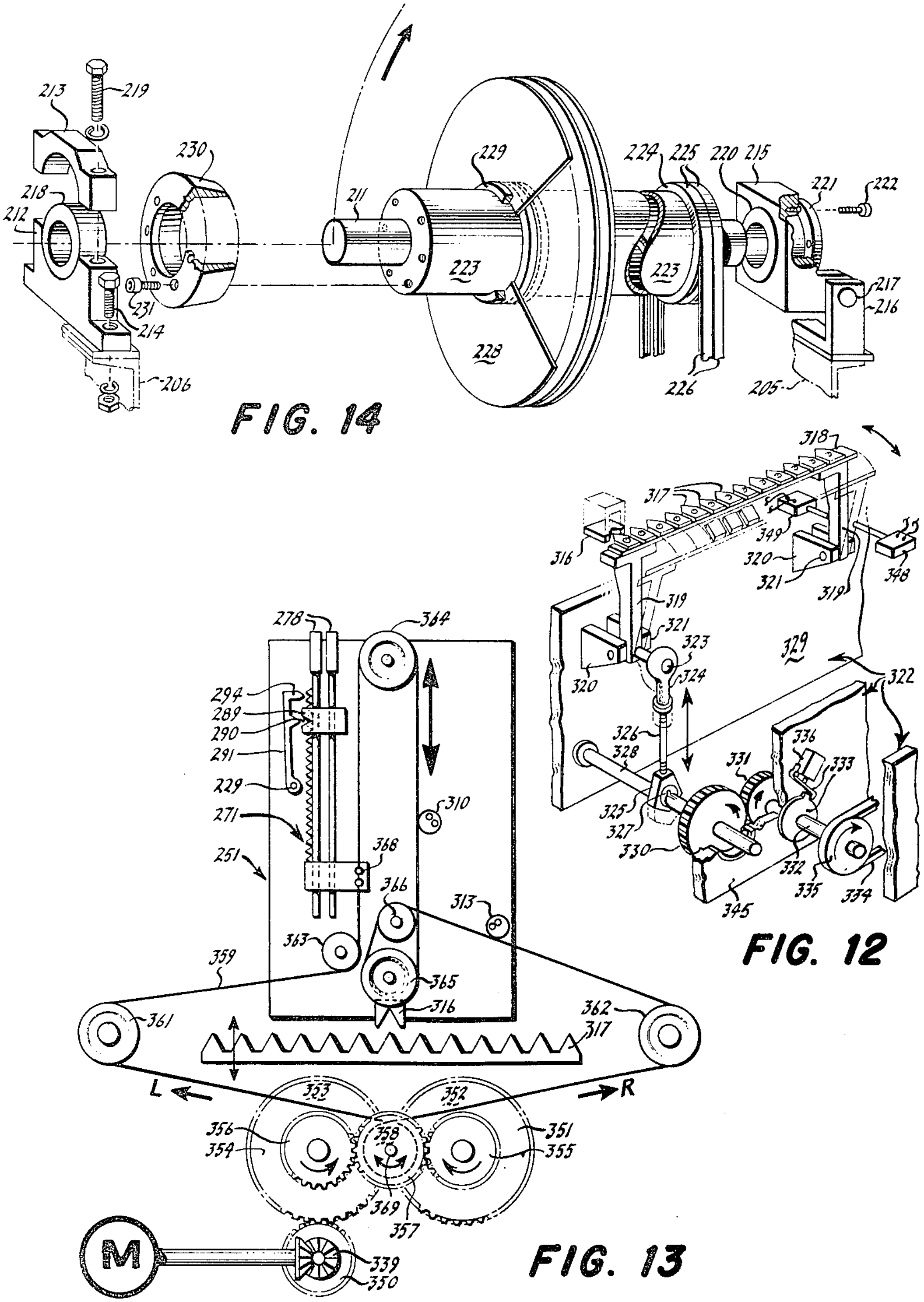

FIG. 12 is a perspective view along the Z-axis with reference to lines 12—12 of FIG. 10 illustrating the detent arrangement of the disc-to-disc access mechanism.

FIG. 13 is a schematic view of the cable drive for the combined disc-to-disc and track-to-track access mechanism.

FIG. 14 is an exploded view of the magnetic disc assembly.

Figure 15:
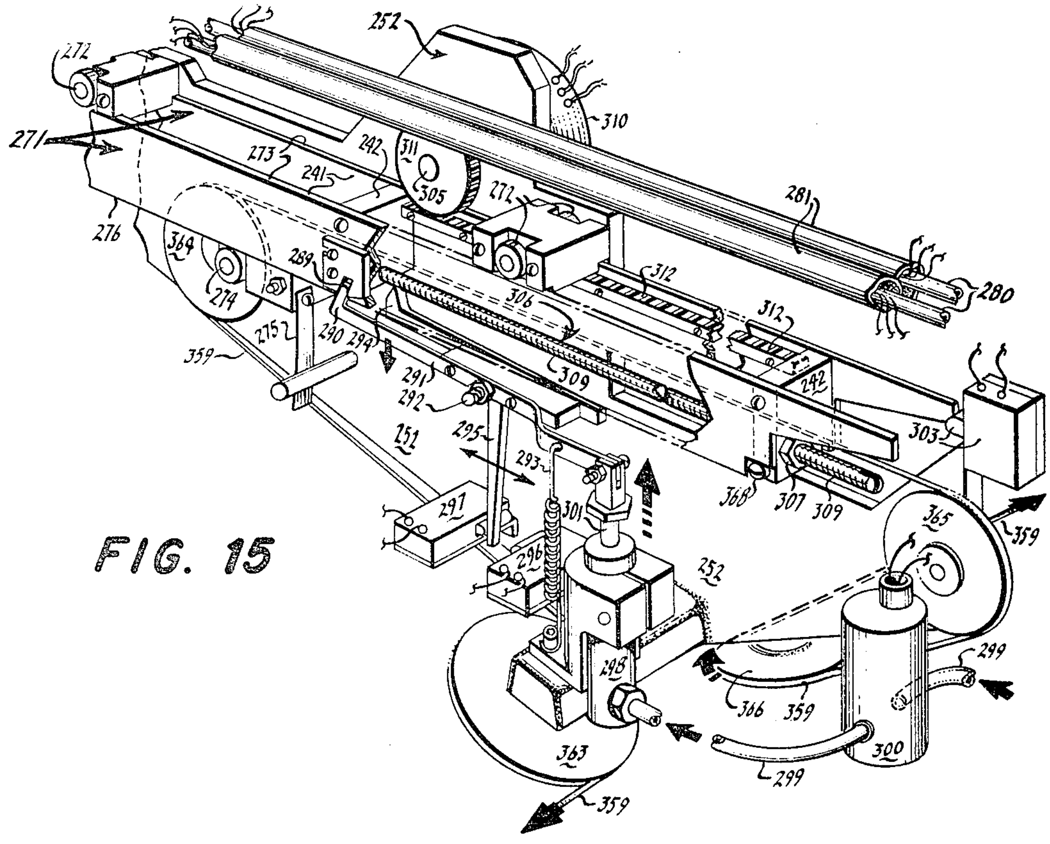

FIG. 15 is a perspective view of the track-to-track access mechanism showing some of the more detailed construction of the device.

Figure 16A:
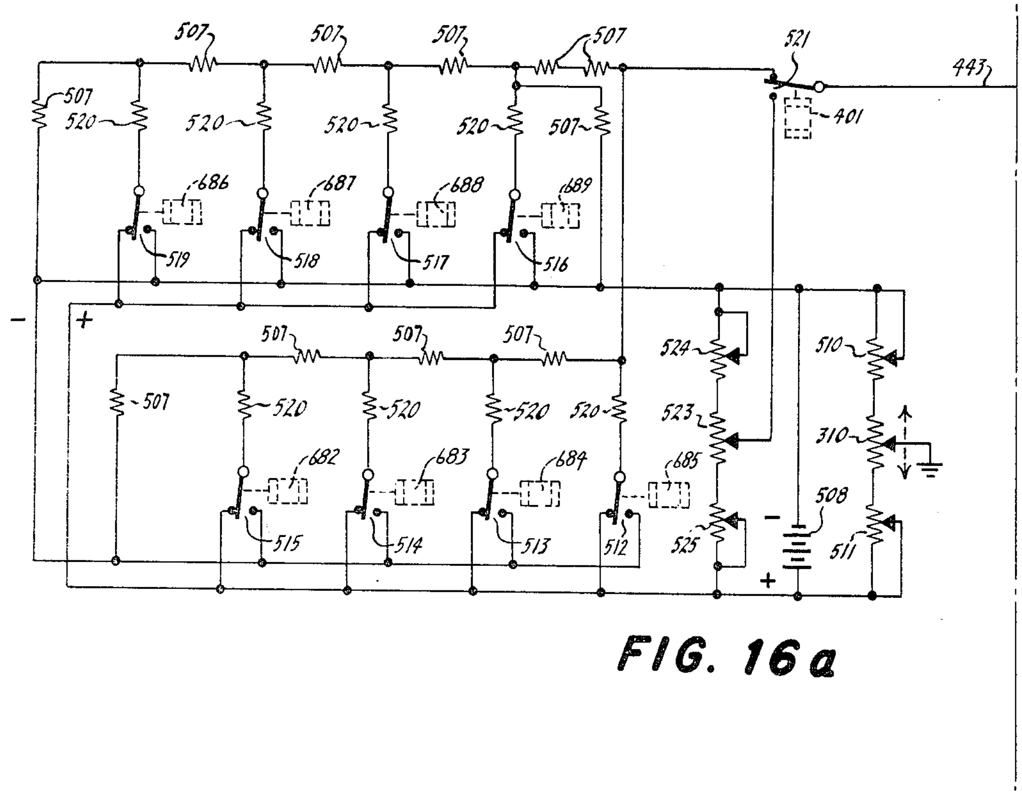
Figure 16B:
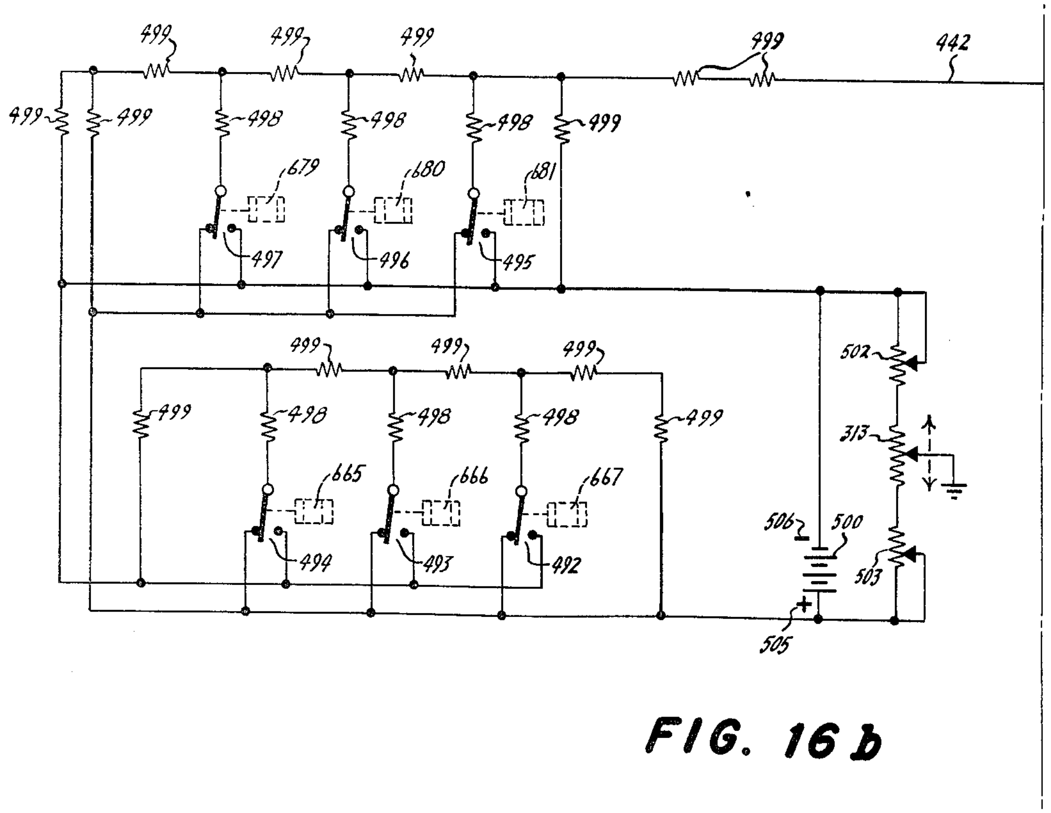
Figure 17:
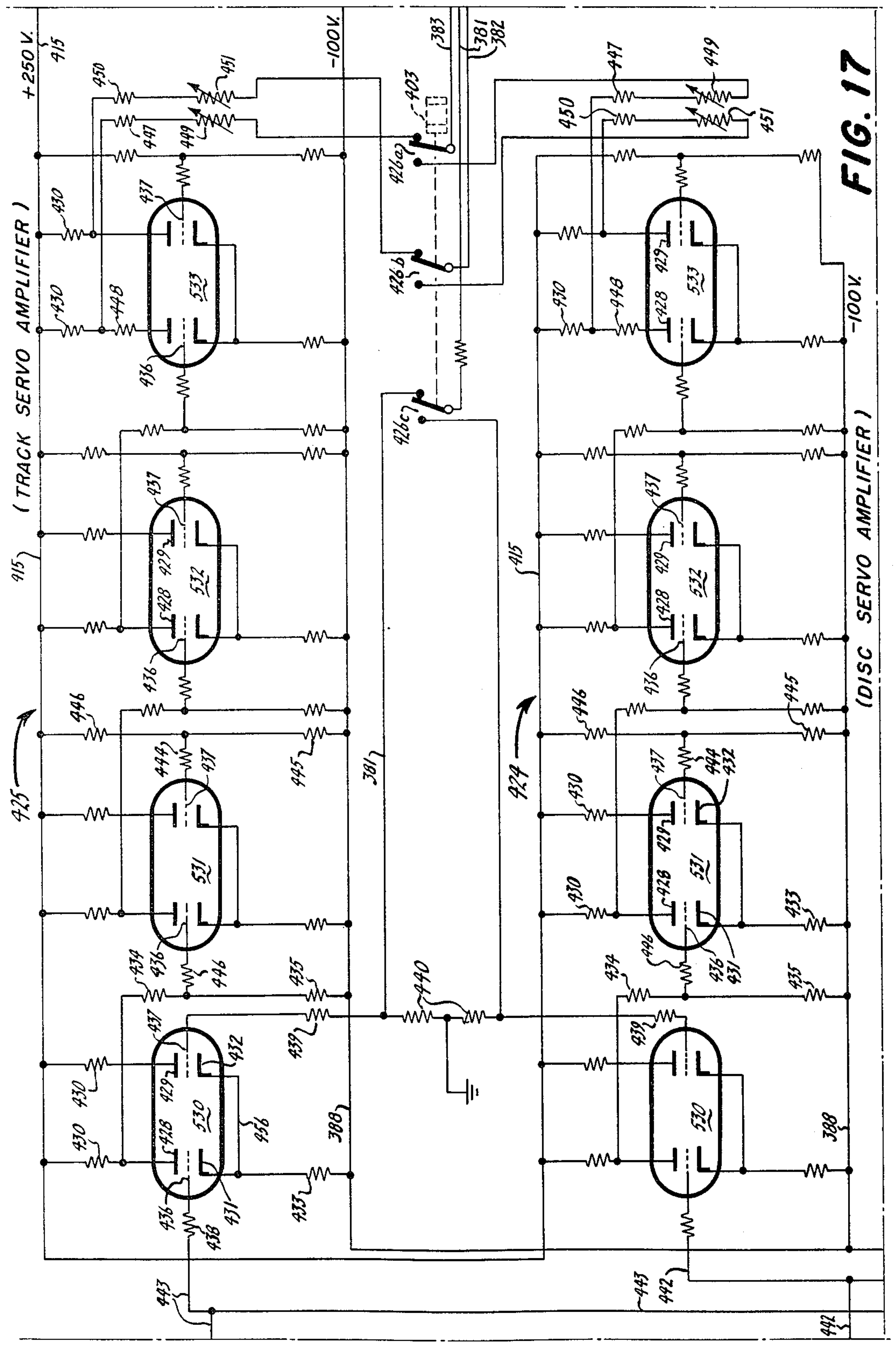
Figure 17A:
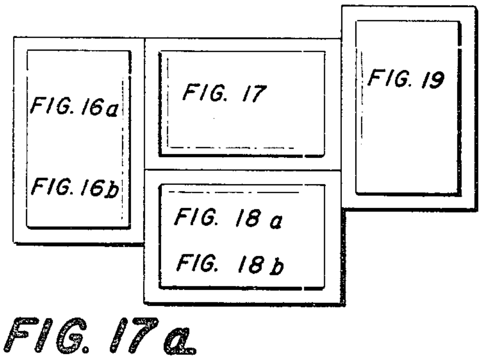

FIGS. 16–19 inclusive are arranged as shown in FIG. 17*a* and disclose detailed circuit diagrams of the servomechanism for controlling both the track-to-track and disc-to-disc access mechanism.

Figure 20:
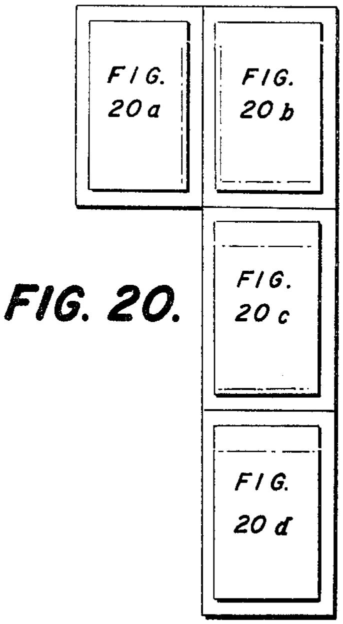

FIGS. 20*a*, 20*b*, 20*c* and 20*d*, taken together and arranged as indicated in FIG. 20, constitute a wiring diagram of the record card punch utilized herein.

Figure 21:
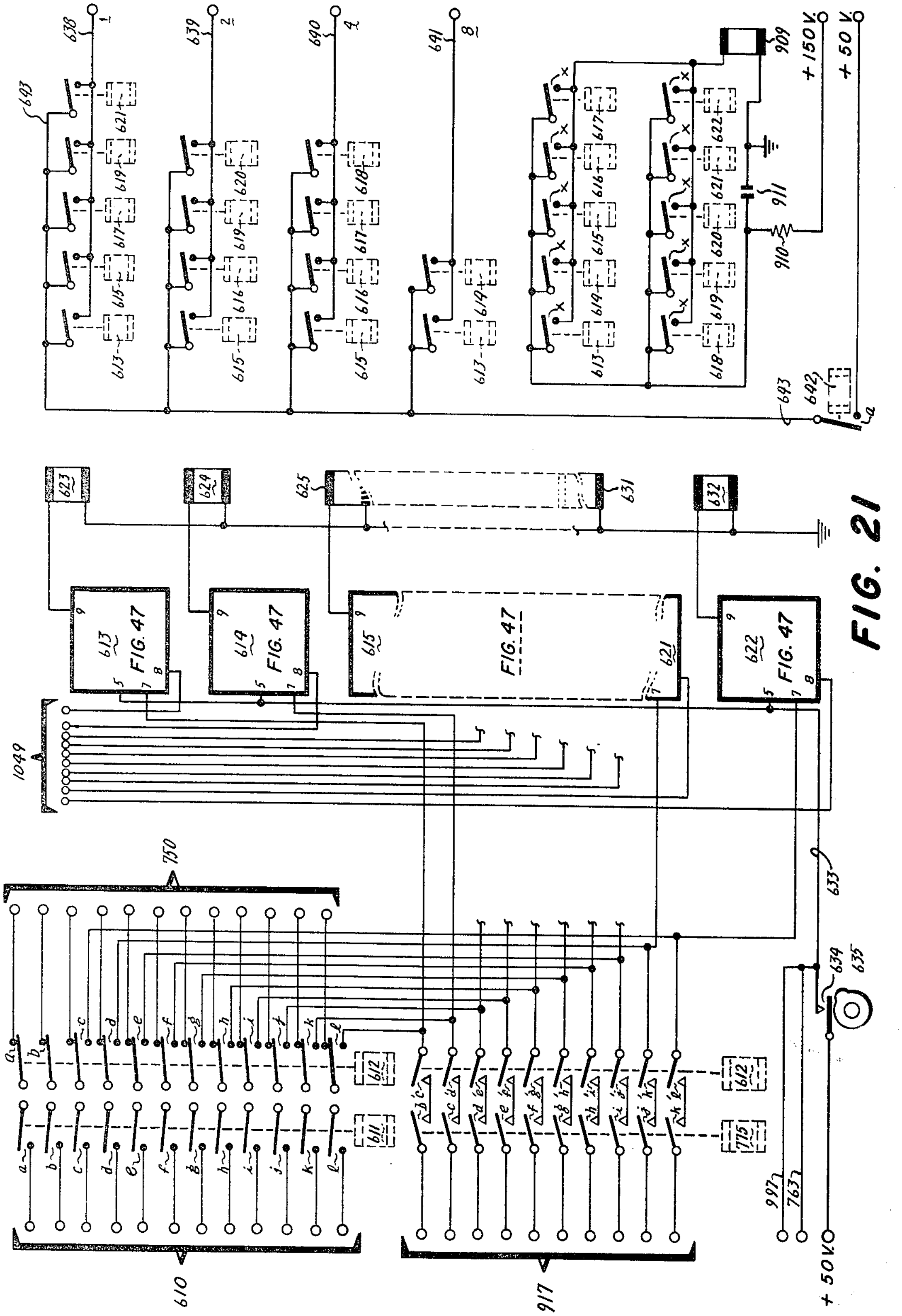

FIG. 21 is a schematic diagram of one of the recode matrices of the invention.

Figure 22A:
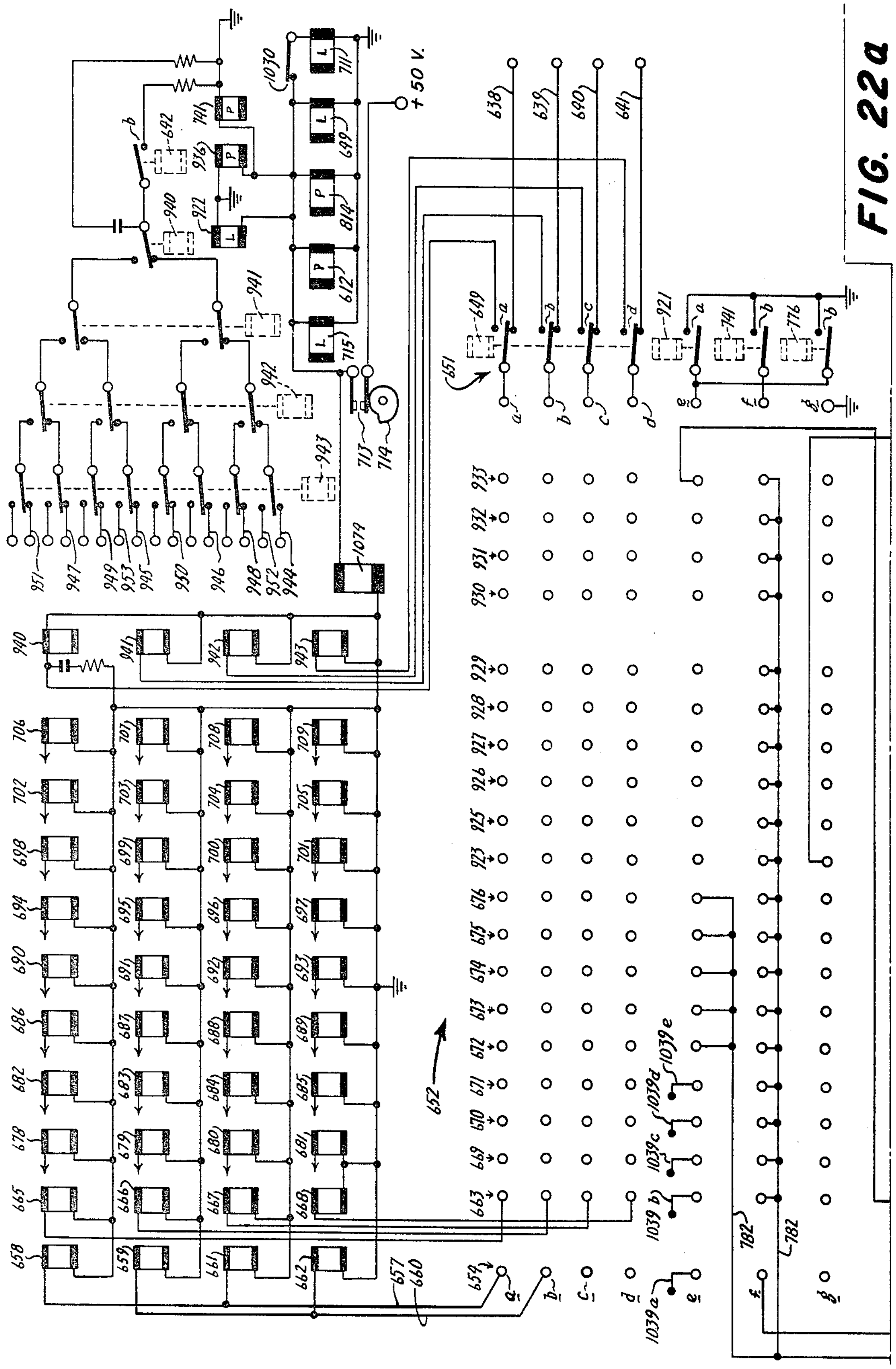
Figure 22B:
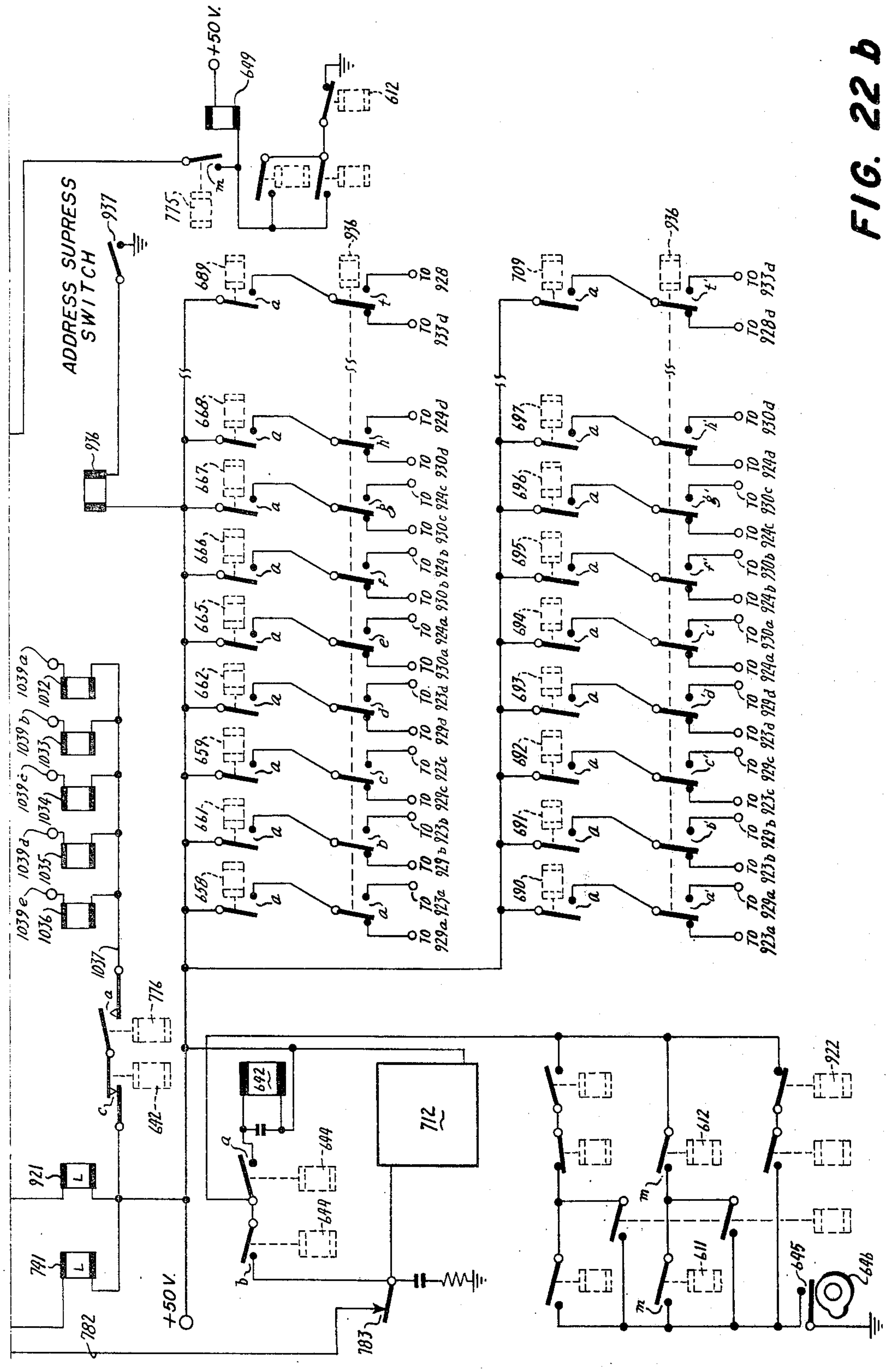

FIGS. 22*a* and 22*b*, taken together, comprise a schematic diagram of the relay storage unit.

Figure 23A:
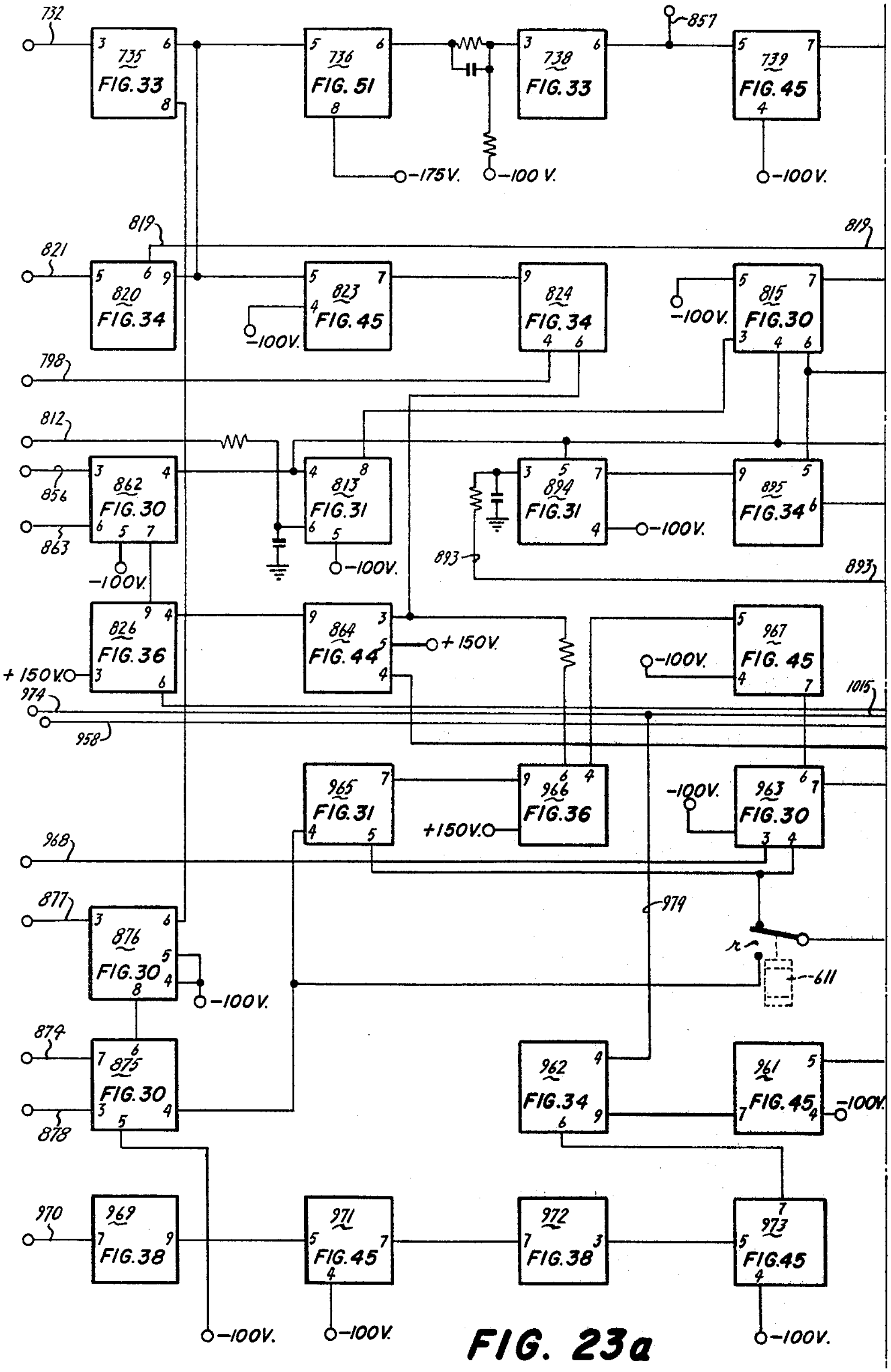
Figure 23B:
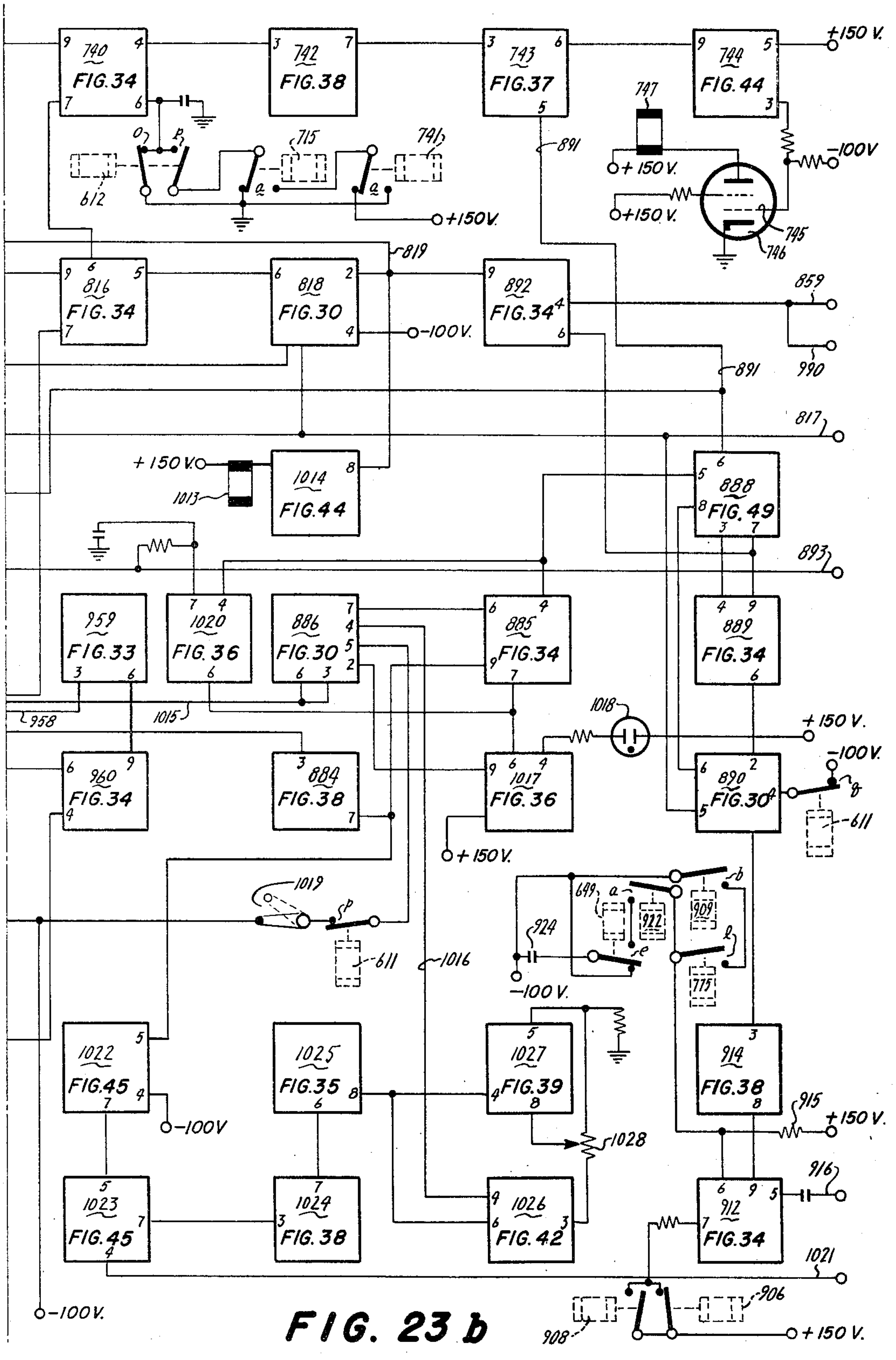

FIGS. 23*a* and 23*b*, taken together, comprise a schematic diagram of several of the control circuits of the present invention.

Figure 24:
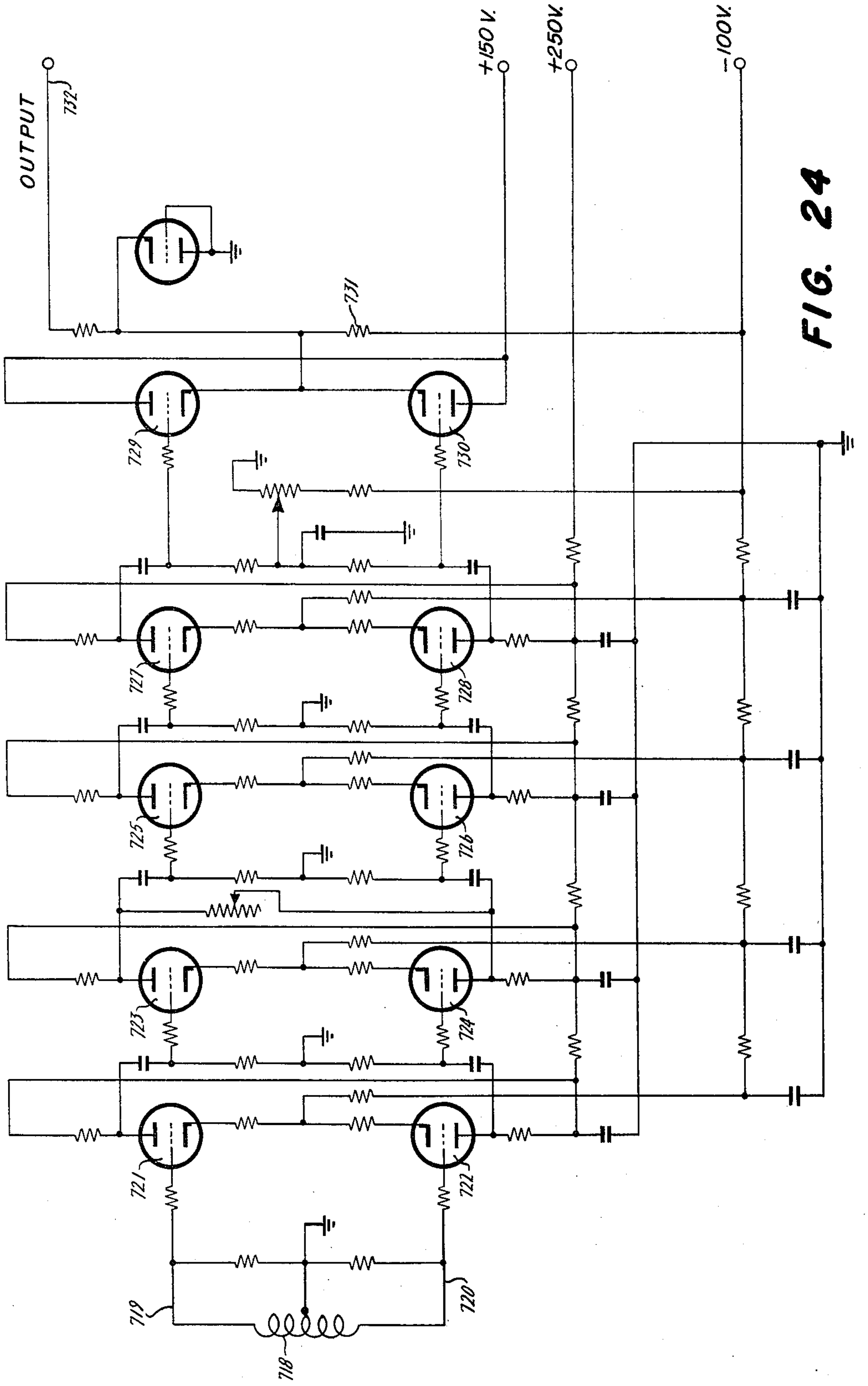

FIG. 24 is a schematic diagram of the clock pulse amplifier.

Figures 25, 25A:
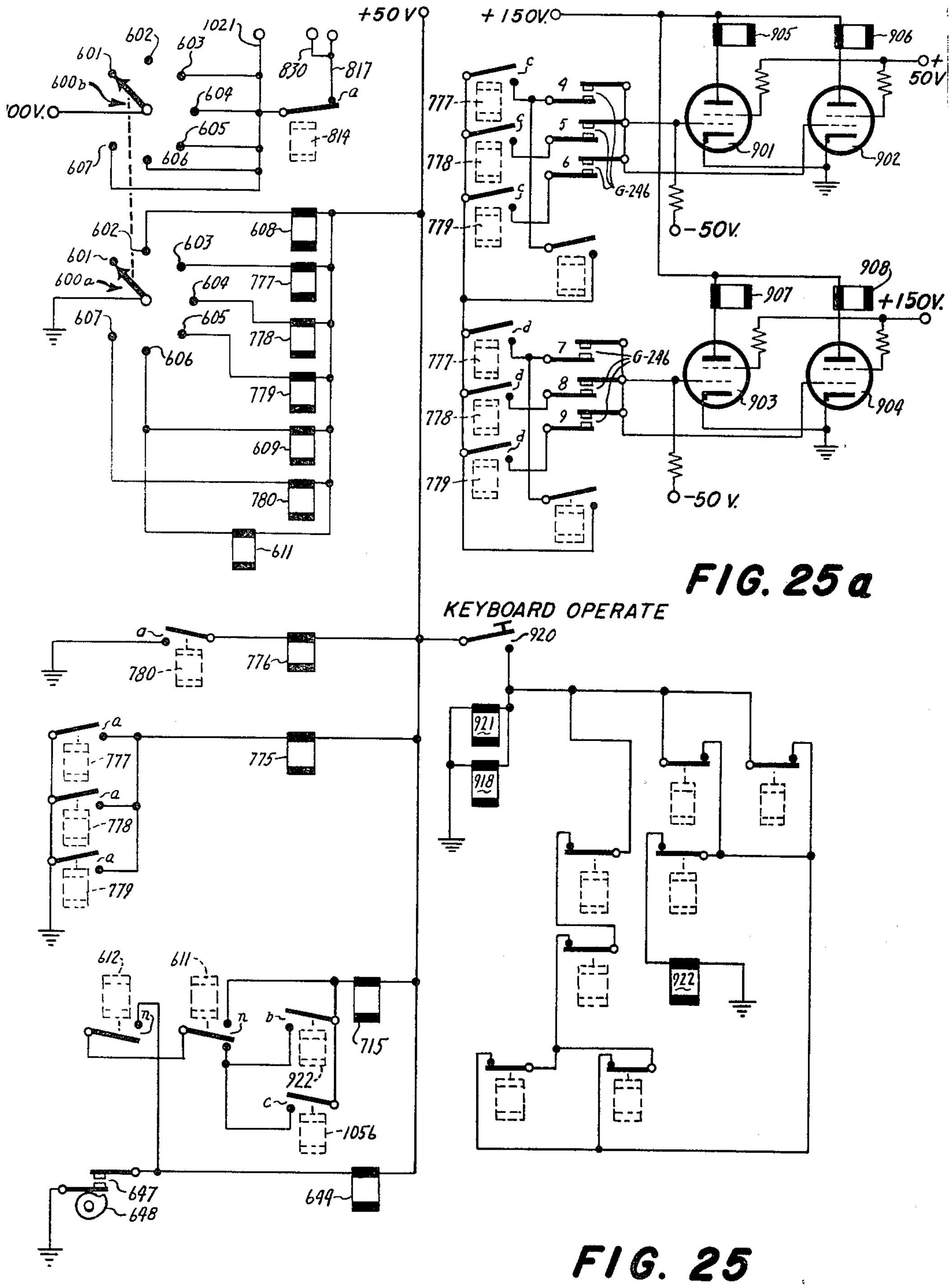

FIGS. 25 and 25*a* are schematic diagrams of certain of the control circuits utilized herein.

Figure 26:
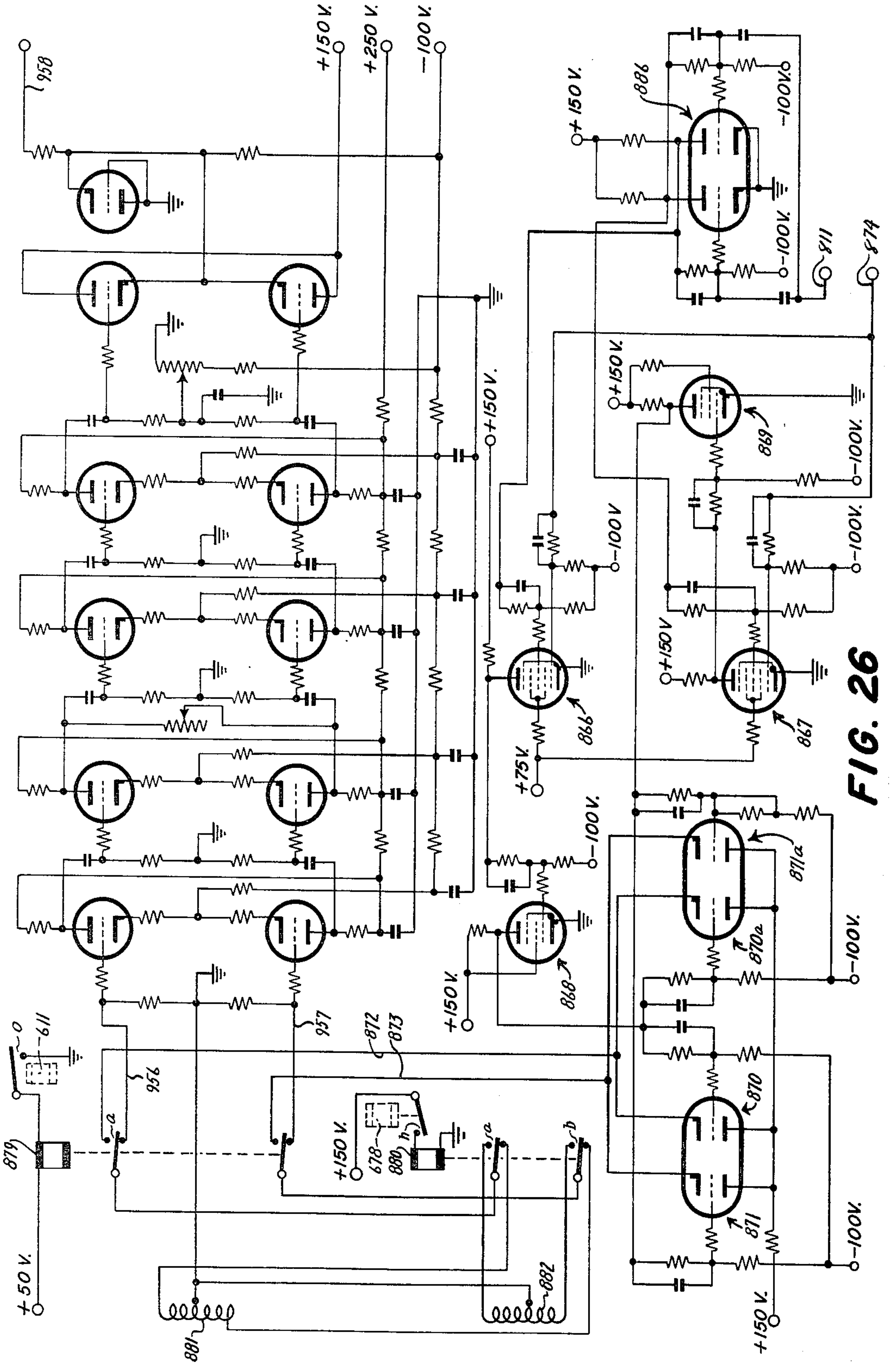

FIG. 26 is a schematic diagram of the read-write circuits.

Figure 27:
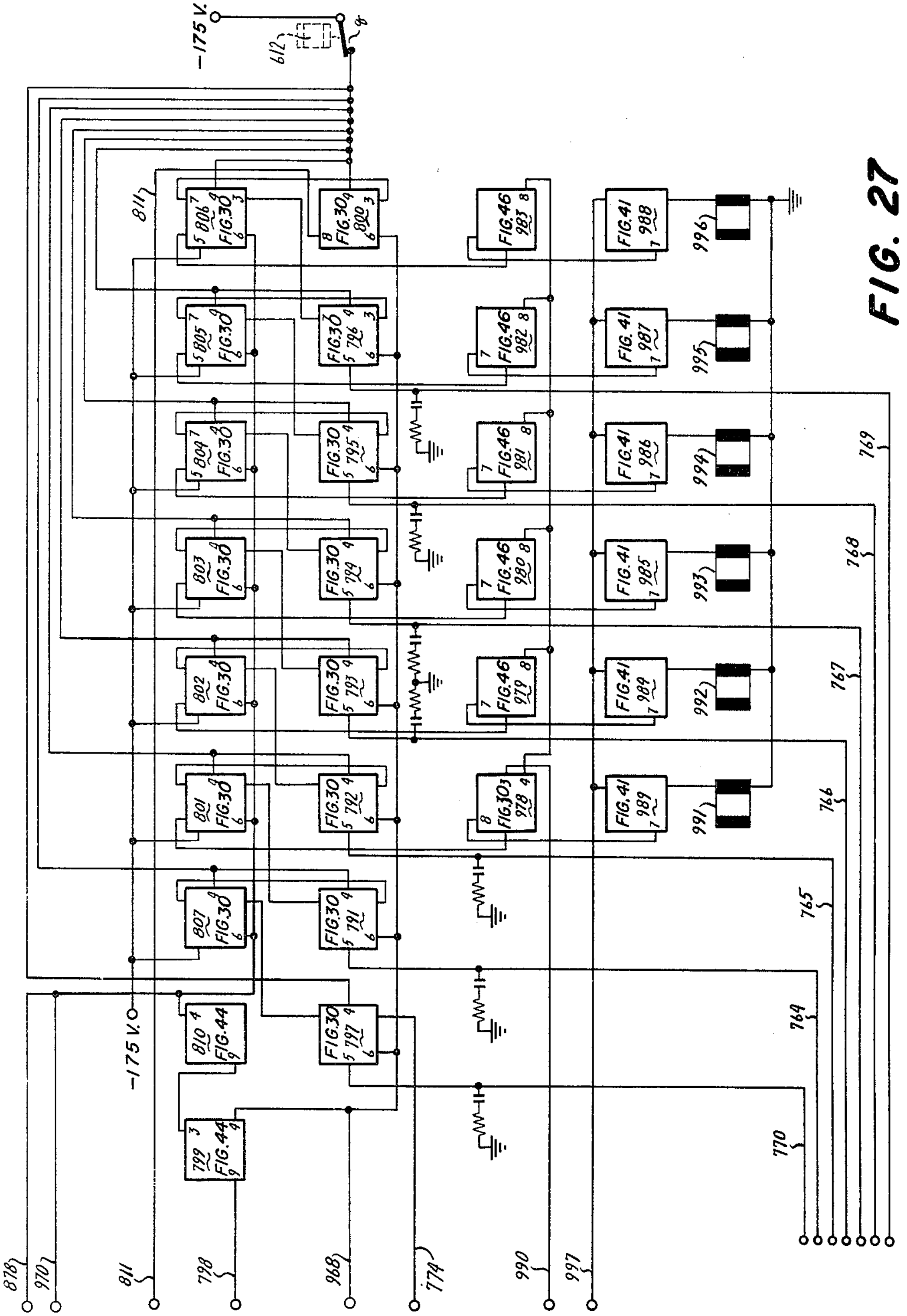

FIG. 27 is a schematic diagram of the shift register.

Figure 28:
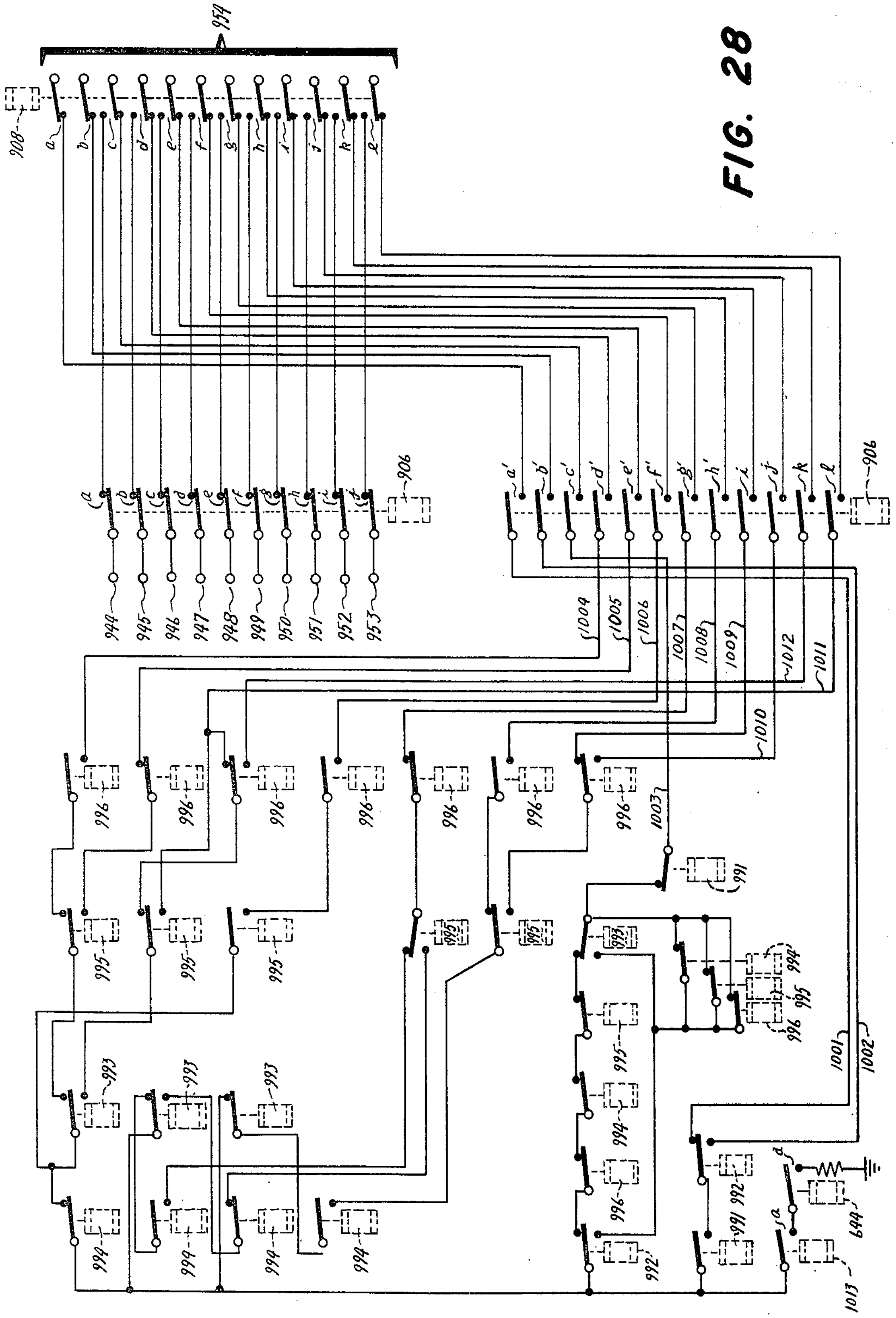

FIG. 28 is a schematic diagram of a recoding information read from the shift register.

Figure 29:
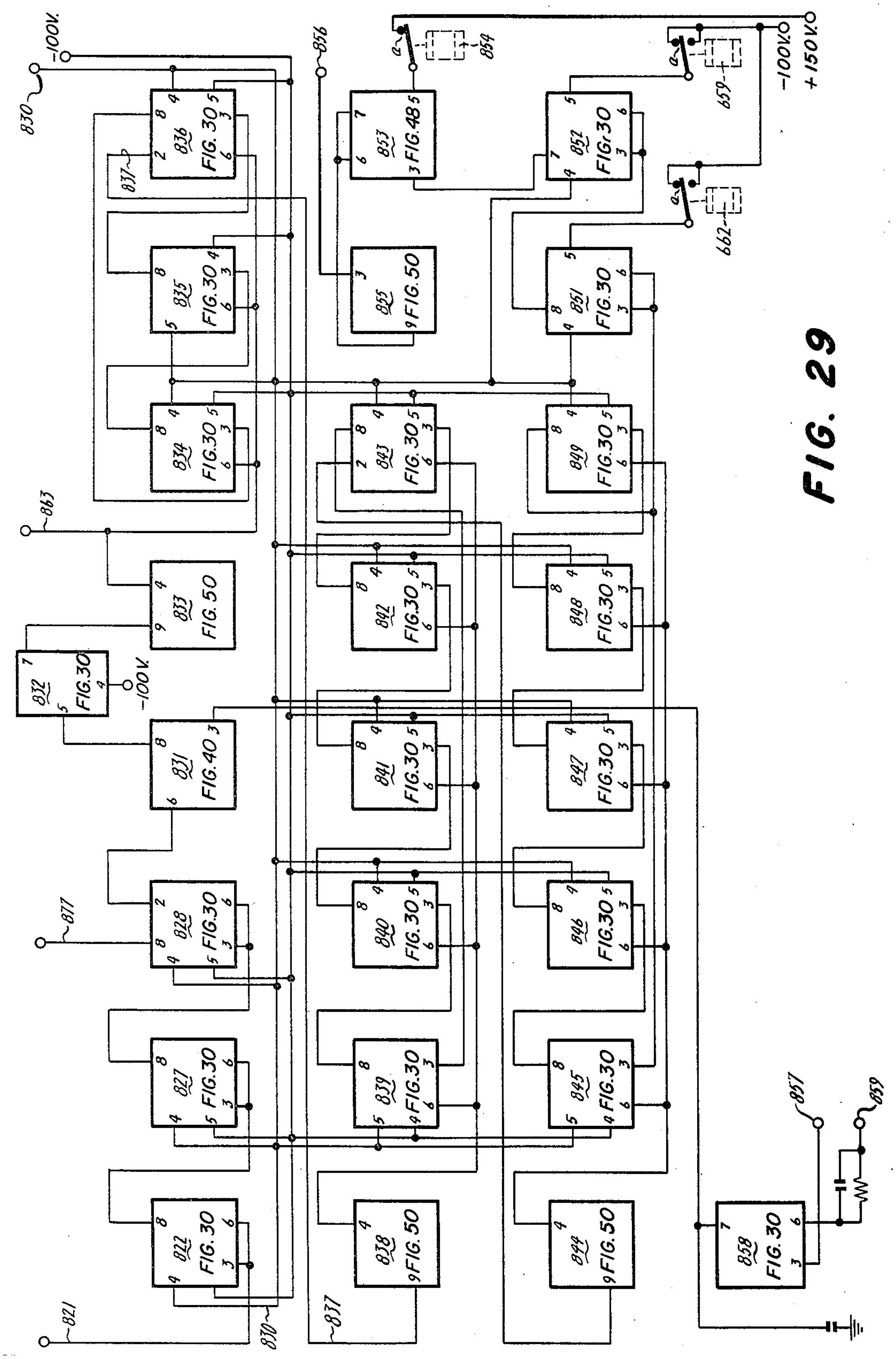

FIG. 29 is a schematic diagram of the locator circuits.

FIGS. 30 through 51 are schematic diagrams of various electronic components utilized throughout the machine of the invention.

Figure 52A:
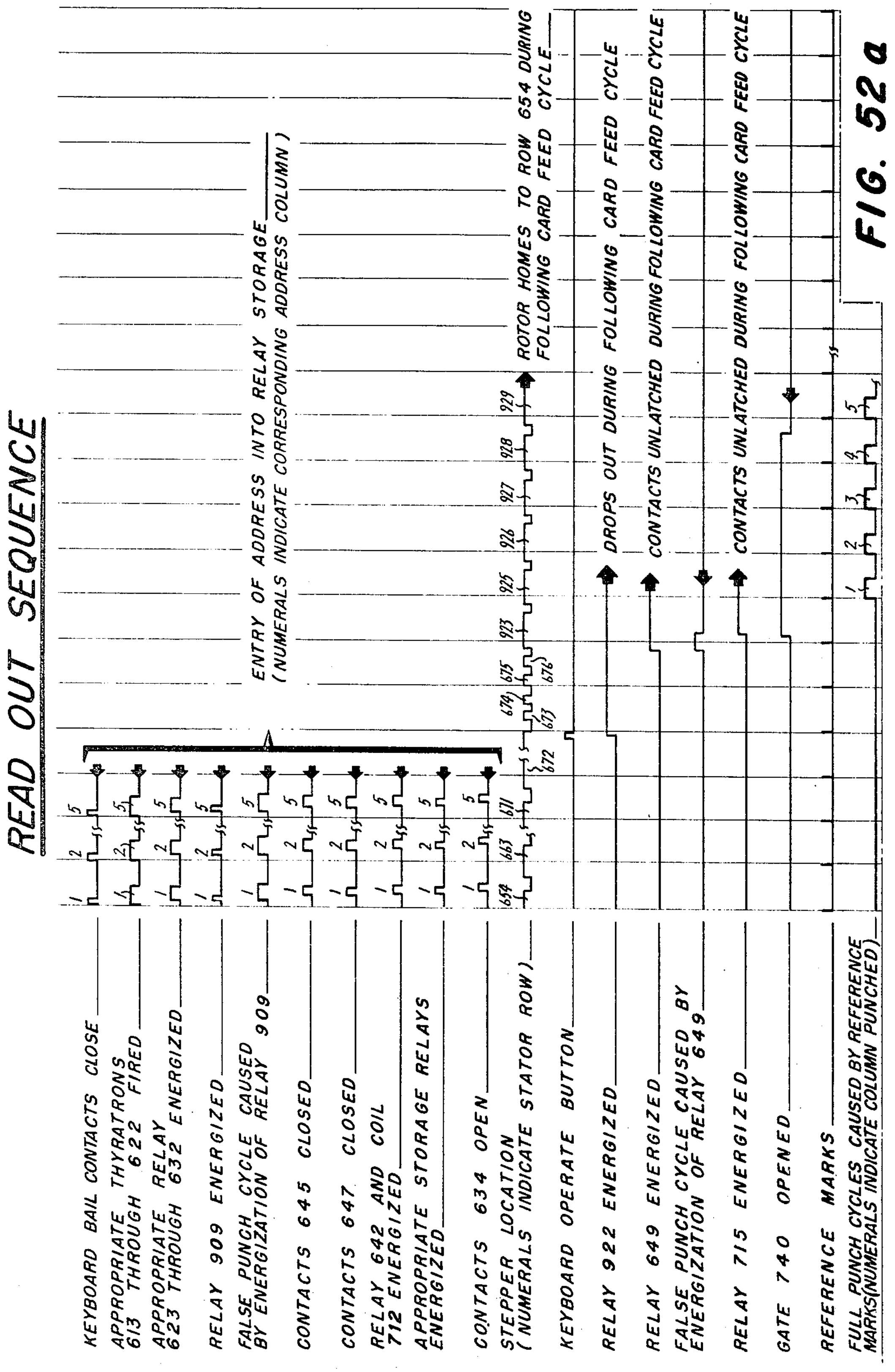
Figure 52B:
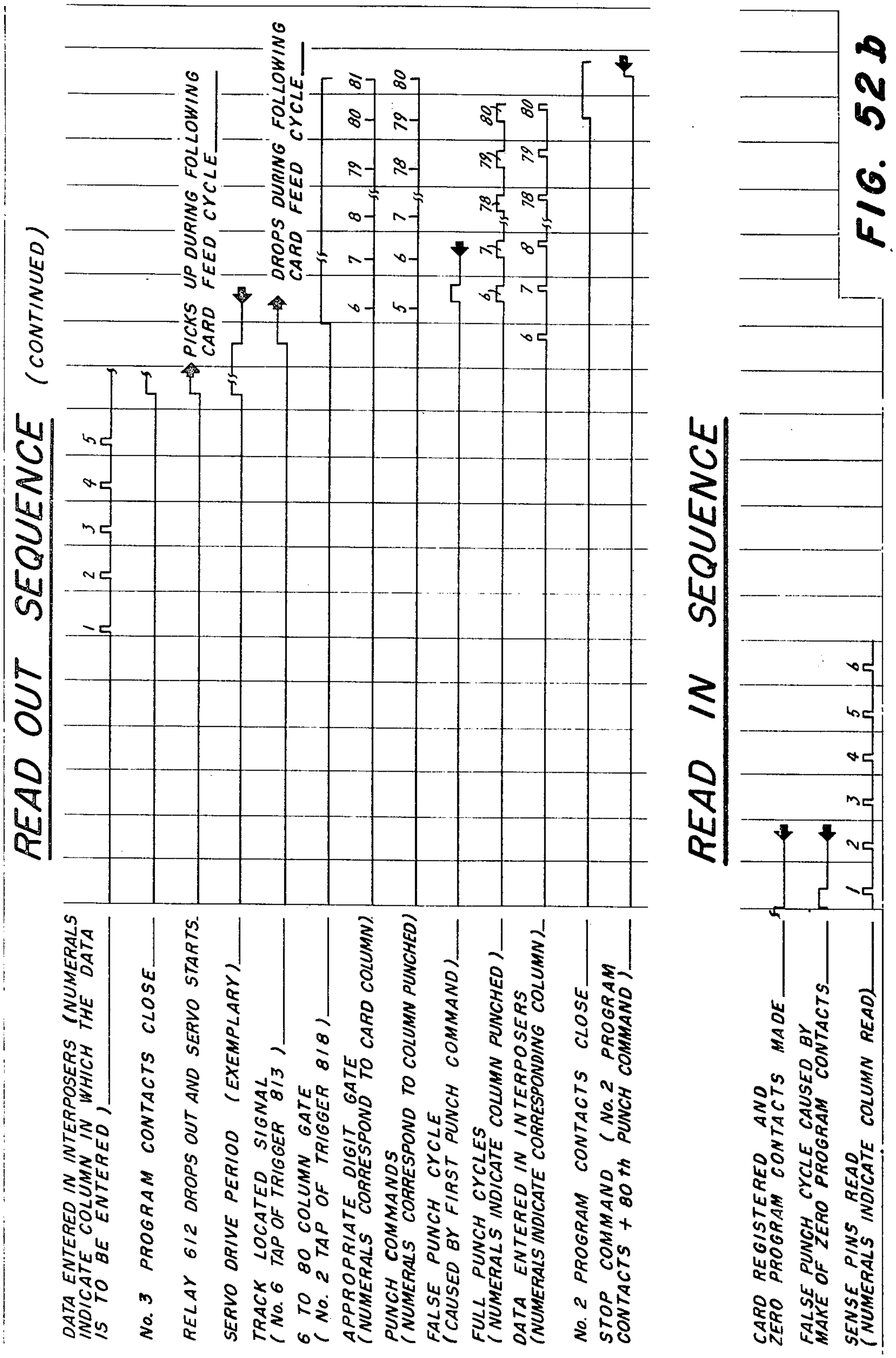
Figure 52C:
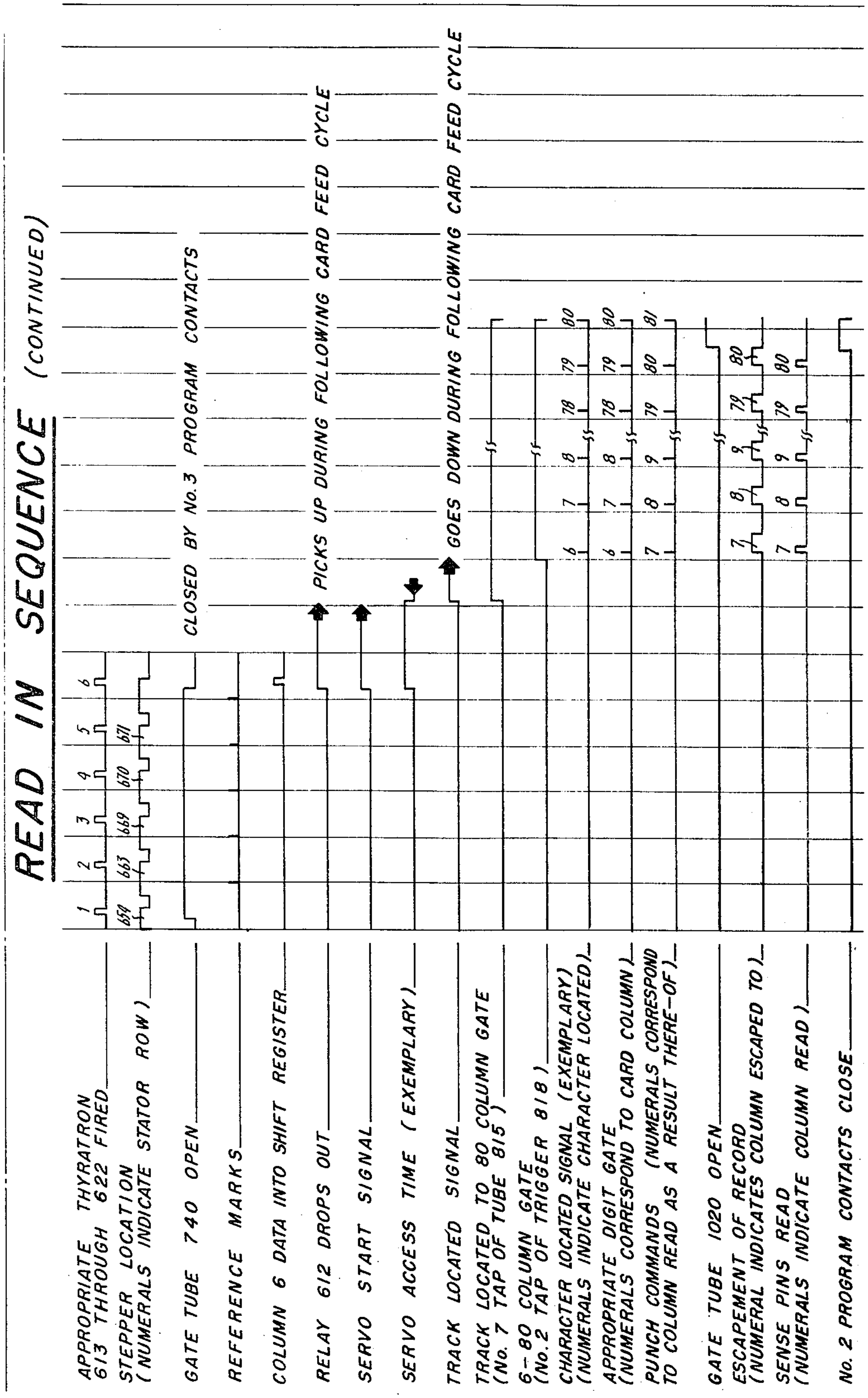

FIGS. 52*a*, 52*b* and 52*c*, taken together, comprise a sequence chart for indicating the sequence of operation of various components of the machine.

Figure 53A:
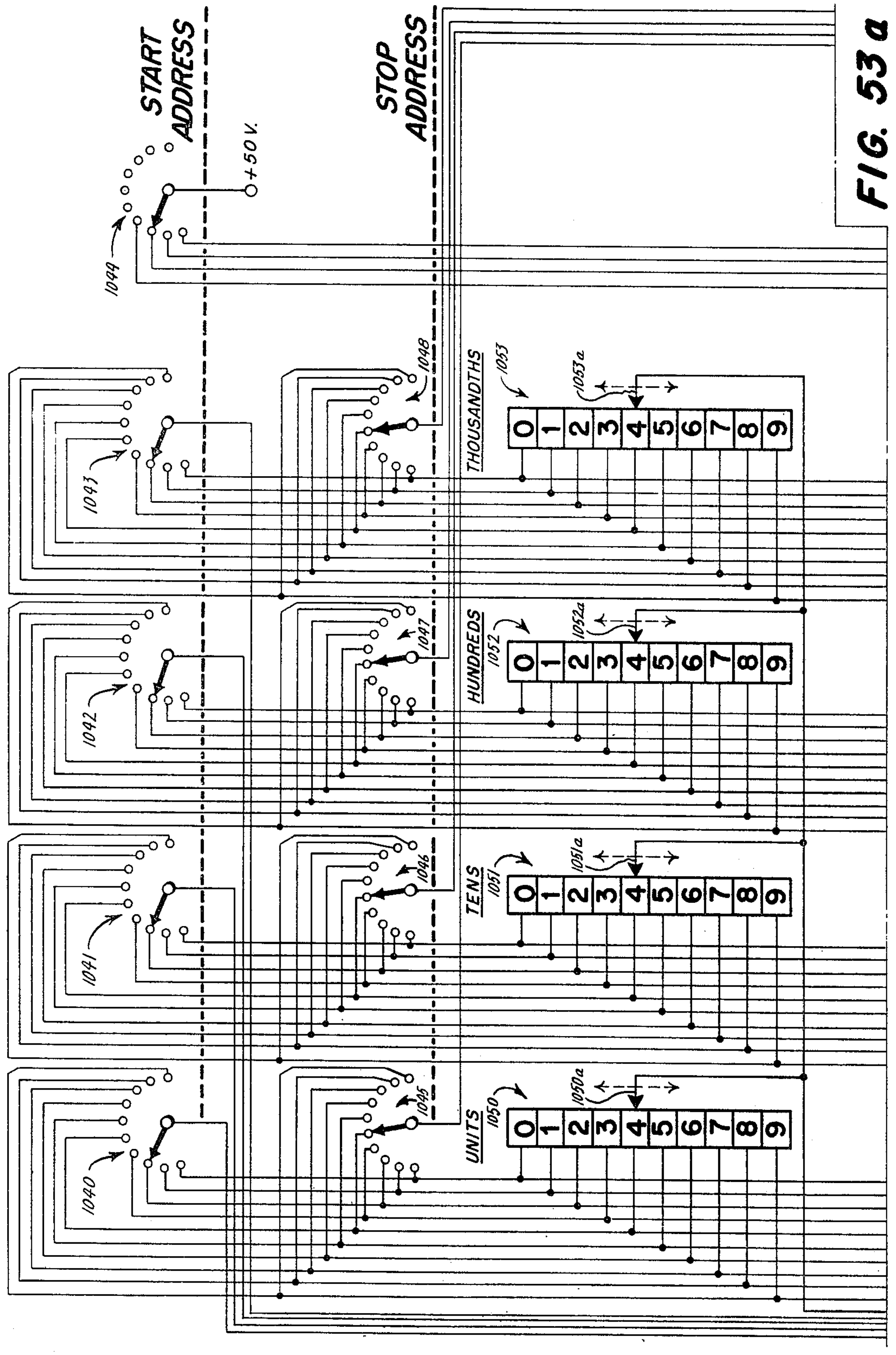
Figure 53B:
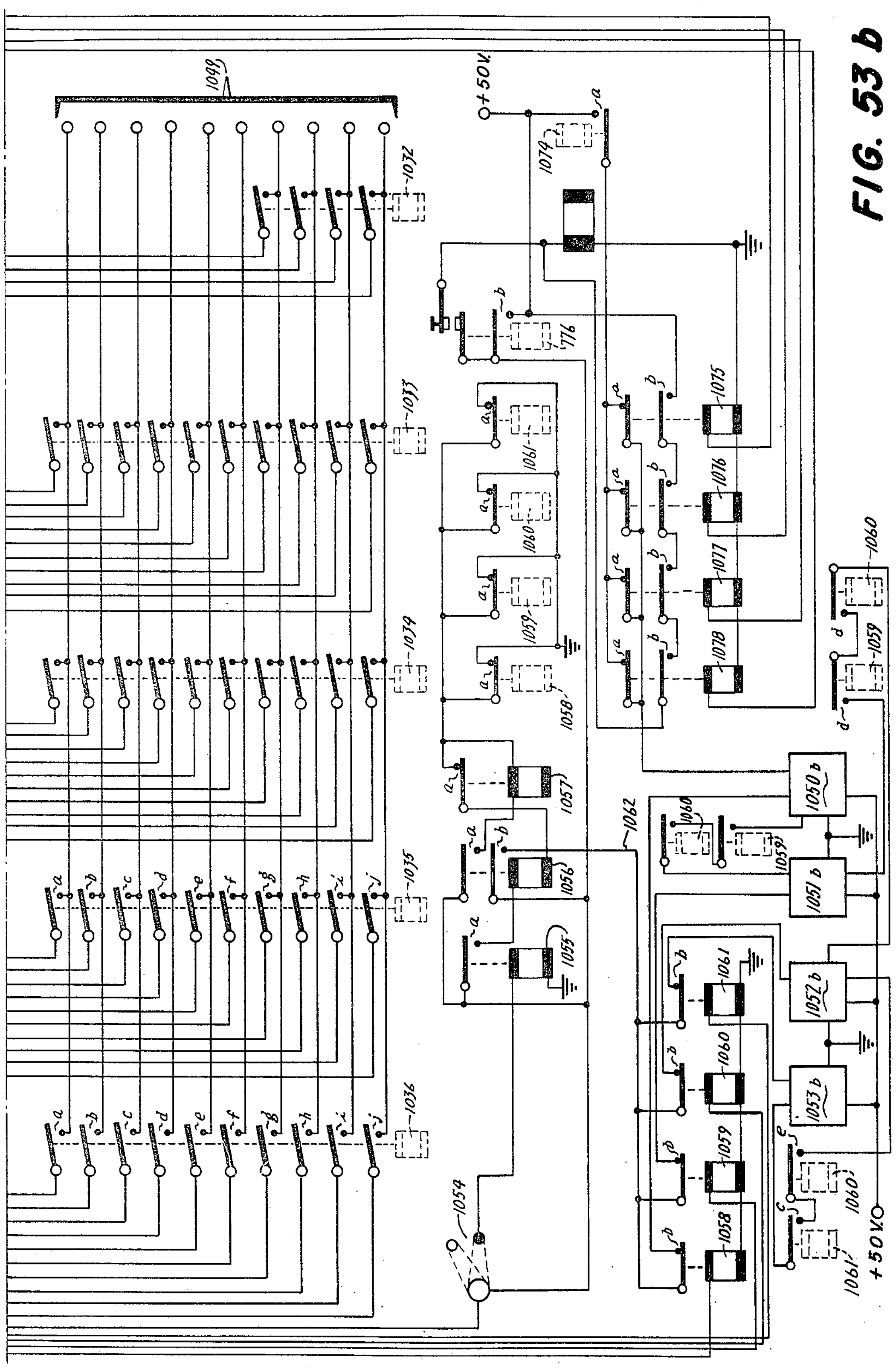

FIGS. 53*a* and 53*b*, taken together, constitute a schematic diagram of the sequential scan mechanism.

Figure 54:
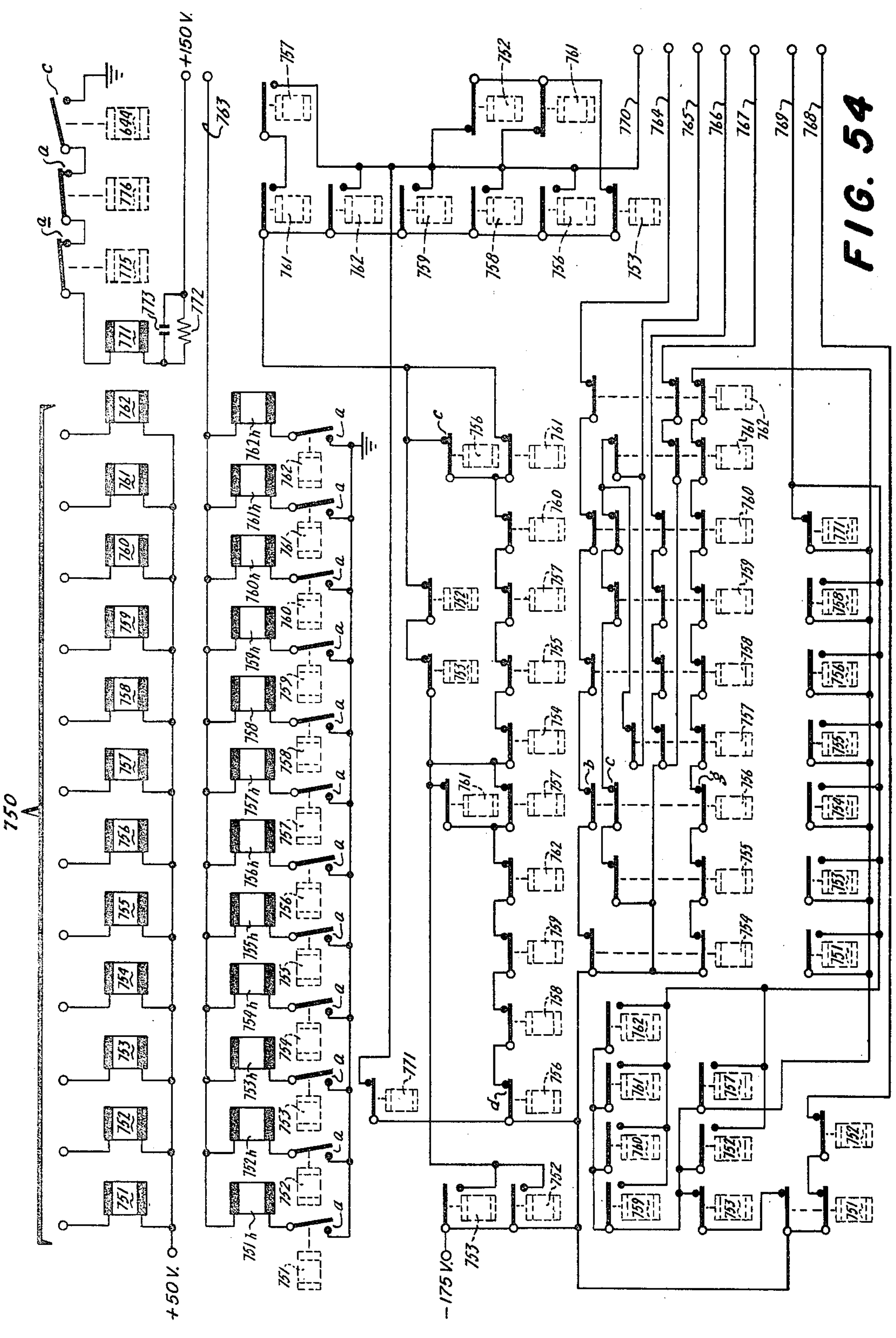

FIG. 54 comprises a schematic diagram of another recoder matrix and of the check bit generator utilized herein.

Figure 55:
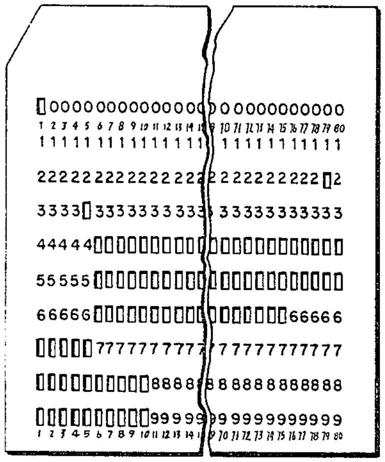

FIG. 55 is an illustration of a program card which may be utilized to control the record card punch, portions thereof having been omitted.

Figure 56:
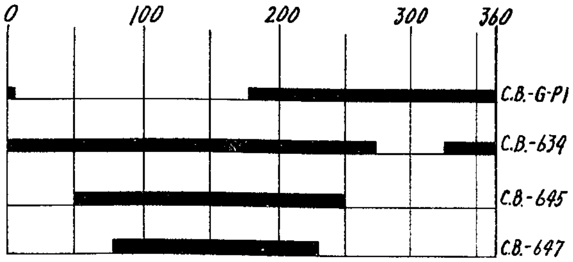

FIG. 56 is a timing chart showing the operation of several cam-controlled circuit breakers which control various circuits of the machine of the invention.

Figure 1:
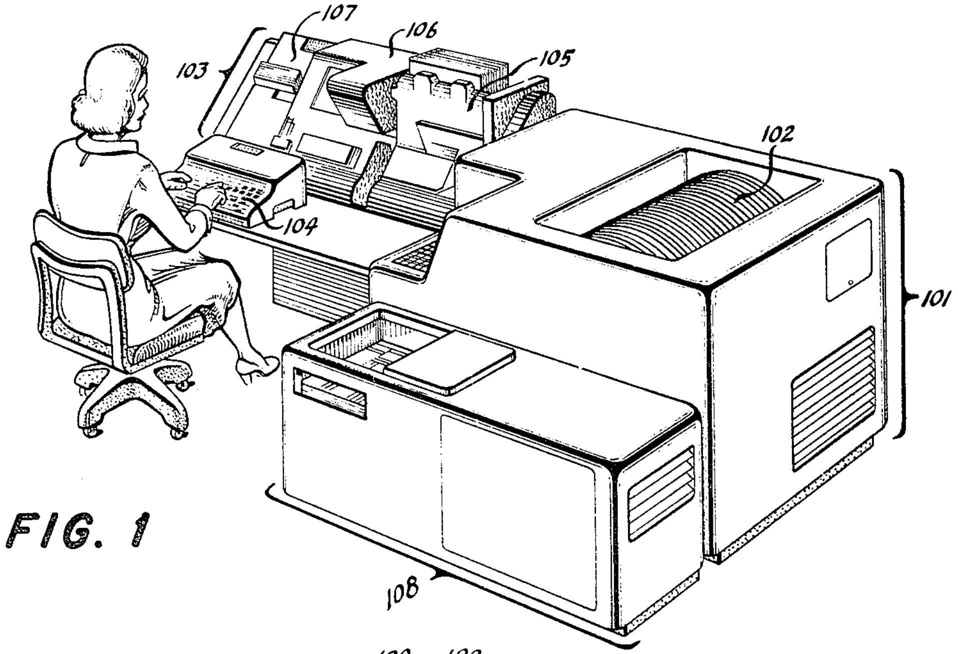
FIG. 1 is a pictorial view of the principal components of a machine incorporating the invention.

Referring to FIG. 1, the essential components of the preferred embodiment of the invention consist of a magnetic storage unit 101 containing a plurality of magnetic discs 102 mounted upon a common shaft for rotation, a record card printing-perforating unit 103 including a keyboard 104 and record card handling mechanism (card feed 105, punching and sensing devices 106, and card stacker 107), and an electronic circuits cabinet 108 containing most of the control circuits and actuating circuits for the machine as well as the electrical power supply. The keyboard 104 is used primarily for controlling the functioning and operation of the machine; however, it also provides a means for the entry of a limited amount of auxiliary storage. Information can only be entered into the main magnetic storage unit 101 or taken from the main magnetic storage unit via perforated record cards, which are processed through the punching and sensing devices 106.

Figure 2:
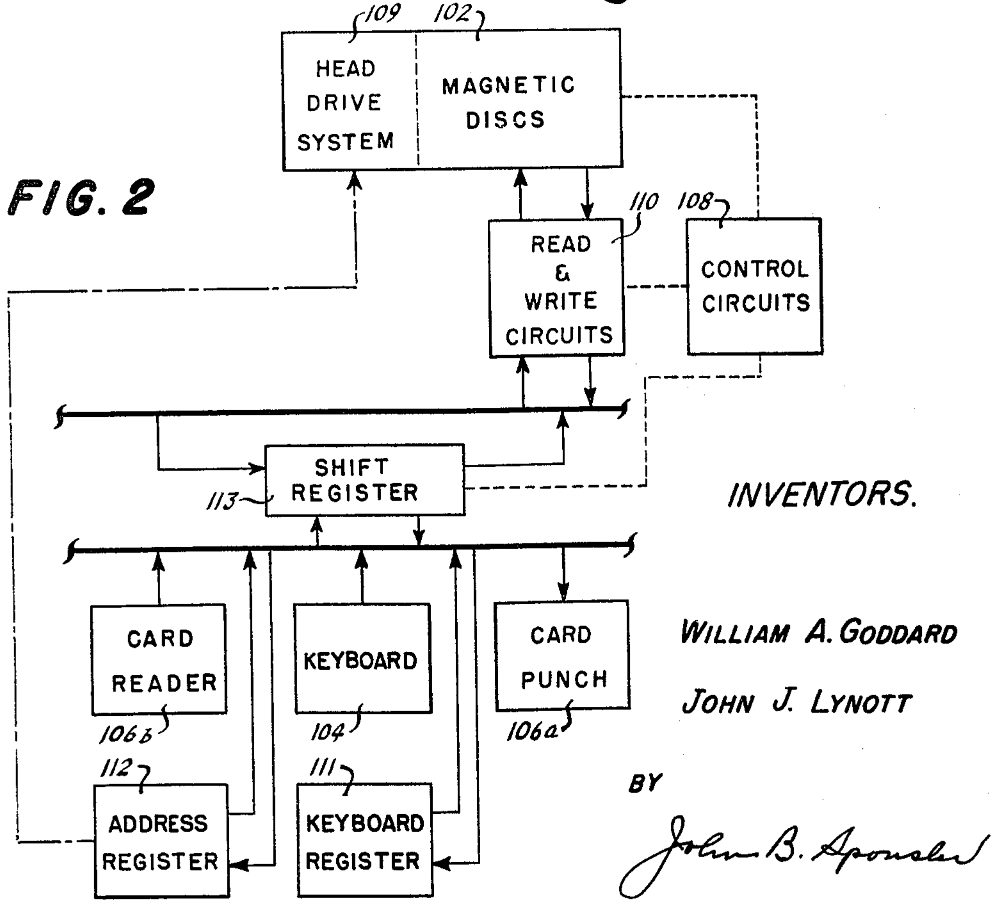
FIG. 2 is a block diagram illustrating the functional operation of the invention.

The basic operation of the machine described above can best be understood by reference to FIG. 2. The magnetic storage unit 101 includes, in addition to the discs 102, a head drive system 109, hereinafter described in detail, which essentially consists of a magnetic transducer arrangement for writing or recording upon and reading from the magnetic discs 102, together with mechanism for positioning the transducers at selected storage positions on the discs. Circuits providing information channels to the transducers to either read or write, hereinafter explained in greater detail, are indicated in the block 110 of FIG. 2. The record card printing-perforating unit 103, which essentially provides the initial data input to and the final data output from the storage unit 101, has as its principal components, each explained in detail below, a keyboard 104, a card punch 106*a*, a card reader 106*b*, a keyboard register 111, and an address register 112. A shift register 113, which forms the basis for the interchange of data between the input and output unit 103 and the storage unit 101, is also provided (hereinafter described in detail).

Normally all data entered into the machine is provided by perforated record cards via the card reader 106*b*. Similarly, all final output data is recorded into record cards by the card punch 106*a* and its associated printing unit (later to be described). Certain of the controls associated with the keyboard 104 permit original record cards to be prepared directly via the keyboard 104 and the card punch 106*a*; and, after being prepared in this manner, each record card is placed in the machine for the entry of data into the storage unit. Briefly, therefore, to enter data into storage, record cards with the necessary perforated data are placed in the card feed 105 and fed through the card reader 106*b* of the punching and sensing devices 106 so that the perforated data is sensed. A predetermined amount of the first data sensed (called an address) is delivered to the address register 112 which controls the head drive system 109 to position the magnetic transducers in the storage unit 101 to a selected storage position on the disc 102, the write circuit in block 110 being at this time energized. Thereafter, as the record card is fed past the card reader 106*b*, the remaining data sensed in that card is transmitted through the shift register 113 to the write circuit of block 110 and recorded magnetically upon one of the discs 102 at the selected storage position previously mentioned. Later, when it is desired to read out from storage the information which has been recorded at that selected storage position, a blank card is placed in the card feed 105, and the address corresponding to the first data, previously noted, is entered into the keyboard, the control circuits now being changed for the reading out of data from storage and the reading circuit of block 110 being energized. The address entered into keyboard 104 is transmitted to the address register 112 which controls the head drive system 109 to again position the magnetic transducers in the storage unit 101 to the selected storage position on the discs 102. Data previously recorded magnetically on the discs 102 at the selected position is thereafter sensed by the magnetic transducers, transmitted through the shift register 113 via the read circuit of block 110, and delivered to the card punch 106*a* so that as the blank record card is advanced by card feed 105 the information is recorded in the record card via perforations corresponding to those originally used for entering the data into storage. Various modifications of the operation above described, as hereafter explained, may be effected; however, essentially these operations follow a similar pattern of sequence and function.

As has been previously stated, the purpose of this invention is to provide a large capacity storage device for coded data represented by magnetized patterns in channels or tracks of a plurality of continuously rotating magnetic discs so that the location of any specific item of information stored thereupon can be quickly determined and the information corresponding thereto can be quickly ascertained. It is customary in most magnetic recording devices to employ transducers, which cooperate with the recording medium to record and read information, normally positioned along each recording path against or spaced away from the medium at a predetermined, fixed distance. Consequently, in a magnetic recording device employing a plurality of magnetic channels or tracks, ordinarily a magnetic transducer has to be provided to coact with each track. In the present invention a single transducer is capable of coacting with as many as 3200 magnetic tracks through the employment of a so-called "access" mechanism. A novel concept of this invention is the "access" mechanism as shown in FIGS. 3 and 4. The schematic arrangement of this access mechanism corresponds in part to the head drive system shown in block 109 of FIG. 2.

Referring to FIGS. 3 and 4, a plurality of magnetic discs 102 is mounted upon a shaft 121, fixed to which is a pulley 122 belt driven by a motor 123. Each disc 102 is capable of having magnetized upon it magnetic data patterns in a plurality of magnetic paths or tracks 124, each of which may carry different stored information. A rack 125 carries at its one extremity a magnetic transducer 130 for recording upon or reading from any one of the tracks 124 of a disc 102, the rack 125 being driven through a slide block 126 by a gear 127 fixed to a shaft 128, which is selectively driven by a motor 129. When data is to be entered on or read from a selected track 124 of a disc 102, the motor 129 is energized to rotate shaft 128 counterclockwise and the rack 125 is advanced to position the transducer 130 (see dash-dot lines of FIG. 3) to one of the tracks 124. A reverse rotation of the motor 129 will withdraw the transducer from its previous position to another track 124 nearer the periphery of the disc 102 (or to a position off the disc as shown by the solid lines of FIG. 3) so that access may be had to any selected track. Similarly, the block 126 is slidably supported jointly by a rod 135 and upon a bar 131 having rack teeth 132 engaging with a gear 133 fixed to a shaft 134 to which a pulley 136 is attached. A motor 137 is provided with a belt drive via idlers 138 (fixed) and 139 (attached to block 126) so that a clockwise rotation of pulley 136 will cause the block 126 to slide along the bar 131 to move the transducer 130 parallel with the axis of the discs 102 (in a direction toward the upper left corner of the sheet of drawing FIG. 4). In the last mentioned manner, therefore, the transducer 130 may be advanced from disc to disc of the discs 102, while in the previously mentioned manner the transducer 130 may be positioned to any track of any disc 102, so that in the combination of these functions any track position of any disc may be located or access provided to the transducer 130.

Referring again to FIG. 3, a second track-to-track access mechanism may similarly position a transducer 130 to any of the tracks 124 via the rack **125*a* and driving gear 127*a*, the block 126*a* being similarly positioned by a rod 135*a* and a bar 131*a* to be advanced by another disc-to-disc access mechanism as shown in FIG. 4. In other words, within the physical limitations of the design a plurality of access mechanisms may be placed at various radii of the disc 102** spaced from its periphery so that the same data may be read out by each access from the same track of the same disc or from different tracks of the same, or a different, disc to provide multiple access to the recorded data.

Figures 5A, 5B:
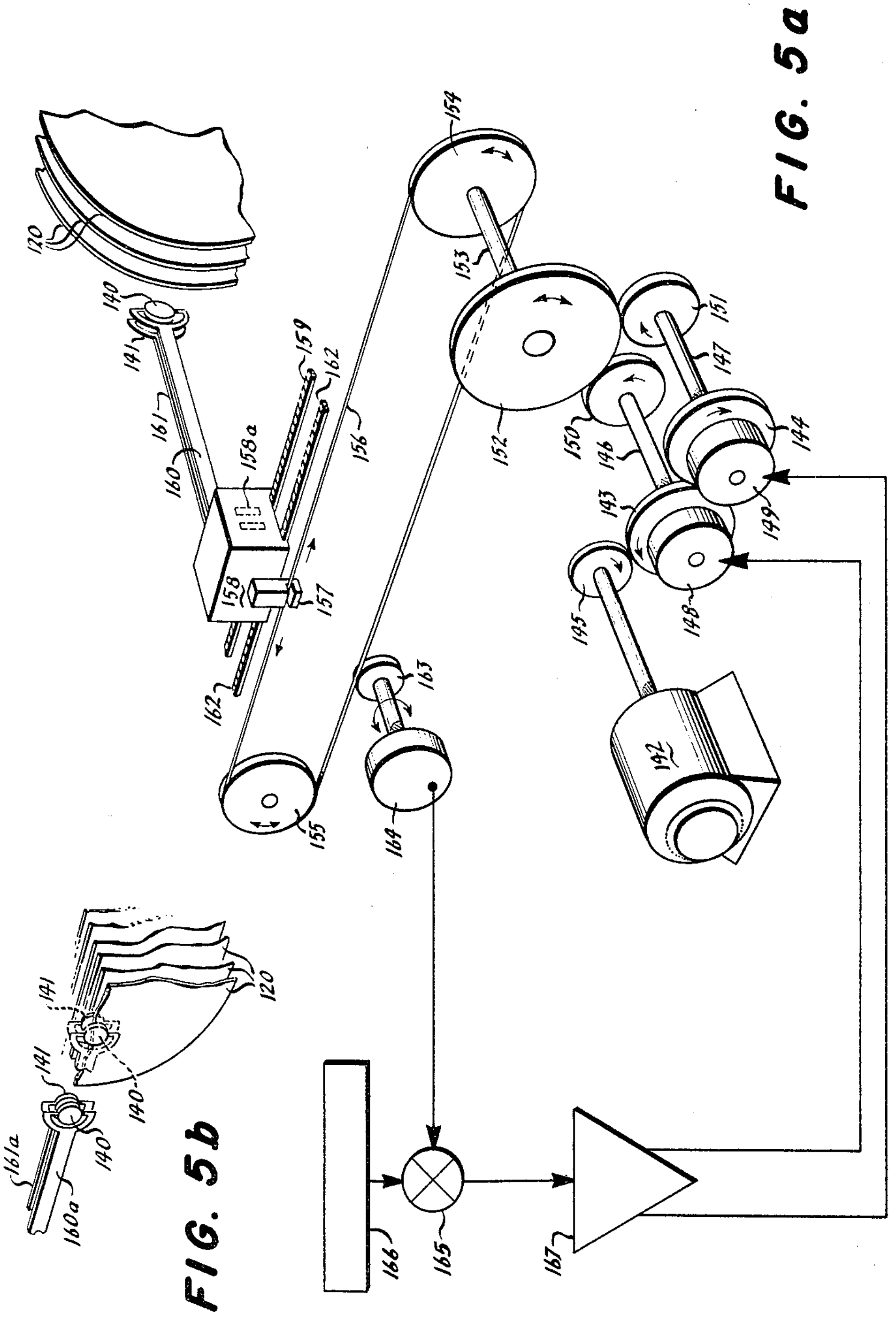

Although the fundamental operation of the access mechanism has been described above, a reference to FIGS. 5*a* and 5*b* will clarify the actual access or head drive system incorporated in the invention. In order to more effectively utilize an access mechanism in a magnetic disc storage device, it has been found more desirable to use two (2) magnetic transducers per access unit, one for each side of a disc 102, as in the transducers 140 and 141. A means is also required to index the track access position and the disc access position. The arrangement in FIGS. 5*a* and 5*b*, later described in detail, provides a reliable system for obtaining such index functions. Here, as before, the discs 102 are mounted on a common shaft and continuously rotated. FIG. 5*a* illustrates the disc-to-disc access wherein a motor 142 constantly drives a pair of gears 143 and 144 loosely mounted on shafts 146 and 147, respectively, in opposite directions via a drive gear 145. A pair of electromagnetic clutches 148 and 149 are attached respectively to shafts 146 and 147, which also have affixed thereto the respective drive gears 150 and 151 commonly engaging a driven gear 152. A shaft 153 to which the gear 152 is fixed also carries a pulley 154 which cooperates with another pulley 155 (idler) to carry a drive belt 156 fastened to a clamp 157 carried by a movable block 158 (somewhat similar to the block 126 of FIG. 4). The block 158 is slidably supported upon the rails 159 and 162 (the latter being provided with a detenting mechanism later described herein) and carries the arms 160 and 161 on which the aforementioned transducers 140 and 141, respectively, are supported. Also coacting with the belt 156 is a pulley 163 connected to the shaft of a potentiometer 164 so that the latter has a different resistance setting for each position of the block 158.

A direct current power supply (not shown) is provided so that the potentiometer 164 is enabled to deliver potentials to an arm of a bridge circuit 165 in such a manner that a different voltage is delivered for each different position of the block 158. An opposing arm of the bridge circuit 165 is supplied with D.C. potential from a control source 166 so that when the potentiometer voltage and the control voltage are algebraically equal to zero the output of the bridge circuit to an amplifier 167 is zero. However, if the potentiometer voltage exceeds the control voltage, the amplifier 167 delivers current to operate the magnetic clutch 148 so that it and the shaft 146, together with gear 150, rotate gear 152 clockwise, thereby rotating pulley 154 in the same direction of rotation, and the block 158 is moved toward the lower right corner of FIG. 5*a*, thereby reducing the voltage of potentiometer 164 until it matches the control voltage from source 166. When this condition occurs, the amplifier 167 ceases to supply any further current to clutch 148 which disengages and the gear 150 stops driving gear 152, thereby halting further movement of block 158, and the position of the block 158 with respect to the discs 102 corresponds to the value of the control voltage derived at source 166. By a similar functioning the block 158 is moved in the opposite direction when the control voltage is greater than the potentiometer voltage so that the amplifier 167 delivers current to the clutch 149.

The same arrangement as described for disc-to-disc selection or disc access may be used for track-to-track selection or track access by visualizing the roots of the arms **160*a* and 161*a*** (see FIG. 5*b*) connected to the block 158 at the location (dotted) **158*a***.

Before proceeding further with the detailed description of the invention, it is essential to understand the magnetic record which forms the heart of the data storage system thereby provided. Essentially, this record is made upon a continuous circular path or track of a magnetic disc surface. Recording is performed magnetically in a manner referred to as non-return-to-zero recording as described in a copending application Ser. No. 264,341, filed Dec. 31, 1951. Each continuous track or path of each magnetic disc surface may contain a total of 2,530 recorded magnetic bit spaces of which 2400 bits are used for recording alphabetical or numerical data and 130 bits may be used for separation or spacing between records, as illustrated in FIG. 6. Each continuous track may be divided into four sectors, A, B, C and D, each corresponding to a record having 75 data character positions of 8 bits each with a space of 10 bits between each sector and an additional space of 90 bits between sectors A and D for indexing the beginning of each recorded track. Each character of 8 bits utilizes 6 of these bits for recording alphabetical or numerical data in coded bit groups, one bit for checking purposes, and the final bit of the 8 bits for providing a space between successive characters of each record. In the preferred embodiments herein described, 32 discs each having 200 tracks (100 tracks per side) are employed, thereby providing a capacity of 800 records of 75 characters each per disc or a total of 25,600 records (corresponding to a total of 1,920,000 characters) storage capacity. It is obvious that by the addition of more discs or by recording additional tracks upon the discs, or both, the storage capacity can be greatly expanded. Also, there is normally employed a single additional magnetic disc containing upon one of its sides a so-called timing track, in the described embodiment, delivers 2400 pulses per revolution (see FIG. 7).

Information is recorded magnetically upon the magnetic disc tracks in the manner referred to above by coded groups, each group being representative of a number or alphabetical or special character. The character to be represented is coded according to an 8-bit code (per character) comprising the following: the 1st bit of each character represents the numeral "1," the 2nd bit of each character represents the numeral "2," the 3rd bit of each character represents the numeral "4," the 4th bit of each character represents the numeral "8," the 5th bit of each character represents zero, the 6th bit of each character represents a zone "Z," the 7th bit of each character represents a designation for checking, and the 8th bit is used to provide a "space" between successively recorded characters. For example, a numerical character having a value of "1" is represented by the 1st bit being magnetized, a numerical character having a value of "5" is represented by the 1st and 3rd bits being magnetized. Alphabetical characters are represented by combinations of the first four bits and the 5th and 6th bits. Since the 8th bit of each character is always a space, it is obvious that, instead of the aforementioned division of each record track into four parts or sectors as shown in FIG. 6, the track may be subdivided into parts at any character "space" bit. Actually, this mode of operation is employed in the present invention, as hereinafter further explained As previously explained, the input and output to and from the magnetic storage unit is effected via well known perforated record cards, which for the preferred embodiment shown herein are of the 80 column type wherein each column contains one recorded data character. For purposes of control, however, the first five columns of each record card contain address information relating to the storage location of the fllowing 75 characters of actual storage data corresponding to one record (a sector A, B, C or D) in the magnetic storage unit. Essentially, the address of each record in the magnetic storage unit involves (1) the selection of the proper disc, (2) the pertinent side of the selected disc, (3) the particular track of the pertinent side, and (4) the selected record (i.e., sector A, B, C or D of FIG. 6) of the particular track. Information in the first five columns of each record card is consequently directed to the functions just enumerated, substantially as shown in FIG. 7; namely, the first column contains directions as to the selected record, the second and third columns directions as to the selected disc and to the pertinent side thereof, and the fourth and fifth columns directions as to the particular track. For example, see Record Card AA of FIG. 7 where the perforated address indicates that the information is to be placed or read from the 3rd record of the 25th disc ("odd" side) at the 16th track, or Record Card BB of FIG. 7, which has the address for the 4th record of the 12th disc ("even" side) at the 19th track. A perforation in the "1's" position of the 3rd column will always result in the "odd" side of the pertinent disc being selected while the absence of recorded indicia in the "1's" position of the 3rd column will always result in the "even" side of the pertinent disc being selected. The terms "odd" and "even" as used in this respect are arbitrary, referring respectively to corresponding sides of each disc in the complete array of discs 102 such as shown in FIG. 4. A novel arrangement for selecting the "odd" or "even" side of a disc is provided via the structure of FIGS. *5a* and *5b* wherein the transducers 140 and 141 in the operated position straddle each magnetic disc 102 so that the "odd" side is always recorded or read by transducer 140 and the "even" side by transducer 141; consequently, a perforation in the appropriate position of the entry record card merely energizes one or the other of the transducers to effect selection of the appropriate side of the disc which is to be addressed.

Although no part of the invention hereinafter claimed, it is appropriate to point out that the transducers 140 and 141 are substantially of the type claimed and described in copending application Ser. No. 407,214, filed Feb. 1, 1954, and now abandoned, and Ser. No. 406,011, now U.S. Patent No. 3,213,461, filed Jan. 25, 1954.

The principal components of a machine embodying the invention are hereinafter described in detail under appropriate headings as follows:

(a) The Memory Unit (describing most of the mechanical assemblies of the machine including the magnetic disc assembly, the track-to-track and disc-to-disc access apparatus, the motive power and air supplies, the servomechanism for the access apparatus, and the normal cooperation among these assemblies).

(b) The Servomechanism Control Circuits (describing the address circuits which control the positioning of the transducers and the operation of the access apparatus).

(c) The Data Control Circuits (describing the data entry means circuits, the data control and address control, the recording and read-out control, and the operation and timing of the various circuits associated therewith as well as the data control circuits per se).

THE MEMORY UNIT

The memory unit is illustrated in FIGS. 9–15 inclusive, and is substantially contained within a base frame 201 and an upper frame (see FIG. 9), referred to hereafter as main frame 203, attached to frame 201 via four shock absorbing mounts 204. The base frame 201 is provided with four casters 202 to provide mobility for the complete assembly. The main frame 203 is provided with two channel members 205 and 206, two spreaders 207, and the inboard, outboard, and lateral ways 208, 209 and 210, respectively, upon which most of the operating mechanism is mounted.

Referring also to FIG. 14, a plurality (normally 50) of magnetic discs 228 is mounted on a shaft 211 supported at one end by a split bearing housing 212, cap 213, and holding bolts 214 enclosing a bearing 218. The other end of the shaft 211 is supported in a bearing 220 contained in a housing 215 having a yoke 216 for pivotally supporting the housing via a pin 217. The yoke 216 is directly secured to the channel member 205. The shaft 211 is provided with a cylindrical collar 223 having an outside diameter substantially equal to the inside diameters of the discs 228 for supporting and rigidly holding the discs on the collar 223 between a flange 224 and a clamping ring 230 with a spacer 229 being provided between each two discs 228. A pair of cap bolts 219 normally retaining the bearing cap 213 may be removed so that the shaft 211 may be pivoted (see FIG. 9) for the removal or exchange of the discs 228; consequently, magnetic discs having recorded information thereon may be placed physically in dead storage or withdrawn therefrom for reentry into the active storage of the memory unit.

With reference to FIG. 9, a constant speed motor 232 is mounted on a platform 240 attached to the lower part of the frame 201 for providing motive power to the disc shaft 211 and other rotating components of the machine later described. A pulley 236 on shaft 234 of motor 232, via belts 239, 226, 343, counter shafts 245 and 347, and pulleys 244, 247, 342, is provided to drive the pulleys 341 and 225, the last mentioned pulley being fixed to shaft 211 whereby the discs 228 are rotated. The motor 232, which runs continuously, is provided with the customary switch control 238 and also an overload circuit interrupter 233, which is susceptible of operation upon failure of the air pressure in an air supply line 286 supplying air to control the positioning of magnetic transducers 278 cooperating with the discs 228.

With reference to FIG. 10 and FIG. 11, the inboard way 208 and outboard way 209, extending between the main frame channels 205 and 206, are on a common horizontal plane and are provided with a top inboard reference surface 248 on way 208 and an outboard reference surface 249 on way 209. These surfaces are polished to have perfectly smooth reference surface which are exactly parallel with the center areas of the shaft 211. The inboard way 208 and the outboard way 209 also have take-up surfaces 250 on the underside of surfaces 248 and 249. A carriage 251 (also see FIG. 9), having an upper carriage 252 and a lower carriage member 253, is arranged to move along the longitudinal axis of the reference surfaces 248 and 249. Two carriage inboard reference rollers 254, journaled on the lower carriage 253, ride on the surface 248; and two similar outboard carriage reference rollers 255, also journaled on the lower carriage 253, ride on the surface 249. Two spring-loaded rollers 256 are supported from the lower carriage 253 by a roller arm 257, and are arranged to ride against the under surface 250. A roller arm spring 258 urges the roller upwardly against the surface 250, thereby rendering greater pressure between the rollers 254, 255, and surfaces 248, 249 to insure a more horizontally linear travel of the carriage 251 between channels 205 and 206.

Control of lateral variations of the carriage with respect to the center axis of the disc shaft 211 is obtained by two reference rollers 259, journaled on the lower carriage 253, which ride on a lateral reference surface 260 on the outboard side of the lateral way 210. The surface 260 is at right angles to reference surfaces 248 and 249 and is also highly polished and exactly parallel with the center axis of the shaft 211. A take-up roller 262 is affixed to the lower carriage 253 by a take-up arm 263 so as to ride against a take-up surface 261 on the inboard side of lateral way 210. The roller 262 is spring urged against the surface 261 by take-up spring 264 attached to the take-up arm 263, which causes sufficient pressure between the reference rollers 259 and the lateral reference surface 260 to insure a constant load therebetween. The carriage 251 is thus arranged to travel in a path along the inboard way 208 and outboard way 209 while maintaining an identical relative position to the center axis of the shaft 211.

The inboard extremity of the upper carriage 252 is provided with an arm pivot yoke 265 through which a pivot pin 266 connects to a pivot yoke support 267 on the inboard extremity of the lower carriage 253. The outboard ends of the upper and lower carriages 252 and 253 are interconnected by an arm adjustment screw 268 which screws into an adjustment nut 269 fixed to the upper carriage 252 and an adjustment nut 270 fixed to the lower carriage 253. The relative vertical position of the upper carriage 252 with respect to the lower carriage 253 is adjustably determined by the setting of screw 268.

Referring to FIG. 15 a head arm 271, having two parallel arm side plate members 241 spaced apart by spacers 242, is slidably mounted on the upper carriage 252 against two arm reference rollers 272 above the arm 271. The rollers 272 ride on an arm reference surface 273 on the upper part of arm 271 over each spacer 242. An arm take-up roller 274 is mounted on the upper carriage 252 below the arm 271 and is spring urged upwardly against a take-up surface 276 on the underside of the members 241 by a roller take-up spring 275. Thus, the arm 271 is slidably mounted on the upper carriage 252 to move in toward the shaft 211 (see also FIGS. 10 and 11).

A magnetic head 278 is mounted by a head gimbal 277 and a pivot pin 279 to the inboard extremity of each side plate member 241 of the arm 271 in such a way that the face of the head may move freely to conform to any physical irregularities of the surface of the discs 228 with which it is brought into contact. The magnetic heads 278 are of the air bearing type wherein the heads are spaced from the recording surface by air which is forced between the head and the recording surface from an external air supply through holes provided in the face of the head. The heads 278 are brought into contact with the recording surface when the arm 271 is moved toward the shaft 211 so that in the operating position the heads straddle each a disc 228. A head spacer wedge 344 is mounted on the upper carriage 252 between the two gimbals 277 to spread the heads 278 apart while they ride on the arm 271 into the disc area.

Referring to FIG. 9, air is supplied to the heads through an air line 280 which connects to the air heads 278. The air line 280 leads through a conduit 281 (FIG. 15) into an air manifold 282 and the circuit breaker 233. Manifold 282 is supplied with air through an air tube 286 and an air filter 284 from an air supply 283, and an air manifold valve 285 is provided in manifold 282 to control the flow of air to the heads 278. Referring to FIG. 11, the conduits 281 are supported from the arm 271 by brackets 288 and sleeves 287.

Referring to FIG. 15, a V-shaped head arm lockout seat 289, mounted on the side of the arm 271, is arranged to receive a head arm lockout pawl 290 when the arm is in the home position. The home position is the position wherein the arm 271 is located at the outboard extremity of its limit of travel. The lockout pawl 290 is an extension of a pawl actuating arm 291 which is pivotally mounted on a pawl pivot pin 292. The pawl 290 may be rocked into and out of engagement with the pawl seat 289 on pin 292 and is spring urged in the locking position by a pawl return spring 293. A pawl arm actuating cylinder 298 is mounted to the upper carriage 252, which has a piston 301 within the cylinder 298 for moving the arm 291 out of engagement upon application of air to the cylinder. The cylinder 298 is pneumatically operated from air supplied through a detent air line 299 and is controlled by a solenoid 300. The air actuating cylinder 298 thus forces the arm 291 out of the engaged position under the control of the solenoid 300 which is, in turn, controlled by an electrical circuit which is hereinafter explained in connection with FIGS. 18*a* and 18*b*.

With continued reference to FIG. 15, the pawl actuating arm 291 also has a detent pawl 294 which protrudes upwardly from an extension of the arm 291. When in the engaged position, the pawl 294 will engage with track detent seats 309 formed by grooves of a screw in a detent rod 306 which in turn is mounted between the side plate members 241 of the arm 271. An adjustment nut 307 is employed to mount the rod 306 to the arm 271. The rod 306 may be turned in the nut 307 to adjust the position of the detent seats 309 with respect to the detent pawl 294 and the arm 271.

When the arm 271 is moved to the home position, the lockout pawl 290 engages with the lockout pawl seat 289 to lock the arm 271. When the arm 271 is in other than the home position, the detent pawl 294 engages with the nearest track seat 309, which effectively registers the heads 278 in discrete positions in relation to any one of the discs 228 as shown by FIGS. 9 and 11.

An interlock actuating arm 295 extends from the lower side of the arm 291 to close an arm detent microswitch 296 when the arm is in the disengaged position and to open a normally closed hold coil microswitch 297 when the arm is in the engaged position. Both switches 296 and 297 are affixed to the side of the upper carriage 252 and are used in combination with an electrical circuit which is hereinafter described in connection wth FIGS. 18*a* and 18*b*.

A track address potentometer 310 is mounted on the upper carriage 252 to register a relative resistance which is an analog of the position of the arm 271 with respect to the carriage 251, as hereinafter explained in connection with FIGS. 16*a* and 16*b*. The potentiometer 310 has a non-backlash pinion 311 concentric to the potentiometer shaft 305. A rack 312 is mounted on the arm 271 between the side plate members 241 to engage with the pinion 311 and move the pinion 311 and potentiometer shaft 305 with movement of the arm 271. A normally open track limit microswitch 303 is mounted on the upper carriage 252, which is closed when the arm 271 is in the home position.

The detent mechanism for the locating of a specific disc is best illustrated by FIG. 12 where a row of detent teeth 317 is arranged on a detent bar 318 suspended from detent pivot arms 319 pivotally mounted to pivot arm brackets 320 by a pin 321. The brackets 320 are mounted to a back plate 329. A detent drive pin 323 extends from one pivot arm 319 which, when moved, forces the detent bar 318 to engage one of the teeth 317 into a carriage detent seat 316 which is mounted on the underside of the lower carriage 253 (FIG. 11). The teeth 317 and the seat 316 are arranged so that, for every detent position wherein a tooth 317 is in engagement with the seat 316, the carriage 251 will be in a discrete position, wherein the two heads 278 (FIG. 11) will exactly straddle a predetermined disc 228. The detent drive pin 323 is driven into the detent and nondetent positions through an adjacent connecting rod 326 joined to the pin 323 by a rod end bearing 324. The other end of the rod 326 is attached to an eccentric housing 325 which in turn houses an eccentric 327. The eccentric 327 rotates with a detent drive shaft 328 supported by the back plate 329 and a front plate 345. One-half of a revolution of the shaft 328 and the eccentric 327 causes the teeth 317 to rock into either the engaged or the disengaged position.

The shaft 328 is driven by a detent drive gear 330 concentric to it, which in turn is driven by a detent drive pinion 331 of one-half the diameter of the drive gear 330 to obtain a 2:1 ratio between the two gears. The pinion 331 rotates on a spring clutch drive shaft 332 which is supported by the front plate 345. The shaft 332 is driven by a carriage detent drive belt 334 which drives a carriage detent driven pulley 335 and which is driven by a carriage detent drive pulley 337 (FIG. 12). A spring clutch 333 is concentric to the shaft 332, which will prohibit the shaft 332 from rotating unless the clutch 333 is released by a solenoid 336. The solenoid 336 is energized by pulses from a circuit hereinafter explained in connection with FIG. 18*a*, and when pulsed the clutch 333 is arranged to allow the shaft 332 to make one revolution. Each pulse to the solenoid 336 thus causes the pinion 331 to drive the shaft 328 one-half a revolution, which is timed with the eccentric 327 to produce either a maximum or minimum displacement of the connection rod 326, therein causing either the engagement or disengagement of the teeth 317 with the seat 316. As shown in FIGS. 11 and 12, a normally open disc detent microswitch 348 is closed by the arm 319 when the teeth 317 are in the fully disengaged position. A normally closed microswitch 349 is similarly provided on the other side of the arm 319 to be open when the teeth 317 are in the fully engaged position.

A disc address potentiometer 313 (see FIG. 11) is attached to the lower carriage 253 so that its shaft 346 extends vertically downwards from the carriage 251 carrying a drive pinion 314 (FIGS. 9 and 11) which is arranged to ride engaged in a potentiometer drive rack 315 mounted on the top surface of the lateral way 210. By this arrangement, the potentiometer 313 produces an electrical value which is an analog of the lateral position of the carriage 251 on the ways 208 and 209, as is hereinafter explained in connection with FIGS. 16*a* and 16*b*.

Referring to FIG. 9, a main clutch drive pulley 341 is driven from the idler shaft 245 via an idler belt 343, a clutch drive idler 342 on a clutch drive idler shaft 347, and a main clutch drive belt 340. The main clutch drive pulley 341, as shown in FIGS. 10 and 11, drives a bevel gear 339 which in turn drives a cross shaft 338, which also turns a clutch drive gear 350, rotating a right clutch housing gear 351 which is directly attached to a magnetic clutch 352. The gear 351 in turn rotates a left clutch housing gear 354 similarly attached to another magnetic clutch 353. The right clutch 352 has an output pinion 355, and the left clutch has an output pinion 356, which are counter-rotating with respect to each other. The right and left pinions 355 and 356 both drive a gear 357 which drives a shaft 369 upon which a capstan 358 is mounted. The drive gear 357 and capstan 358 may be driven in either a clockwise or a counterclockwise direction according to which magnetic clutch 352 or 353 predominates as explained hereafter.

A tachometer 377 is provided with its armature 378 arranged to rotate with the capstan drive shaft 369 so that a positive voltage is produced when the shaft 369 is rotated by the right clutch 352 and a negative voltage when rotated by the left clutch 353. The voltage in either case rises linearly with the speed of rotation of the shaft 369.

Referring to FIGS. 10, 11 and 13, the capstan 358 engages with an endless cable 359 so that the cable is moved as indicated in FIG. 13 when the respective clutches 352 and 353 drive the capstan 358. The cable 359 is arranged to pass from the capstan 358 to a take-up pulley 360 mounted on the lower back plate 329, and then travels to a left end pulley 361, which is mounted on the upper back plate 329 near the left channel 206. From pulley 361 the cable 359 travels to a lower carriage pulley 363 on the left underside of the lower carriage 253 to an inboard head arm pulley 364 on the left inboard side of the arm 271 to an outboard head arm pulley 365 on the left outboard side of the arm 271. The cable 359 is then anchored by an arm cable anchor 368 to the arm 271 and returned to the capstan 358 via a right carriage pulley 366 on the right-hand underside of the carriage 251 and a right end pulley 362 mounted on the upper portion of the back plate 329 near the right channel 205 through a second take-up pulley 367 on the lower back plate 329. When the cable 359 is pulled to the left by the capstan 358, the carriage 251 is forced to the right and the arm 271 is forced in an outboard direction. During normal operation, however, either the arm 271 or the carriage 251 may be locked into position by the pawls 290 and 294 or the teeth 317.

As shown in FIG. 9, a bracket 370 is mounted on the main frame channel 205 upon which a gimbal arm 371 is pivotally mounted. A magnetic head 373 is mounted in a gimbal 372 carried on the end of the arm 371. The face of the head 373 is arranged to ride against the face of a timing track disc 374 and is held apart from the disc by a minute film of air emitted from holes on the face of the head. The head 373 is similar to the magnetic heads 278 (FIGS. 10 and 11) and is supplied with air from an air hose 375. Air hose 375 receives its air supply from the manifold 282. The head 373 coacts with a single radial timing track on the disc 375 and is also supplied with wires 376 which lead to two lines 719 and 720 to an amplifier, as is hereinafter explained.

Figures 18A, 18B:
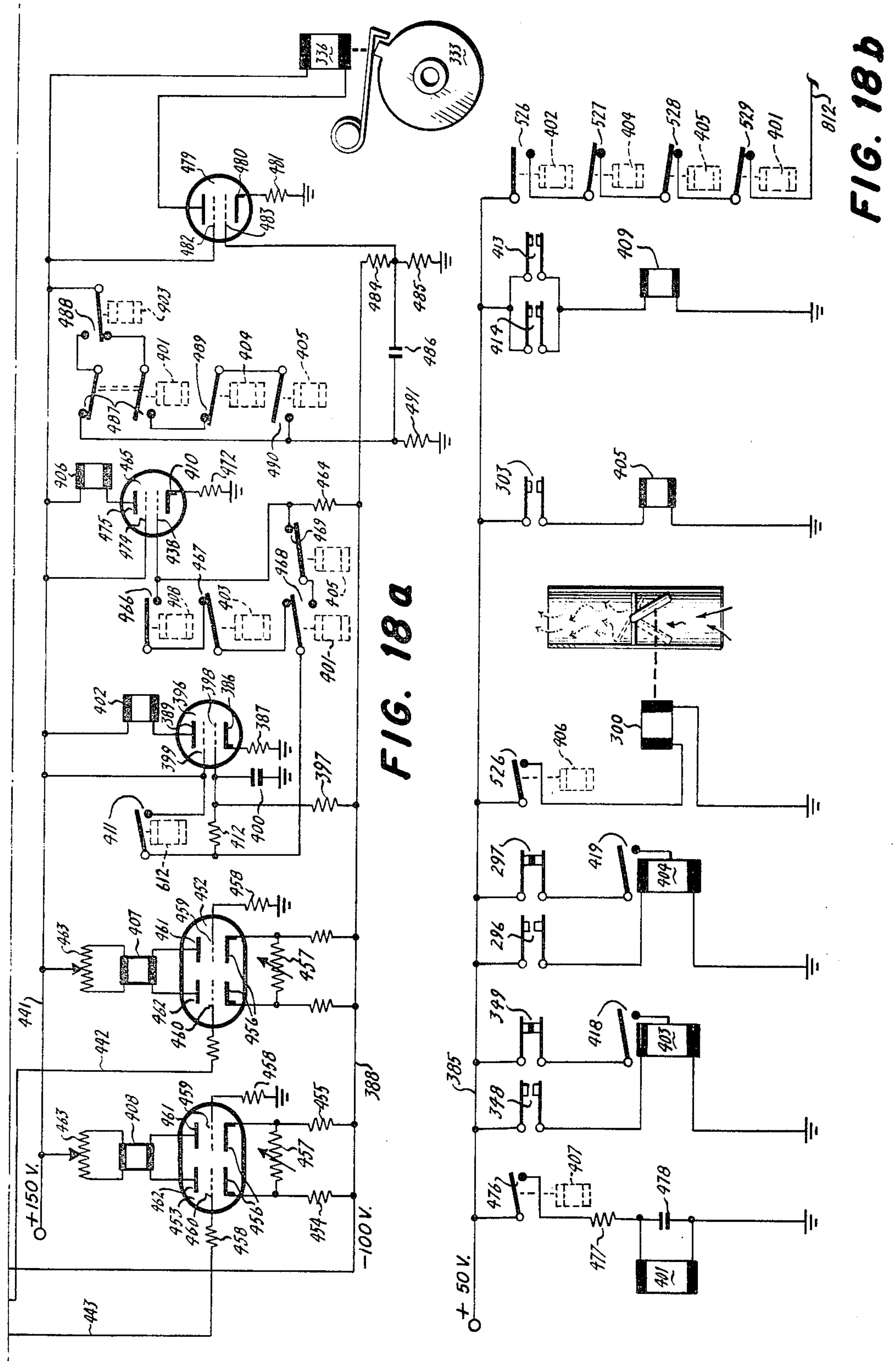
Figure 19:
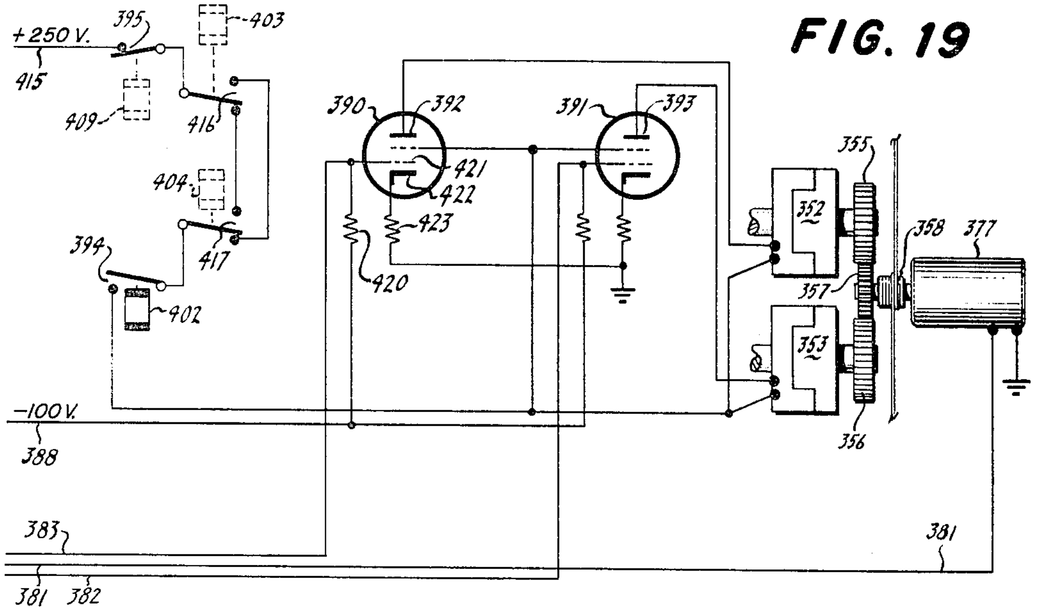

Referring to FIG. 19, the right clutch 352 is energized by an amplifier tube 390, and the left clutch 353 by an amplifier tube 391, potential being supplied via a circuit from line 415, n/c contacts 395, contacts 416, contacts 417, n/o contacts 394 to clutch windings of clutches 352 and 353 and their respective control tubes 390 and 391. Also referring to FIGS. 18*a* and 18*b*, the relay 402 is energized by a power amplifier tube 396, and is supplied with a 150 volt plate potential from a line 441 through the relay coil of relay 402 to the plate 389 of tube 396.

A cathode 386 of tube 396 is grounded via a resistor 387. A −100 volt potential from line 388 is supplied through a grid return resistor 397 to a control grid 398 of the tube 396, and the tube screen grid 399 is supplied with +150 volt potential from line 441. The control grid 398 is rendered positive from the 150 volt line 441 through contacts 411 of relay 612, the operation of which is hereinafter completely described, and through a limiting resistor 412. A condenser 400 leads from the control grid 398 to ground. The condenser 400 functions as a delay element so that when the line to the control grid is rendered positive, there will be a predetermined delay before grid 398 will be driven sufficiently positive to cause the tube 396 to conduct.

In FIGS. 9 and 18*b* two limit switches 413 and 414 are provided on the extreme ends of the lateral way 210 near the right main frame channel 205 and the left main frame channel 206, which are normally open and will close when the carriage 251 exceeds a safe travel limit to the right or to the far left. If either switch 413 or 414 is closed, relay 409 is energized, and contacts 395 are opened, which cuts off the plate power to the amplifiers 390 and 391 (FIG. 19) and any energizing potential to the clutches 352 and 353, thereby protecting the carriage drive mechanism should the carriage control mechanism fail. Referring again to FIG. 19, the amplifiers 390 and 391 also have contacts 416 of a relay 403 and contacts 417 of a relay 404 in series with the relays 409 and 402. The contacts 416 and 417 are arranged to provide a circuit only when relay 403 is energized and relay 404 is not energized, or when relay 403 is not energized and relay 404 is energized. Relay 403 is in a relay energizing circuit (see FIG. 18*b*) supplied with a potential of 50 volts from a line 385 through the n/o disc detent microswitch 348 (FIGS. 12 and 18*b*) which is forced closed by the carriage detent pivot arm 319 when the carriage detent teeth 317 are fully disengaged from the carriage detent seat 316. The relay 403 has a hold coil which is supplied with 50 volts from line 385 through n/o contacts 418 of the relay 403 and the n/c disc hold coil microswitch 349. Microswitch 349 is forced open by the detent pivot arm 319 when the teeth 317 are in full engagement with the detent seat 316. The relay 403 is, therefore, picked up when the detent teeth 317 are in full disengagement and will remain energized by its hold coil until microswitch 349 is opened when the detent teeth 317 are in full engagement with the detent seat 316.

Relay 404 is of the same type as relay 403, having a pick-up coil and a hold coil. The pick-up coil is energized via line 385 and the n/o arm detent microswitch 296 (FIGS. 15 and 18), which is closed by the interlock actuating arm 295 when the arm lockout pawl 290 is fully disengaged. The hold coil receives its 50 volt supply from line 385 through n/o contacts 419 of relay 404 and the arm hold coil detent microswitch 297, which is opened by the interlock actuating arm 295 when the detent pawl 294 is returned to the engaged position. The hold coils on relays 403 and 404 are provided to prevent a premature deenergization of the relays before either the pawls 290 and 294 (FIGS. 13 and 15) or the detent teeth 317 (FIGS. 12 and 13) are fully detented. Now referring to FIG. 19, the power amplifier tubes 390 and 391 are of a conventional D.C.-coupled amplifier design, having a 250 volt plate and screen voltage from line 415. A −100 volt potential from line 388 is provided through a grid load resistor 420 to a control grid 421 of each power amplifier tube 390 and 391, and a cathode 422 of each tube is connected through a cathode resistor 423 to ground. The tubes are biased to be conductive when a positive voltage is applied to the grids 421 from a disc servo amplifier 424 or a track servo amplifier 425 (see FIG. 17) via lines 383 and 382, respectively. Referring to FIG. 17, the outputs of the disc servo amplifier 424 and track servo amplifier 425 drive the power amplifiers 390 and 391 through contacts 426 of the relay 403 so that the output from the disc servo amplifier 424 is coupled by lines 382 and 383 to the power amplifiers while the relay 403 is energized, and the output of the track servo amplifier 425 is coupled to the power amplifiers while relay 403 is not being energized.

The disc servo amplifier 424 and the track servo amplifier 425 both are four-stage direct coupled differential amplifiers. Each stage of each servo amplifier utilizes a twin triode as shown in FIG. 17. The first stage 530 of each servo amplifier is the input stage, the first triode section of which is driven by the address error voltages, and the second triode section of stage 530 is driven by the output of the tachometer 377 (FIGS. 11 and 19) from line 381. The first stage 530 drives two intermediate stages 531 and 532, and the intermediate stage 532 drives a fourth or output stage 533. The fourth stage 533 is arranged so that the first triode section of either servo amplifier 425 or 424 drives the amplifier 390, and the second triode section drives the amplifier 391. In all stages 530, 531, 532 and 533, a first section plate 428 and a second section plate 429 of each tube connect through a plate load resistor 430 to the +250 volt supply of line 415. First and second section cathodes 431 and 432 of each tube have a common cathode connection to a cathode resistor 433, which in turn is connected to the −100 volt line 388. The first section plate 428 of the first three stages 530, 531 and 532 connects through a resistor 434 and a grid voltage limiting resistor 446 to a first section grid 436 of the next succeeding stage; and a resistor 435 connects between resistors 434 and 446 to the −100 volt line 388. The first section grid 436 of the first stage 530 is driven through a grid limiting resistor 438 to the error voltage supply, hereinafter explained in connection with FIGS. 16*a* and 16*b*, via a line 443 and a line 442.

The tachometer 377 (FIG. 19) output is fed via line 381 to contacts **426*c* of the relay 403 to couple the tachometer 377 to the disc servo amplifier 424 when the relay 403 is energized and to couple the tachometer 377 to the track servo amplifier 425 when the relay 403 is not energized. The tachometer 377 connects to a second grid 437 of the first stage 530 through a grid current limiting resistor 439 and through resistor 440 to ground. The tachometer 377** (FIGS. 11, 16*a* and 16*b*) is arranged to supply a positive voltage to the second section grid 437 of the first stage 530 when the capstan 358 is driven by the right clutch 352 and a negative voltage when the capstan 358 is driven in the opposite direction. The voltage provided by the tachometer 377 is therein an analog of the movement of the capstan 358. With continued reference to FIG. 17, the second section grid 437 of the last three stages 531, 532 and 533 of the amplifiers is supplied with a grid bias voltage through a resistor 444 connected to a resistance divider of resistors 445 and 446 connected between the −100 volt line 388 and the +250 volt line 415. The amplifiers 424 and 425 are biased to provide a minimum variation of output voltage resulting from variations of power voltages from lines 415 and 388 and yet show a high output when there is a variation of voltage to the first section grid 436 as compared with the second section grid 437 of any stage. The first plate 428 of the last stage 533 of both amplifiers 424 and 425 connect through a resistance divider of resistors 430 and 448 to a resistor 447, a variable resistance 449, and contacts **426*a* of relay 403 to the power amplifier 390 via line 383. The second plate 429 of the last stage 533 connects through a resistor 450, a variable resistance 451, and the relay contacts 426*b* of relay 403 to the grid of the power amplifier 391 via line 382. The variable resistances 449 and 451 are provided to compensate for any unbalanced condition between the output of the first plate 428 and second plate 429 so that the output voltage to the amplifiers 390 and 391 are equal when the first and second grid voltages of the first stage 530** are equal.

When a positive error voltage is applied to the first grid 436 of the first stage 530, the first plate 428 will draw more current than the second plate 429, which ultimately delivers a positive voltage via line 383 to the amplifier 390 causing the amplifier 390 to energize the clutch 352. When a negative error voltage is applied to the first grid 436 of the first stage 530, the first plate 428 will draw less current than the second plate 429, which similarly provides a positive voltage via line 382 to amplifier 391.

Referring to FIGS. 16*a*, 16*b* and 18*a*, the track error voltage and the disc error voltage, in addition to driving the disc servo amplifier 424 and the track servo amplifier 425, also drive a track null amplifier 453 and a disc null amplifier 452. The disc null and the track null amplifiers are also both twin triode tubes. A cathode 456 of each triode of the null amplifiers connects to the −100 volt line 388 through resistor 454; and the cathodes 456 of each null amplifier are interconnected by a variable resistance 457. A resistor 458 connects a second section grid 459 of the amplifiers 452 and 453 to ground. The first section grid 460 of the amplifier 452 connects to the disc error signal network by a line 442, and the first grid 460 of the amplifier 453 connects to the track error signal network by a line 443. Each triode is biased to conduct an equal current when a zero or null error signal is applied to the first grid 460. When the grid voltage rises, the first triode will have a greater output than the second; and when the grid voltage falls below zero, the second triode will have a greater output than the first triode. The disc null amplifier 452 has a relay 407 in the plate circuit which has two oppositely wound coils, one in the plate circuit of the first triode and the other in the plate circuit of the second triode, connected so that relay 407 will pick up as a result of the differential action of the respective anode currents. A plate equalization potentiometer 463 is arranged across the relay 407 which, when adjusted in combination with the variable resistance 457 across the cathodes 456, enables an equalization of the triodes when necessary. The track null amplifier 453 is similar to the disc null amplifier 452, having a relay 408 which picks up in the same manner as relay 407. With continued reference to FIG. 18*a*, the contacts 411 of relay 612, in addition to supplying tube 396 with a driving voltage, also drive the grid 438 of an amplifying tube 465 via contacts 466 of relay 408, contacts 467 of relay 403, contacts 468 of relay 401, and contacts 469 of relay 405 so that the grid 438 is energized only if relays 403 and 404 are not energized and relay 408 is energized, or when relay 401 is energized and relay 405 is not energized. The grid 438 of tube 465 is supplied with a bias voltage via a resistor 464 to the −100 volt line 388. The cathode 410 of tube 465 is grounded via a resistor 472. The screen grid 474 of tube 465 is connected to line 441, and the anode 475 of tube 465 is similarly connected via relay 406. The relay 406 energizes the solenoid 300 through relay contacts 526 (see FIGS. 15 and 18*b*) which in turn causes the air valve to actuate the pawl arm 291 (FIGS. 13 and 15) to move to the disengaged position. Relay 401 is energized through n/o contacts 476 of relay 407 and is connected in series with a resistor 477 and is parallel with a condenser 478. The resistor 477 and condenser 478 function to delay the action of relay 401 a predetermined interval after relay contacts 476 have closed. The relay 405 is controlled by the track limit microswitch 303 on the upper carriage 252 and is energized when the head arm 271 is in the home position, wherein the arm 271 closes the switch 303.

A third amplifying tube 479 is provided connected to the 150 volt line 441 through the solenoid 336 (FIG. 12) which operates the clutch 333. The cathode 480 of the amplifying tube 479 (FIG. 18*a*) is connected through a resistor 481 to ground, and the screen grid 482 is supplied from the +150 volt line 441. The control grid 483 is connected via a resistor 484 to the −100 volt line 388 and through a resistor 485 to ground. A condenser 486 couples the +150 volt line 441 through contacts 487 of relay 401, contacts 488 of relay 403, contacts 489 of relay 404, and contacts 490 of relay 405. The condenser 486 is connected to ground via a resistor 491. The condenser 486 allows only a positive pulse to pass to the control grid 403 at the instant when a complete circuit is created between the 150 volt line 441 and the grid 483. The completion of such a circuit requires relay 401 to be energized and relay 403 to be deenergized, or relays 403 and 405 to be energized and relays 404 and 401 to be deenergized.

The track and disc addresses are obtained by means of two combinations of relays which control respectively a disc address network (FIG. 16*b*) and a track address network (FIG. 16*a*) to produce the track and disc error voltages. Relays 679, 680, 665, 681, 666 and 667, which are hereinafter described, are arranged to close one or more of contacts 492, 493, 494, 495, 496 or 497. These contacts set up the disc address circuit to produce an error voltage which is an analog of a predetermined disc address which is a predetermined position of the carriage 251 with respect to the disc 228 (FIG. 9). The above relay contacts, when closed, insert resistors 498 into the disc address circuit which is essentially a Wheatstone bridge having fixed resistors 499 and a D.C. power supply 500. The disc address potentiometer 313 (FIGS. 9, 11 and 16*b*) is connected across the power supply in series with two variable resistances 502 and 503 on either side of the potentiometer. The combination of the fixed resistors 499 and the resistors 498 acts to vary the resistance between the output line 442 and the positive terminal 505 of the power supply 500 inversely with the resistance between line 442 and the negative terminal 506. Movement of the slider of the potentiometer 313 similarly varies the resistance between the center tap and the positive and negative sides of the power supply 500. The slider of the potentiometer 313 is grounded; therefore, the output line 442 with respect to ground will be positive when the relative value of the resistance between the output line 442 and the positive terminal 505 is less than the relative resistance between the slider of the potentiometer 313 and the positive side of the power source 500. If the reverse is true, a negative voltage will result. A positive error voltage to the disc servo amplifier 424 (FIG. 17) ultimately causes the carriage 251 to be driven to the right, which causes the slider of the potentiometer 313 to move toward the positive side of the potentiometer until equalized with the resistors 507 and 520 wherein an error voltage of zero is produced. A negative error voltage will similarly cause the carriage 251 and the slider of the potentiometer 313 to move in the opposite direction until a similar null is reached.

The output line 442 connects to the first section grid 436 of the disc servo amplifier 424 (see FIG. 17). An error voltage is supplied to the amplifier 424 from −100 to +100 volts dependent upon the number of resistors 498 in the circuit as set up by the disc address relays and the setting of the potentiometer 313. The individual values of resistors 498, which may be entered into the circuit by closing the relays, are in geometric progression wherein the relay 667 causes an input of 40 units of resistance to be put into the circuit; relay 666, 20 units; relay 665, 10 units; relay 681, 8 units; relay 680, 4 units; and relay 679, 2 units. Thus, by the proper combination of the relays a combination of 94 increments or units of resistance may be obtained wherein the output line 442 may vary with respect to the positive and negative terminals of the power supply 500. A null error voltage will result when the carriage 251 is at its proper address; and as the carriage 251 approaches the intended address, the error voltage is lessened until it reaches zero. With reference to FIG. 16*a*, a resistance network similar to the disc address circuit shown in FIG. 16*b* is provided for the track error voltage circuit which produces an error voltage on line 443 and the amplifier 425 (FIG. 17) and amplifier 453 (FIG. 18*a*). The track error voltage circuit has fixed resistors 507, a D.C. power supply 508, and the potentiometer 310 (FIG. 15) across the power supply in series with two trimming resistors 510 and 511. Contacts 512, 513, 514, 515, 516, 517, 518 and 519 of relays 686, 687, 688, 689, 682, 683, 684 and 685, the operation and structure of which will be hereinafter described, set up an array of resistors 520 in a similar track address Wheatstone bridge to produce a predetermined error voltage as was described above. The relay 685 sets up 80 units of resistance; relay 684, 40; relay 683, 20; relay 682, 10; relay 689, 8; relay 688, 4; relay 687, 2; and relay 686, 1. This enables the network to set up a total of 164 error voltages. A positive error voltage is equalized as the arm 271 moves to cause the slider of the potentiometer 310 to be moved toward the positive terminal of the power supply 508, and a negative error voltage is equalized as the arm 271 is moved in the opposite direction. Relay contacts 521 of the relay 401 are provided to switch the input to line 443 from the track address circuit to the slider of the potentiometer 523 which is parallel to the track address circuit in series with two variable trimming resistances 524 and 525. The potentiometer 523 is preset to produce an error voltage which is equalized by the potentiometer 310 when the arm 271 (see FIG. 15) is in its home position, thereby causing a home position address voltage to be supplied to line 443 when relay 401 is energized.

SERVOMECHANISM CONTROL CIRCUITS

With further reference to FIGS. 13, 16*a*, 16*b*, 17, 18*a*, 18*b*, and 19, when the magnetic head 278 is static at an address, the disc detent teeth 317 (FIG. 12) are locked into the detent seat 316; and the track detent pawl 294 (FIG. 15) is locked into the track detent rod 306. During this static condition, the disc servo error voltage and the track error voltage are both zero, and all switches and relays are in their normal position. When a new address is entered into the servomechanism, a disc address error voltage is set up by one or more of the relays 679, 680, 665, 681, 666 or 667 being energized. The disc error voltage network (FIG. 16*b*) then produces a differential voltage which is fed to the first grid 436 of the disc servo amplifier 424 and to the first grid 460 of the disc null amplifier 452. The disc null amplifier 452 senses the error signal and causes relay 407 to be energized. This, in turn, causes relay 401 to be energized after a short delay of about 20 milliseconds, caused by condenser 478. When the relay 407 picks up, contacts 521 (FIG. 16*a*) are closed, which causes the input to the track servo amplifier 425 and the track null amplifier 453 to be switched from the disc address error voltage circuit to the home position address potentiometer 523. A home address error voltage thus is produced which is fed to the track servo amplifier 425 and the track null amplifier 453. The track null amplifier 453 senses the error and causes relay 408 to pick up.

A track address is next set up by energizing one or more of the relays 686, 687, 688, 689, 682, 683, 684 and 685. This in turn sets up the network of FIG. 16*a* to produce a track error voltage at line 443 and ground. This voltage, however, is blocked from reaching the track servo amplifier 425 and the track null amplifier 453 by virtue of relay 401 being energized and n/c contacts 521 being open. After the track address has been set up, the relay 612 (FIG. 18*a*) is energized, therein setting up a voltage to the tube 396, therein causing the relay 402 to pick up after a delay caused by condenser 400, and through the n/o contacts 468 of relay 401 and the n/c contacts 469 of relay 405 to the grid of amplifying tube 465, which causes relay 406 to close its points. When relay 406 is energized, the solenoid 300 is energized, which forces air to the cylinder 298 (FIG. 15), causing the detent pawl 294 to be disengaged from the track detent rod 306. The interlock actuating arm 295 causes the arm detent microswitch 296 to close, causing relay 404 to pick up. With relay 404 picked up, the positive potential to the power amplifiers 390 and 391 (FIG. 19) is partially set up through n/c relay contacts 395 of relay 409, n/c contacts 416 of relay 403, n/o contacts 417 of relay 404, and is completely set up when contacts 394 of relay 402 are closed.

The track servo amplifier 425 (see FIG. 17), driven by the home error voltage, causes the power amplifiers 390 and 391 to be driven through the n/c contacts **426*a* and 426*b* of relay 403. The error voltage for the home address is always positive; therefore, the power amplifier 390 causes the right clutch 352 to be driven. This causes the capstan 358 to turn to the left. The carriage is now locked into position by the disc detent teeth 317 (FIG. 12), the arm 271 being free to move by virtue of the interlock actuating arm 295 being pulled into the disengaged position. This allows the arm 271 to be pulled in an outboard direction to the home position by the cable 359. As the arm 271 is pulled outwardly, the capstan 358 drives the tachometer 377 to the left, which generates a positive voltage to the second grid 437 of the track servo amplifier 425 through the n/c contacts 426*c* of the relay 403. At the same time, the slider of the potentiometer 310** (FIG. 16*a*) is moved to a more positive position, wherein a diminishing error voltage is produced which reaches zero at the home position. The positive voltage from the tachometer 377 seeks to equalize the error voltage because the amplifier 424 is responsive only to the potential difference between the voltage on the first grid 436 and the second grid 437 (FIG. 17). This has a damping effect on the motion of the arm 271 as it approaches the home address.

When the arm 271 (FIG. 15) is at the home position, the microswitch 303 is closed by the arm 271, therein causing relay 405 (FIG. 18*b*) to be picked up. In addition, the error signal to the track null amplifier 453 drops to zero, causing the null amplifier to deenergize the relay 408 (FIG. 18*a*). When relay contacts 466 of relay 408 are open, the grid circuit to tube 465 is broken, causing relay 406 to open contacts 526. With contacts 526 open, the solenoid 300 closes (FIG. 15), which forces air to cause the arm lockout pawl 290 to engage in the arm lockout seat 289. As this happens, the arm 295 is moved and the switch 296 opens. When the pawl 290 is fully engaged in the seat 289, the arm 295 opens the switch 297, thereby deenergizing the hold coil of relay 404. Potential to amplifier tubes 390 and 391 is broken by the opening of n/c contacts 417 of relay 404, and a 150 volt pulse is supplied through capacitor 486 to the grid 483 of tube 479 via potential being applied to the resistor 491 over the circuit n/o contacts 488 of relay 403, n/o contacts 487 of relay 401, n/c contacts 489 of relay 404, n/o contacts 490 of relay 405. The tube 479 thereby conducts and energizes solenoid 336 via line 441, solenoid 336, anode of tube 479, cathode 480 of tube 479, resistor 481, and the clutch 333 is operated, wherein the shaft 332 is allowed to rotate one revolution, which in turn causes the shaft 328 to rotate one-half revolution, therein causing the detent teeth 317 to be withdrawn from the detent seat 316. When the teeth 317 are fully withdrawn from the detent seat 316, the disc detent disengaged microswitch 348 is closed, therein causing relay 403 to be picked up. When relay 403 is picked up, the circuit from the tachometer 377 is transferred from the track servo amplifier 425 to the disc servo amplifier 424 via contacts **426*c* (FIG. 17); and the input to the power amplifiers 390 and 391 is transferred from the track servo amplifier 425 to the disc servo amplifier 424 by relay contacts 426*a* and 426*b*, while, at the same instant, plate potential is supplied to the tubes 390 and 391 through the n/c contacts 395 of relay 409, n/o contacts 416 of relay 403, n/c contacts 417 of relay 404, and n/o contacts 394 of relay 402**.

As the arm 271 (FIG. 15) is then locked into position by the arm lockout pawl 290 in the arm lockout seat 289, and the detent teeth 317 (FIG. 12) are disengaged from the detent seat 316, the carriage 251 is moved to either the right or the left depending upon whether the error signal is positive or negative, thereby causing either the right clutch 352 or the left clutch 353 to be energized. While the carriage 251 moves towards the address position, the output voltage of potentiometer 313 changes in value, and the resulting error voltage is decreased until it is effectively zero upon reaching the address. At the same time, a voltage from tachometer 377 is provided to the second grid 437 of the first stage 530 of the amplifier 424 (FIG. 17), which dampens the output to the driving clutch as the carriage 251 approaches the address. Upon reaching the address, the error voltage is effectively zero, and relay 407 is deenergized by the disc null amplifier 452; however, relay 407 is momentarily held by the action of condenser 478 to insure a complete cycle of operation.

When contacts 489 of relay 401 (FIG. 18*a*) are returned to their normally closed condition, a second pulse is generated through the condenser 486 to the solenoid 336 via the n/o contacts 488 of relay 403 and the n/c contacts 489 of relay 401, which causes the detent teeth 317 (see FIG. 12) to be brought into engagement with the detent seat 316. As the detent teeth 317 move, the switch 348 is open and finally, when the teeth are in the completely locked position, the switch 349 opens, thereby deenergizing the hold coil of the relay 403. At the same time, when relay 401 is picked up, the error voltage to the track servo amplifier 425 is transferred from the potentiometer 523 to the track address network of FIG. 16*a* by the contacts 521 of relay 401. This creates a track address error voltage to the track servo amplifier 425 and to the track null amplifier 453.

The track null amplifier 453 (FIG. 18*a*) senses the error voltage and picks up relay 408. A circuit is thus closed through n/o contacts 466 of relay 408, n/c contacts 467 of relay 403, n/c contacts 468 of relay 401, and n/o contacts 411 of relay 612, which applies +150 volts to the grid 438 of the amplifying tube 465, causing relay 406 to be energized. When relay 406 is energized, the solenoid 300 is again energized, causing the arm lockout pawl 290 to disengage from the arm lockout seat 289. The interlock actuating arm 295 then closes switch 296, which causes relay 404 to pick up, completing the plate circuits to the amplifiers 390 and 391 (see FIG. 19).

The track address error voltage from the track address circuit of FIG. 16*a* to the track servo amplifier 425 causes the arm 271 to move toward the shaft 211 of FIG. 9. As the arm 271 moves from the home position into the track address position, the microswitch 303 opens, thereby deenergizing the relay 405, and the slider of the potentiometer 310 moves to balance the error input voltage until the error voltage is zero when the arm 271 is at the predetermined address. As this is taking place, the tachometer 377 generates a voltage which is an analog to the speed of movement of the arm, which is fed to the second grid 459 of the first stage of the track servo amplifier 425 (FIG. 17). This voltage balances the amplifier circuit against the decreasing address error voltage to deenergize the clutch that predominates prior to the arm 271 reaching the proper address. When the arm 271 is at the proper address, the voltage to the track null amplifier 453 is zero, thereby causing relay 408 to be deenergized. This opens the circuit to the tube 465 which controls relay 406, causing relay 406 to be deenergized, simultaneously opening contacts 526 and causing the solenoid 300 to release the air valve 298, and the track detent pawl arm 294 is brought into a locking position with the track detent seat 309. At the locked position the switch 297 opens, deenergizing relay 404. With relay 404 deenergized, the plate supply is broken to the tubes 390 and 391, and the n/c contacts 527 of relay 404 establish a circuit from line 385, through n/o contacts 526 of relay 402, n/c contacts 527 of relay 404, n/c contacts 528 of relay 405, n/c contacts 529 of relay 401 to line 812, thereby supplying a positive potential pulse to a trigger 813 as described below in connection with FIG. 32.

DATA CONTROL CIRCUITS

To avoid unnecessary repetition in the drawings and in that portion of the specification to follow, certain of the electronic components which are utilized repeatedly in the various circuits of the present invention are illustrated in detail only in FIGS. 30 through 51 and are described only once in the text immediately following. Since all of these components are well known in the art, it is deemed that a brief description thereof will suffice. The circuits utilizing these various components are illustrated with such components being shown in block form, the figure in which the actual structure represented by a given block may be found being indicated in that block.

Figure 30:
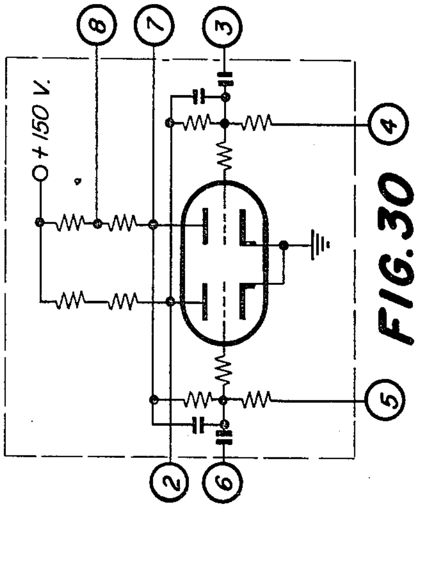

Referring now to FIG. 30, a bistable trigger, which operates on the negative-going edge of pulses applied to one or the other control grid thereof, is illustrated. The #4 and #5 taps of this trigger are each normally returned to −100 volts, and under these conditions only one of the two tubes conducts. The negative-going edge of a pulse applied to the #6 or #3 grid tap corresponding to the tube that is conducting at that time causes the trigger to reverse its condition of stability, hereby renderiig he other of the two tubes conductive. It should be clear that the potential of the plate of a conducting tube is raised when that tube is cut off and, conversely, that the potential of the plate of the nonconducting tube drops when that tube is rendered conductive. The trigger shown in FIG. 30 is reset by opening the bias line to either the #4 or #5 tap momentarily, the opening of the line to the #5 tap resulting, therefore, in resetting the trigger in such a way that the #2 tap is low and the #7 and #8 taps are high.

Figure 31:
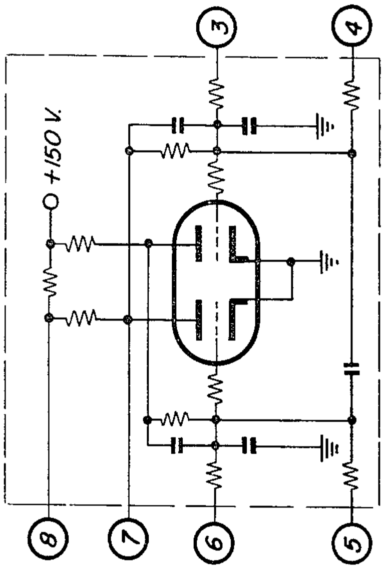

In FIG. 31 a similar bistable trigger is illustrated, which operates, however, under the control of positive voltages. This trigger is reset in the desired manner by momentarily opening one of the two bias lines which are normally connected to each of the #4 and #5 taps, thereby rendering the tube corresponding to the line opened conductive, and a positive voltage applied to the #3 or #6 tap corresponding to the nonconducting tube causes a reversal of the condition of stability of the trigger.

Figure 32:
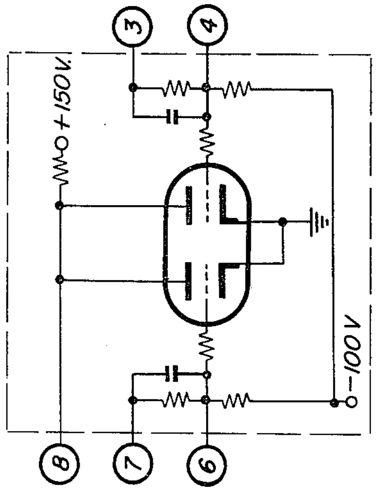

A dual inverter connected as an "and" gate is illustrated in detail in FIG. 32, the biasing being so arranged that both tubes are normally conducting, thereby maintaining the #8 tap of the gate normally low. The #8 tap cannot go up, therefore, unless both of the control grids of the two tubes are driven below cutoff simultaneously since the #8 tap is maintained low as long as either tube conducts.

Figure 33:
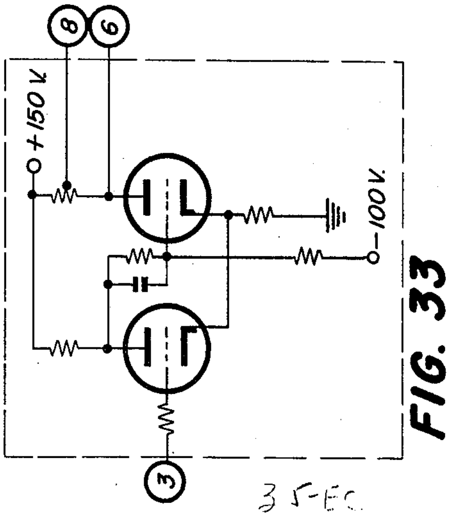

Referring to FIG. 33, a Schmitt trigger is illustrated. Normally the #3 tap of the Schmitt trigger is at ground potential and the right-hand tube conducts. Under these conditions the cathode bias developed by the right-hand tube is sufficient to maintain the left-hand tube cut off, and as long as the #3 tap remains at ground potential this condition persists. When, however, the #3 tap goes up, the left-hand tube conducts. When this occurs, the condition of stability of the trigger is switched, due to the regenerative action common to Schmitt triggers, thereby cutting off the right-hand tube and causing the #6 and #8 taps to rise sharply. When the #3 tap again approaches ground potential, the #6 and #8 taps drop sharply to their initial potential.

Figure 34:
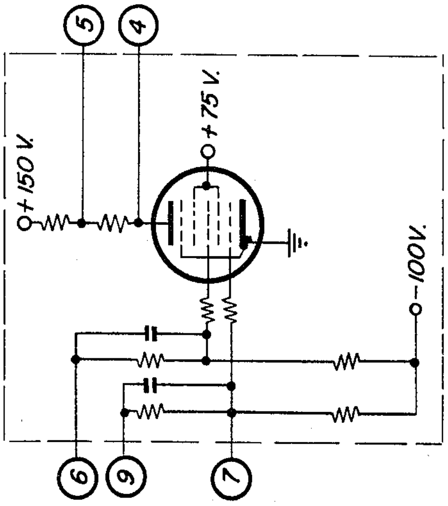

A gate tube, shown in FIG. 34, is connected as an "and" gate. The #4 and #5 taps of the gate are normally high since the tube is normally cut off due to the negative bias present on the #1 and #3 grids thereof. The gate is opened by raising the potential of the #6 tap and under these conditions positive voltages applied to either the #7 or #9 tap cause the #4 and #5 taps to drop. It will be clear, however, that the #4 and #5 taps can not drop unless the #6 tap and either of the #7 or #9 taps are up simultaneously.

Figure 35:
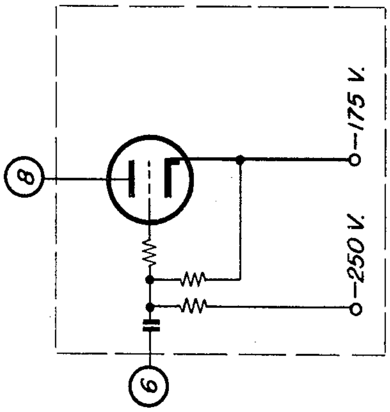

The inverter shown in FIG. 35 is normally biased below cut off, and positive pulses of sufficient amplitude applied to the #6 tap thereof are taken from the #8 tap as negative-going pulses.

Figures 36, 37, 38, 39, 40, 41, 42, 43, 44, 45:
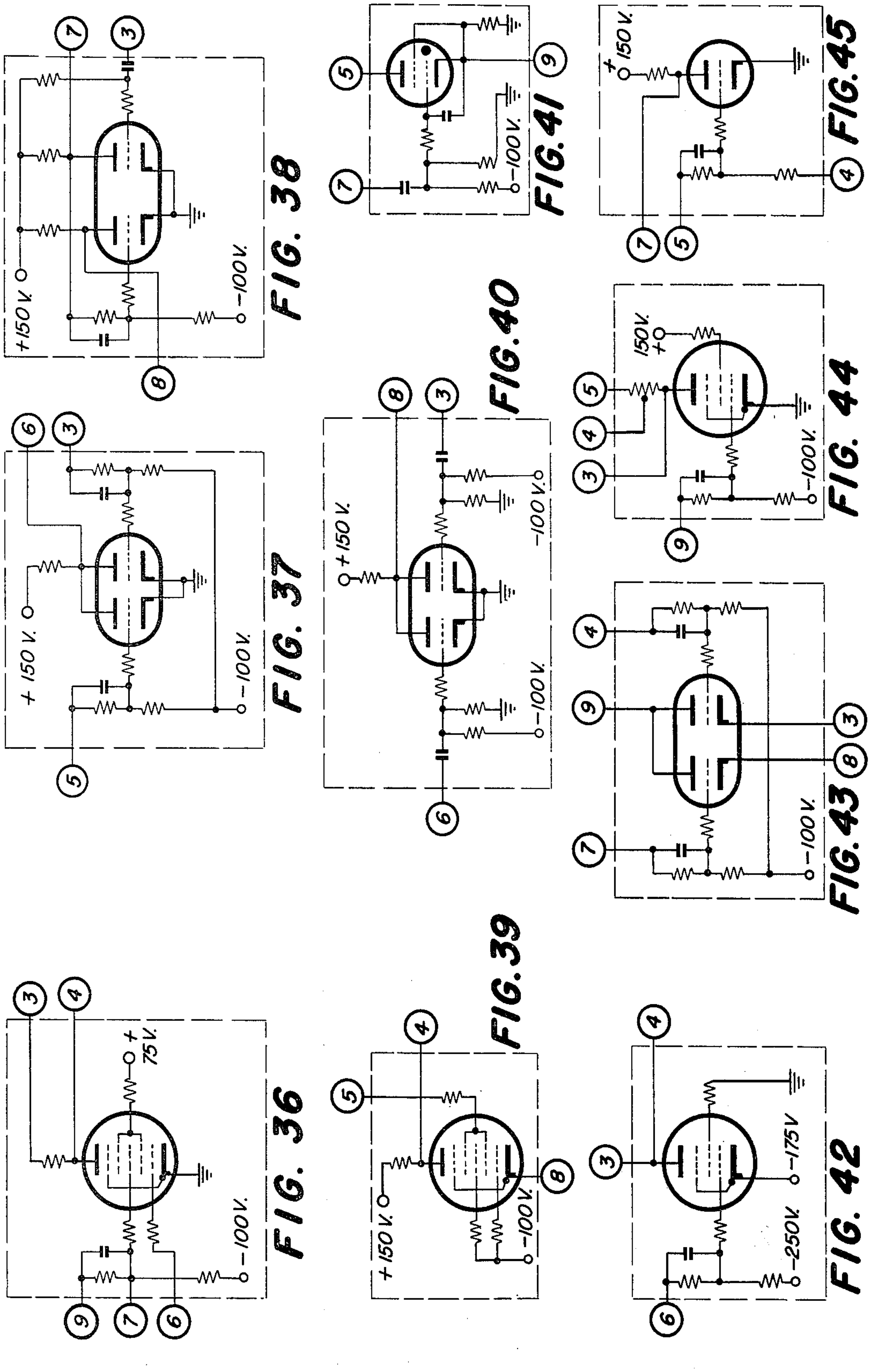

Another gate tube, similar to the gate disclosed in FIG. 34, is illustrated in FIG. 36, the #3 tap thereof being normally connected to +150 volts. The gate is normally closed, thereby maintaining the #4 tap thereof normally high due to the bias supplied to the #3 grid thereof. The gate is connected as an "and" gate, and in order for positive signals applied to the #6 tap to pass therethrough it is necessary that the potential of either of the #7 or #9 taps be raised sufficiently to open the gate. Such signals are taken from the #4 tap as negative pulses.

In FIG. 37 two tubes are connected as an "or" gate, the control grids thereof being normally biased at cutoff, thereby normally maintaining the #6 tap high. When, however, the potential of the #3, and/or the #5 tap goes up sufficiently to permit the corresponding tube or tubes to conduct, the #6 tap drops in potential. Thus, a positive pulse on either the #3 or #5 tap will cause the #6 tap to drop.

A single-shot multivibrator is illustrated in FIG. 38. This component is utilized in various circuits of the present invention and the time constants thereof are determined by its particular application, as will be noted in connection with the description of each of its various uses. The right-hand tube of the single-shot normally conducts, the left-hand tube being normally cut off, and the negative-going edge of pulses applied to the #3 tap reverses this condition for a period determined by the time constants thereof. Thus, when the #3 tap drops, the #7 tap goes up and the #8 tap goes down for the period of the multivibrator.

The circuit illustrated in FIG. 39 is utilized in connection with the electronic reset circuit described later herein and illustrated in FIG. 23. This tube is utilized as a voltage regulating device and its operation will become clear in connection with the description of the electronic reset circuit.

Referring now to FIG. 40, a dual inverter connected as an "or" gate is illustrated. The input taps, i.e., the #3 and #6 taps, are capacitively coupled to the control grids of the two tubes thereof. Each of the tubes is normally biased at cutoff, thereby normally maintaining the #8 tap high. A positive pulse of sufficient amplitude applied to either the #3 or the #6 tap, however, will cause the tube corresponding thereto to conduct momentarily, thereby controlling the #8 tap to drop. Thus, whenever, a positive pulse is applied to either of the #3 or #6 taps, a negative pulse is taken from the #8 tap.

The thyratron shown in FIG. 41 is normally biased sufficiently to prevent current flow therethrough. When, however, the #7 tap is raised, the tube conducts until the plate circuit is opened, at which time the thyratron is extinguished. Circuits such as this are utilized to operate various relays herein, as will become clear later.

In FIG. 42, a power tube and its associated circuitry is illustrated. This tube is normally biased below cutoff, thereby maintaining the #4 tap thereof normally high, the #3 tap being returned to ground through a suitable load. This power tube is utilized in connection with the aforementioned electronic reset circuit, and its operation will become clear later in connection with that description. It will be understood at this time, however, that when the #6 tap is raised sufficiently the tube conducts, thereby lowering the potential of the #4 tap.

Referring to FIG. 43, a power amplifier which is utilized in the write amplifier of the invention is illustrated. The #9 tap of the amplifier is connected through a load resistor to a suitable plate voltage and the #3 and #8 taps are connected to opposite ends of the winding of the read-write transducer, the center tap of said winding being grounded. As will become clear later in connection with the description of the write amplifier circuits illustrated in FIG. 25, one and only one of the two tubes of the power amplifier shown in FIG. 43 conducts at any one time, the bias applied to the control grids of these tubes being sufficient to maintain them cut off when the associated #4 or #7 tap is low. The #4 and #7 taps are connected to circuitry which controls the #4 tap to be low when the #7 tap is high and, conversely, controls the #7 tap to be low when the #4 tap is high. Assuming that the #7 tap is high initially, the left-hand tube of the power amplifier conducts, thereby drawing current through one-half of the transducer. When this condition is reversed due to the #4 tap going up, the right-hand tube conducts and causes the current to flow through the other half of the transducer. This results in reversing the polarity of the flux generated by the transducer due to reversal of the current flow therethrough.

In FIG. 44 a power amplifier, having output taps #3 and #4 and an input tap #9, is illustrated. The #5 tap of the amplifier is normally returned to +150 volts, and due to the negative bias provided on the control grid, it will be understood that the tube is normally cut off, thereby maintaining the #3 and #4 taps high. Positive signals applied to the #9 tap causes the tube to conduct, thereby controlling the #3 and #4 taps to drop.

In FIG. 45 the #4 tap of an inverter is normally connected to −100 volts, thereby normally maintaining the tube cutoff. Under these conditions the #7 tap of the inverter is high, and when a positive signal is applied to the #5 tap thereof the #7 tap drops accordingly.

Figure 46:
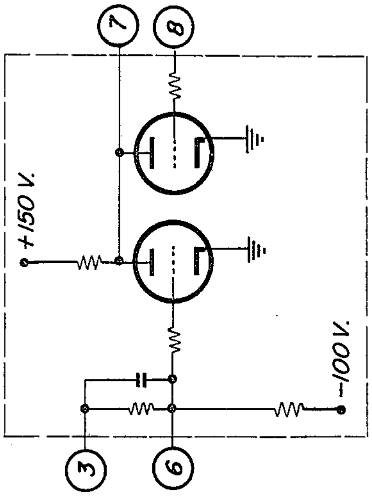

Each of the tubes of an "and" gate shown in FIG. 46 is biased normally to conduct, thereby maintaining the #7 tap thereof normally low. Lowering the potential of either the #3, #6 or #8 tap has no effect on the potential of the #7 tap since the #7 tap cannot rise unless both of the tubes of the "and" gate are cut off. Thus, it is necessary to lower the potential of the #3 or #6 tap and of the #8 tap simultaneously to raise the potential of the #7 tap.

Figure 47:
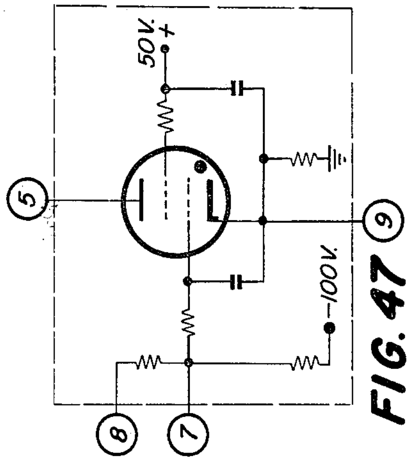

Referring to FIG. 47, a thyratron tube normally biased to prevent conduction is illustrated, the biasing being such that when the #7 tap is grounded or when the #8 tap is raised to a potential in the neighborhood of 50 volts, the thyratron will conduct and will continue to conduct until the plate circuit thereof is opened. This thyratron, like the thyratron disclosed in FIG. 41 described previously, is utilized for operating several of the various relays utilized herein.

Figure 48:
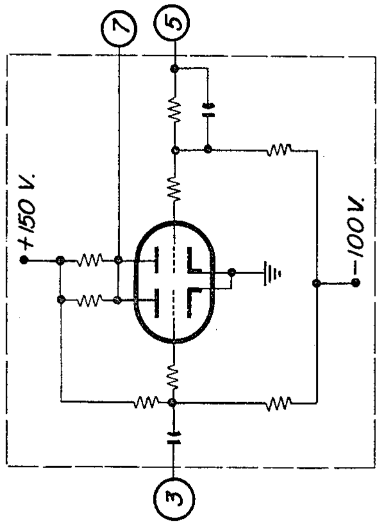

The circuitry disclosed in FIG. 48 is connected as an "and" gate. Each of the tubes of the gate normally conducts, thereby maintaining the #7 tap normally low, and in order for a negative signal applied to the #3 tap to be taken from the #7 tap as a positive signal, it is necessary that the #5 tap be down, since cutting off only one of the two tubes cannot cause the #7 tap to go up. The #5 tap is D.C.-coupled to the control grid of the right-hand tube, the #3 tap being A.C.-coupled to the control grid of the left-hand tube, and when the potential of the #5 tap is sufficiently low to cut off the right-hand tube, it will be understood that negative impulses applied to the #3 tap may be taken from the #7 tap as positive-going pulses. When, however, the potential of the #5 tap is such that the right-hand tube of the gate is conducting, signals applied to the #3 tap have no effect on the potential of the #7 tap, it being necessary for both tubes to be cut off to affect the potential of the #7 tap.

Figure 49:
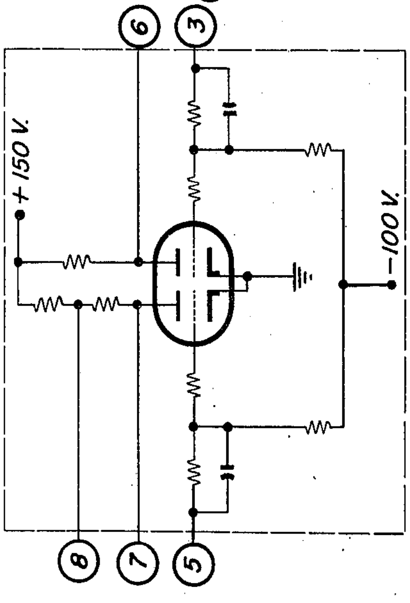

Referring now to FIG. 49, a dual inverter, having output taps #6, #7, and #8 and input taps #3 and #5, is shown. Each of the tubes of the inverter is biased normally to conduct, and when one or both of the input taps are driven sufficiently negative to cut off the corresponding tube, the output taps associated therewith go up. These two tubes operate independently of each other and an input signal to one has no effect on the output of the other.

Figure 50:
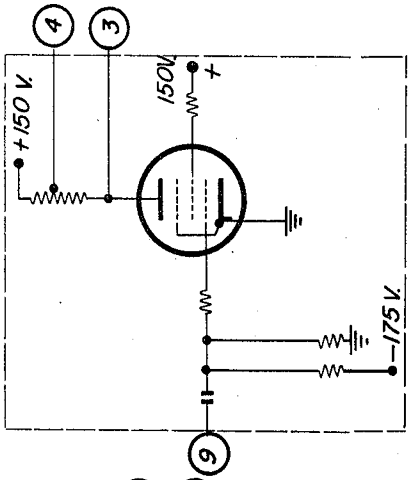

An A.C.-coupled power amplifier is illustrated in FIG. 50. The control grid of the tube is biased below cutoff, and only positive pulses affect the potential of the output taps, i.e., the #3 and #4 taps. The #3 and #4 taps are, therefore, normally high and are caused to drop momentarily by positive pulses applied to the #9 tap.

Figure 51:
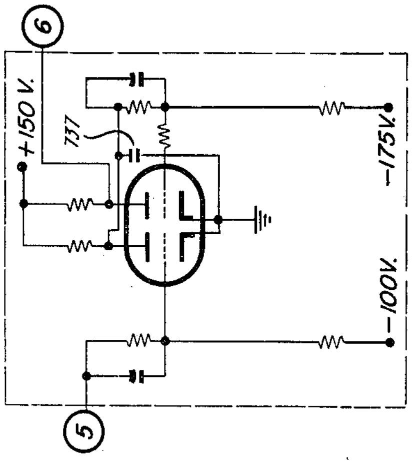

The circuit disclosed in FIG. 51 is utilized to detect a lack of positive pulses applied to the #5 tap. Under normal conditions, as will become clear later herein, positive pulses are applied to the #5 tap, thereby controlling the left-hand tube to conduct, the left-hand tube being biased below cutoff. In this case the plate of the left-hand tube is low and the right-hand tube is biased at or below cutoff, thereby maintaining the #6 tap up. In the absence of positive pulses applied to the #5 tap, however, the left-hand tube is cut off, the plate of the left-hand tube goes up sufficiently to control the right-hand tube to conduct, and as a result the #6 tap goes down. This condition persists in the absence of positive pulses applied to the #5 tap and when a positive pulse is again applied to the #5 tap, the #6 tap goes up. Except for a small delay provided by a condenser 737 connected between the plate of the left-hand tube and ground, it will be clear that the #6 tap is high only as long as the positive pulses are applied to the #5 tap.

The operation of the machine of the invention is shown and described as being under the control of a record card punching machine of the type described in U.S. Letters Patent No. 2,647,581, issued in the name of Gardinor et al. It should be understood that the invention is not limited to use with such a machine and that said machine is included herein solely to permit the more comprehensive description of the operation and utilization of the invention. Modifications necessary to adapt the invention for use with other types of control units more suited to the demands of a particular installation will be obvious to those familiar with the art. The control circuits disclosed and described in the above mentioned Letters Patent have been reproduced herein (see FIGS. 20*a* through 20*d*); however, it will be noted that they have been modified by the inclusion of additional structure to adapt them to control the magnetic storage system of the invention. Structure shown in the present drawings which is taken directly from the drawings of the patent has been identified by like reference numerals, such numerals being preceded by the letter G to avoid confusion with similar reference numerals used to identify the various portions of the present invention. In this way the patent may be readily referred to, thereby avoiding unnecessary repetition of the description of the card punch.

Referring now to FIG. 25, a selector switch 600 having two ganged decks 600*a* and 600*b* is provided to permit a selection by the operator of the desired mode of operation. The first position 601 of the switch 600 completely disables the machine and will be referred to as the "off" position. The second position 602 energizes circuits which permit the card punch to operate in the normal fashion as taught in the aforementioned Gardinor patent. The next three positions 602, 604 and 605 permit selection of one of three "read-out" modes, as will become clear hereinafter. The sixth position 606 conditions the machine for the "read-in" mode of operation, and the seventh position 607 is the "sequential scan" position.

Since it is felt that the machine of the invention may best be explained by means of a functional description, it will be assumed that the punched information contained in the last 75 columns of a record card is to be stored in the magnetic file at a location defined by an address punched in the first 5 columns of the card. The card is first placed in the card hopper of the punch and the selector switch 600 is set to position 602, the normal punch position. The card is then advanced from the hopper to the pin sensing station as taught in the aforementioned patent. When the selector switch 600 is in position 602, a relay 608 is energized which, as will become clear as this description proceeds, connects the circuits of the punch in the normal manner. Now, since it is desired to utilize the read-in mode of operation, the selector switch is moved to the position 606 thereby energizing two relays 609 and 611 and deenergizing the relay 608.

The address at which the information in the card is to be stored is recorded in the first 5 columns of the card, and as the card is advanced column by column past the sensing pins of the punch, the address is sensed thereby and is entered into relay storage for controlling the servomechanism to position the magnetic transducers adjacent the selected track of the desired disc, as was explained earlier herein.

Figure 20A:
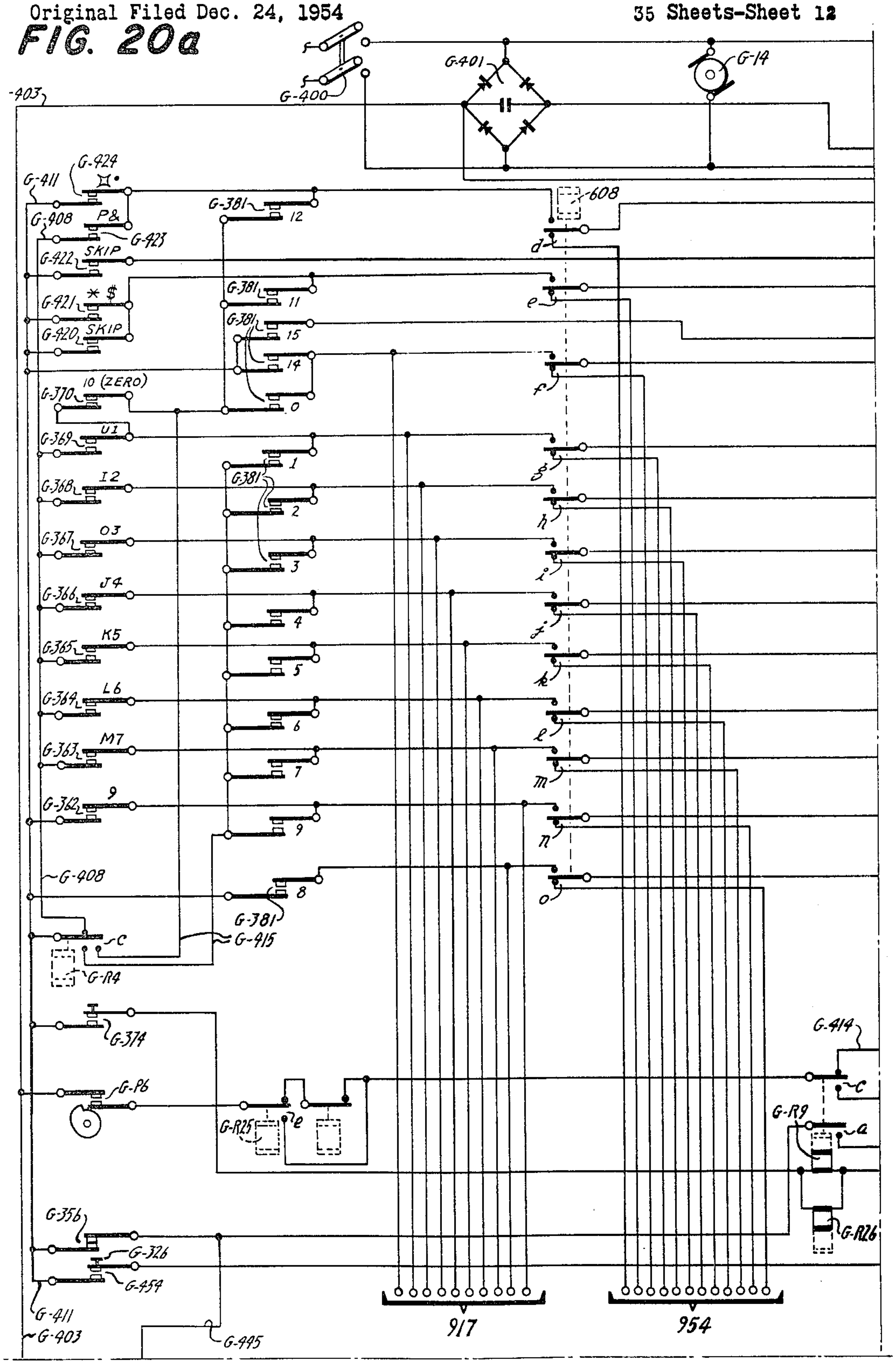

A program card (FIG. 55) is provided on the program drum of the punch for controlling various operations herein, and the uses of the various rows thereof will be explained in connection with the particular structure with which they are associated. To resume the description, it will be recalled that the card is initially positioned with the first column thereof at the pin sensing station and, in order to sense the information in the first column, it is necessary to initiate a punch cycle since it is during a punch cycle that the sense pins are actuated to sense the data punched in a given column. Additionally, since it is desired to read the card before it escapes to the next column, it is necessary to energize the punch clutch magnet G–204 (FIG. 20*d*) without energization of the escape magnet G–104 (FIG. 20*c*). Such an operation is referred to herein as a "false punch cycle." A false punch cycle, therefore, merely causes the machine to go through a punch cycle without escapement of the record card to the next column. It is for this reason that a zero punch in the first column of the program card (FIG. 55) is provided. Since the zero punch in the first column of the program card is moved under the zero star wheel G–245 when the first column of the record card is moved to the sensing position, the zero punch in the program card causes the zero program contacts G–246 (FIG. 20*d*) to close, which, in turn, renders the tube G–T14 conductive. When G–T14 conducts, the relay G–R26 is energized, thereby closing its *d* contacts and completing the circuit to the relay G–R2, which results in closing the *a* contacts of G–R2 and grounding the control grid of the tube G–T7. When the control grid of G–T7 is grounded, G–T7 conducts and the punch clutch magnet G–204 is energized since the circuit breaker contacts which are under the control of the cam G–P1 are closed at this time. Energization of the punch clutch magnet G–204 initiates a punch cycle which causes the sense pins to read the information punched in the first column of the record card.

Figure 20B:
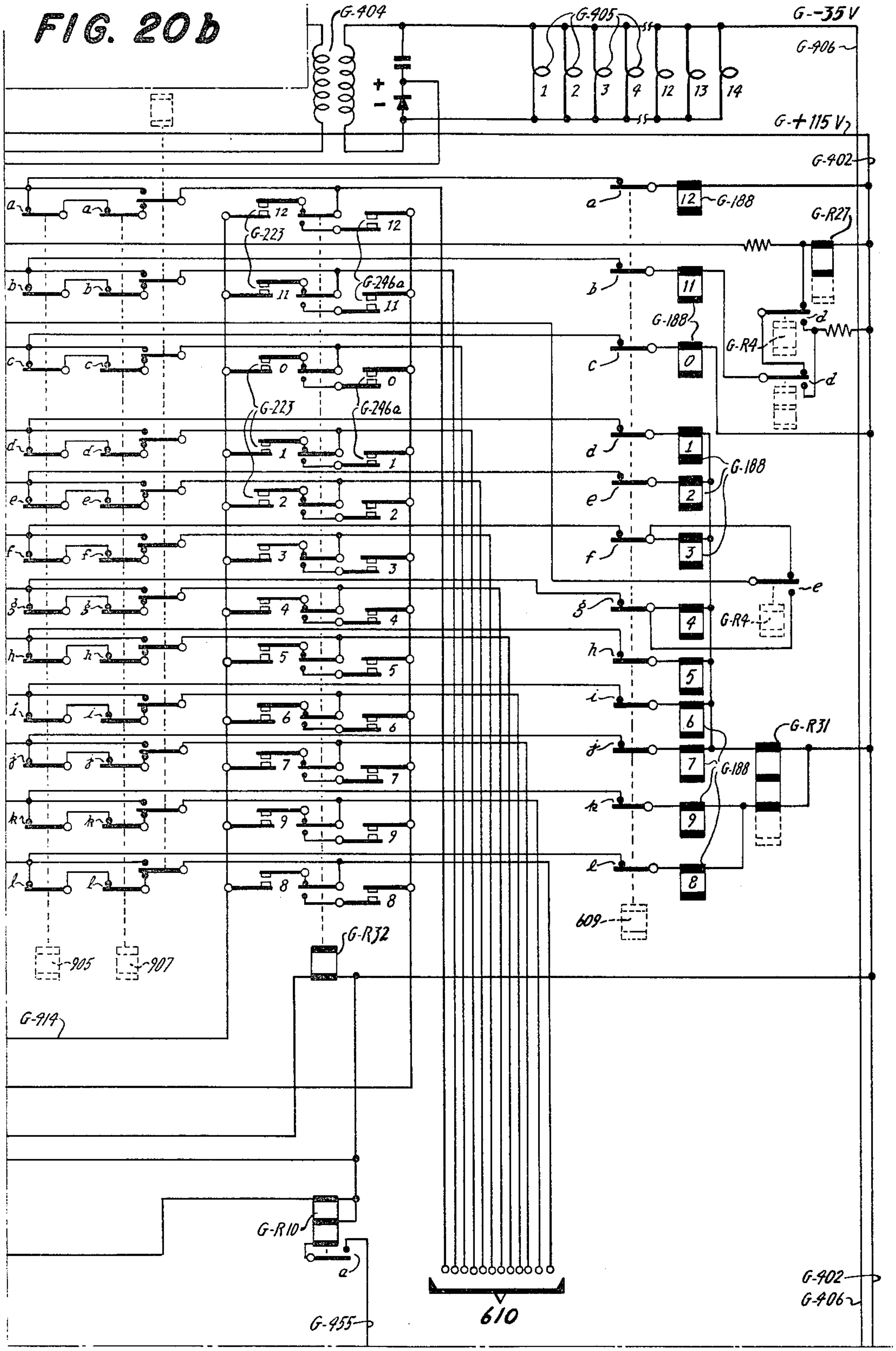
Figure 20C:
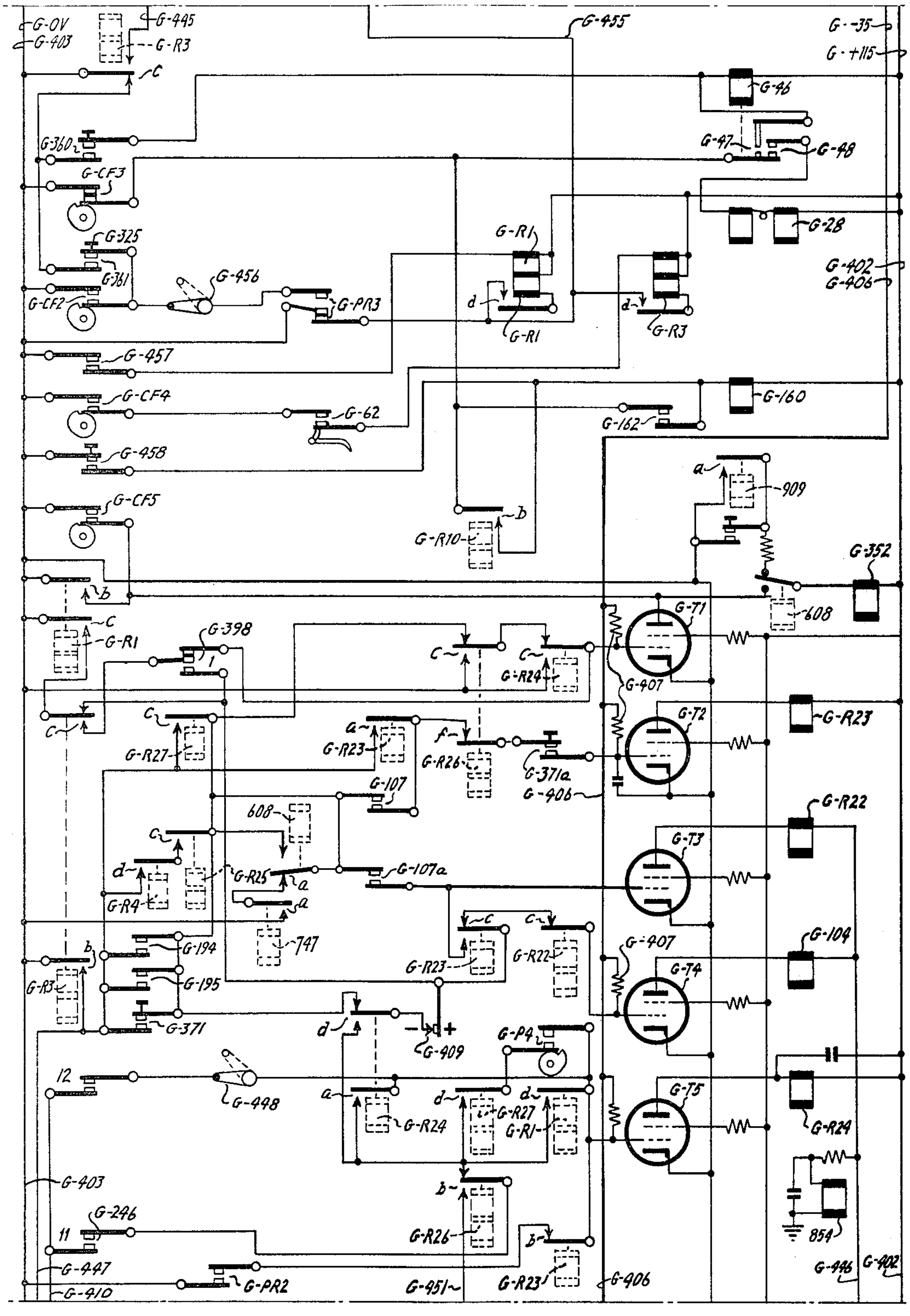

Referring now to FIG. 20*b*, it will be seen that the sense pins G–223 are connected by a group of lines designated generally as 610 through the n/o contacts *a* through *l* (FIG. 21) of the relay 611 to the corresponding armatures associated with the contacts *a* through *l* of a relay 612. It will be seen that under these conditions the sense pins G–223 associated with the numerals 0 through 9 are connected through the n/o contacts *c* through *l* of the relay 612 to the #7 taps of ten thyratron tubes 613 through 622, only a portion of which are shown in the drawings. These tubes have been described earlier herein and are disclosed in detail in FIG. 47. The #9 tap of each of the thyratrons 613 through 622 is connected to one side of a corresponding relay 623 through 632, respectively, the other side of each of these relays being connected to ground. It should now be clear that when the selector switch 600 is in the sixth or read-in position 606, the relay 611 is energized, and when the relay 612 is energized, one side of the sense pins G–223 is connected to the #7 taps of the corresponding thyratrons 613 through 622.

The plates, i.e., the #5 taps, of the thyratrons 613 through 622 (FIG. 21) are connected through a common line 633 and through a pair of circuit breaker contacts 634 to +50 volts. A cam 635 is provided to control the circuit breaker contacts 634, the cam being driven by the shaft G–196 that drives the cams G–P1 through G–P4, and it will be understood that the contacts 634 are closed during the first portion of each punch cycle, thereby supply +50 volts to the plates of the thyratrons 613 through 622 at this time. A short time later in the cycle, the contacts 634 are again opened to thereby open the plate circuit of the thyratrons. Various of the contacts of the relays 623 through 632 are arranged in a matrix which is adapted to convert the decimal input thereto to binary form, in a well known manner, the output of the matrix being taken from four lines 638 through 641 which have binary coded values of 1, 2, 4 and 8, respectively. When, for example, a 1 hole in the record card is sensed by the sense pins, the relays 611 and 612 being energized, the #7 tap of the thyratron 621 is grounded through the #1 pin contacts G–223, thereby causing the thyratron 621 to conduct and energizing the relay 631. When relay 631 picks up, its *a* contacts are closed and the line 638 is connected through these contacts to one side of the n/o *a* contacts of a relay 642 through a line 643.

The relay 642 (FIG. 22*b*) is connected between +50 volts and one side of the n/o *a* contacts of a relay 644, the other side of which is connected through the n/o *m* contacts of the relay 612, through the n/o *m* contacts of the relay 611, and through a pair of circuit breaker contacts 645 to ground, the contacts 645 being under the control of a cam 646 mounted on and driven by the same shaft which drives the other punch cams. The relay 644 (FIG. 25) is connected between +50 volts and one side of a circuit breaker 647, the other side of which is grounded. The circuit breaker 647 is controlled by a cam 648 which is driven by the punch cam drive shaft G–196, and when the contacts of the circuit breaker 647 are closed by the action of the cam 648, as they are during each punch cycle, the relay 644 is energized. When the circuit breaker contacts 645 (FIG. 22*b*) are closed by the action of the cam 646 and when the contacts 647 (FIG. 25) are closed by the cam 648, the various contacts of the relays 611 and 612 being transferred at this time, as will become clear later herein, the relay 642 (FIG. 22*b*) is picked up, said relay being arranged to drop out when the contacts 645 are again opened. (See FIG. 56 for timing of the various cams associated with the punch shaft G–196.) Energization of the relay 642 closes its *a* contacts (FIG. 21) and thereby places 50 volts on the line 643, and, since in the present example it has been assumed that the sense pins have read a 1 in the first column of the record card, the line 638 has a potential of 50 volts at this time.

Each of the lines 638 through 641 is connected through the n/c *a*, *b*, *c* and *d* contacts respectively of a relay 649 (FIG. 22*a*) to the corresponding *a*, *b*, *c* and *d* contacts of a rotor 651 of a stepping switch 652. When the rotor 651 is in its primary home position, i.e., when its *a*, *b*, *c* and *d* contacts are in engagement with the *a*, *b*, *c* and *d* contacts of the contact row 654 of the stator of the stepping switch, the line 638 is connected through a line 657 to one side of each of two relays 658 and 661, the line 639 being connected through a line 660 to one side of each of two relays 659 and 662 and the other side of each of the relays 658, 659, 661 and 662 being grounded. The relays 658 and 659 are of the latch type and are utilized for temporary storage of the first digit of an address, which digit defines the record or sector of a track in or from which information is to be entered or taken. The relays 661 and 662 are not latch relays and are picked up only momentarily during the period that the *a* contacts of the relays 642 are closed. These last mentioned relays are utilized to enter the record portion of an address into the locator circuits, as will be described later herein.

The *a*, *b*, *c* and *d* contacts of the second row 663 of the stator are connected to one side of the corresponding one of four latch type relays 665 through 668, respectively, the other side of these relays being grounded. Similarly, the *a*, *b*, *c* and *d* contacts of the third through tenth rows 669 through 676 of the stator are connected to a corresponding latch type relay 678 through 709. The relays 665 through 668 are utilized to store the second digit of an address and the relays 678 through 681 are provided for storing the third digit of an address, the second and third digits defining the disc number as previously described. The fourth and fifth digits of the address, which digits define the track number, are stored in the relays 682 through 689 in a similar manner. The relays 690 through 709 corresponding to the stator rows 672 through 676 are provided for storage of an additional five digits for use as may be desired, as will become clear. Thus, as the rotor 651 is stepped around the stator, the lines 638 through 641 of the recoding matrix are successively connected to the corresponding groups of the various storage relays. Since each of these relays in the address storage unit is of the latch type with the exception of relays 661 and 662, each of the digits entered via the sense pins is stored in these relays until their latch windings, indicated as a single winding 711, are energized.

The coil 712 (FIG. 22*b*) of the stepping switch is connected between 50 volts and one side of the n/o *b* contacts of the delay 644, and it will be understood that while the relay 642 is energized the coil 712 of the stepping switch is also energized; however; the rotor of the stepping switch is not advanced until deenergization of the coil 712. Thus, during each punch cycle, both the relay 642 and the coil 712 of the stepping switch are energized, thereby entering the binary coded digit stored in the various contacts of the relays 623 to 632 inclusive (FIG. 21) into certain of the address storage relays 658 through 709 (FIG. 22*a*) correponding to the rotor position, and when the circuit breaker contacts 645 (FIG. 22*b*) are again opened the rotor 651 is advanced to the next successive position.

As was mentioned above, the relays 609 and 611 (FIG. 25) are energized when the selector switch 600 is in the sixth position 606. Another relay, the relay 612 (FIG. 22*a*) mentioned earlier, is connected between ground and one side of a circuit breaker 713, the other side of which is connected to +50 volts. The circuit breaker 713 is under control of a cam 714 which is secured to and driven by the shaft G–33 that drives the card feed or CF cams disclosed in the aforementioned patent, and during each card feed cycle it should be clear that the card feed cam 714 closes the circuit breaker 713 to energize the relay 612. The relay 612 is of the latch type and its associated contacts are latched in their transferred condition while the first 5 columns of the card are being read, as will become clear. Another relay 715 (FIG. 25) is connected between +50 volts and ground by means of the circuit completed through the n/o *n* contacts of the relay 611, the n/o *n* contacts of the relay 612, and through the circuit breaker contacts 647. The relay 715 is also of the latch type, and when during the first punch cycle the cam 648 closes the circuit breaker 647, the contacts of the relay 715 are picked up and are latched in their transferred condition since at this time the contacts 611*n* and 612*n* are transferred.

Punch cycles which cause the escapement of the record card to successive columns, as well as the entry and exit of information read into and out of the magnetic file, are under the control of a timing or clock track recorded on the disc 374 (FIG. 9) which is mounted on and driven by the shaft 211 upon which the other storage discs 228 are mounted. The clock track comprises a plurality of prearranged, magnetically recorded signals which are sensed by the transducer 373, and the resultant pulses, referred to hereinafter as clock pulses, are utilized to control both the card punch and the timing of data entry and exit into and out of the file, as will be explained. The clock track is divided into four sectors A, B, C and D (see FIG. 7), upon each of which is recorded 600 clock pulses, each clock pulse defining with respect to time a physical location on each of the records lying in a corresponding sector at which a binary bit may be recorded. The adjoining edges of the A and D sectors are spaced apart a distance equivalent to 130 clock pulses. The gap or lack of clock pulses between A and D sectors is utilized to generate a signal called a reference mark which signifies that the succeeding clock pulses to be generated by the clock track are associated with the A, B, C and D sectors, respectively, in that order.

The winding 718 (FIG. 24) of the transducer 373 is suitably connected to an amplifier, the center tap of the winding being connected to ground and the opposite ends thereof being connected through two lines 719 and 720 to control grids of two vacuum tubes 721 and 722, respectively. The tubes 721 and 722 are connected in a well known manner as a push-pull amplifier arranged to minimize the effect of noise signals picked up. The output of the tubes 721 and 722 is arranged to drive three successive stages of push-pull amplification comprising six tubes 723 through 728 and the output of the tubes 727 and 728 is coupled to the control grids of two tubes 729 and 730, respectively, of a clipping stage. The tubes 729 and 730 are connected as a cathode follower, the cathodes thereof being connected together and returned through a resistor 731 to —100 volts. Additionally, each of the tubes 729 and 730 is biased sufficiently below cutoff to prevent noise signals that may appear on their control grids from passing therethrough to insure that only actual clock pulses sensed by the transducer are taken from the cathodes thereof. The non-return-to-zero form of recording is utilized herein and, therefore, both positive and negative-going pulses are generated at the transducer. Since, however, the signals applied to the opposite halves of each stage of the read amplifier are 180° out of phase, and since each half of the clipping stage is biased below cutoff, it will be understood that each clock pulse is generated, whether it be positive or negative, is taken from a line 732 connected to the cathodes of the tubes 729 and 730 as a positive pulse.

The clock pulses taken from the line 732 are applied to the #3 tap of a Schmitt trigger 735 (FIG. 23*a*) of the type shown in detail in FIG. 33. The Schmitt trigger 735 is provided to improve the waveform of the clock pulses, and when and as long as the #3 tap thereof is up, the #6 tap thereof is also up. The output, i.e., tap #6, is connected to the #5 tap of a detector 736 (FIG. 51), and it is the function of this detector to detect the gap in the clock track, i.e., to detect the reference marks. As long as the clock pulses are applied to the #5 tap of the detector 736, the condenser 737 is charged sufficiently negative to maintain the right-and tube thereof cut off and thereby maintain the #6 tap thereof high. When, however, the gap in the clock track is sensed by the transducer 373, the condenser 737 discharges sufficiently to permit the right-hand tube of the detector 736 to conduct, thereby lowering the potential of the #6 tap for the duration of the gap. The #6 tap is coupled to the #3 tap of another Schmitt trigger 738 which is identical to the Schmitt trigger 735, and the output tap #6 thereof is connected through an inverter 739 (FIG. 45) to the #9 tap (FIG. 23*b*) of a gate 740 (FIG. 34). The positive-going reference marks which are applied to the #9 tap of the gate 740 are normally prevented from passing therethrough since the #6 tap thereof is normally connected through the *o* contacts of the relay 612 to ground, which maintains the gate closed.

The #6 tap of the gate 740 (FIG. 23) is additionally connected through the n/o *p* contacts of the relay 612, through the n/o *a* contacts of the relay 715 and through the n/c *a* contacts of a relay 714 to +150 volts. Thus, when the relays 612 and 715 are latched in their transferred condition, as they are while the first 5 columns of the record card are being read into storage, and when the relay 741 is in the condition shown, the gate 140 is opened and the positive reference marks applied to the #9 tap thereof pass therethrough.

The #4 tap of the gate 740 is connected to the #3 tap of a single-shot multivibrator 742 of the type shown in FIG. 38, the #7 tap thereof being connected to the #3 tap of an "or" gate 743 (FIG. 37). The single-shot multivibrator 742 is controlled by the leading edge of each reference mary applied to the #3 tap thereof to generate a 20-millisecond positive-going pulse. The output of the "or" gate 743 is connected to the #9 tap of a power amplifier 744 (FIG. 44), the #3 tap of which is connected to the control grid 745 of a tube 746. The tube 746 is biased at cutoff and since the output of the power amplifier 744 is positive in form, the tube 746 is rendered conductive for 20 milliseconds by the leading edge of each reference mark to pass through the gate 740. A relay 747 is connected in the plate circuit of the tube 746 is energized when said tube conducts. Thus, as long as the gate 740 is open, the relay 747 is picked up by each reference mark taken from the clock track.

Referring back to FIG. 20*c*, it will be noted that one side of the escape armature contacts G–107*a* is connected to the control grid of the tube G–T3, the other side of the contacts G–107*a* being connected through the n/c *a* contacts of the relay 608 and through the n/o *a* contacts of the relay 747 to ground. Thus, each reference mark to pass through the gate 740 (FIG. 23*b*) grounds one side of the escape armature contacts G–107*a* for a short period, and thereby momentarily grounds the control grid of the tube G–T4 through the n/c *d* contacts of the relay G–R24, through the n/c *c* contacts of the relay G–R23, and through the n/c *c* contacts of the relay G–R22. When the control grid of tube G–T4 is grounded, G–T4 conducts and the escape magnet G–104 is energized, the circuit breaker contacts G–P1 being closed at this time (see FIG. 56).

It will be recalled that when the escape magnet G–104 is energized, the escape armature contacts G–107*a* are closed, thus grounding the grid of the tube G–T3 to render it conductive and energizing the pick coil of the relay G–R22 which is located in the plate circuit of G–T3. Energization of G–R22 opens its *c* contacts, thereby causing the tube G–T4 to cut off and resulting in the deenergization of the escape magnet and the reopening of the escape armature contacts G–107*a*. When the escape magnet G–104 is energized, the record card is controlled to escape to the next column. It should also be noted that the relay G–R22 is deenergized when the escape magnet G–104 is deenergized, since at this time the contacts G–107*a* are again opened. During the brief period that the relay G–R22 is energized, the grid of the tube G–T7 is connected through the *d* contacts of the relay G–R22 to ground, thereby biasing the tube G–T7 to conduct, which results in the energization of the punch clutch magnet G–204, thereby causing a punch cycle. Again, when the punch clutch magnet G–204 is energized, the sense pins are controlled to read the information punched in the next column of the record card. Thus, each reference mark to pass through the gate 740 (FIG. 23*b*) causes escapement together with a punch cycle, as described.

It will be recalled that the reference marks pass through the gate 740 (FIG. 23*b*) only as long as both of the relays 612 and 715 are latched in their transferred condition. It will be noted that the circuitry with which the #3 program contacts G–246 (FIG. 20*d*) are associated has been altered to the extent that when the relay 608 is deenergized, one side of the #3 program contacts is connected through the n/c *b* contacts of the relay 608 to +50 volts and that the other side thereof is connected through the n/c *c* contacts of the relay 608 to one side of the latch winding of the relay 612, the other side of the latch winding of the relay 612 being connected through the circuit breaker associated with the cam G–P3 to ground. Thus, when this circuit breaker is closed by the cam G–P3 and when the #3 program contacts G–246 are closed, the latch winding of the relay 612 is energized and the contacts associated therewith are returned to their normal position.

The program card (FIG. 55) on the program drum is provided with a #3 punch in the 5th column, and while the record card is being advanced by the 5th reference mark from the 5th column to the 6th column, the #3 star wheel senses the punch in the 5th column of the program card, thereby energizing the latch winding of the relay 612, which results in opening its *p* contacts (FIG. 23*b*) and accordingly closing the gate 740. When the gate 740 is closed, as above described, the first 5 columns of the record card have been read by the sense pins and have been entered into the address storage relays 658 through 689. Thus, during the first 5 columns, the escapement of the record card and the corresponding punch cycles are under the control of the reference marks, and when the card is advanced from the 5th to the 6th column the reference marks are prevented from thereafter causing escapement in this manner. Since the coil 712 (FIG. 22*b*) of the stepping switch is energized during each punch cycle through the *m* contacts of the relay 612, the unlatching of the relay 612 after the 5th column is read prevents further advancement of the rotor 651 in this manner since at this time the *m* contacts of the relay 612 are opened.

While the record card is being advanced by the punch cycle resulting from the 5th reference mark to the 6th column, the #3 program contacts G–246 sense the #3 punch provided in the 5th column of the program card and at this time the latch coil of the relay 612 is energized, thereby permitting its associated contacts to return to their normal position. This results in connecting the various sense pins G–223 through the n/c contacts *a* through *l* of the relay 612 (FIG. 21) and through a group of lines designated generally by the reference numeral 750 to one side of each of 12 relays 751 through 762 (FIG. 54), respectively, after the 5th column of the record card has been read into the address storage unit and before the 6th column is read. The other sides of the relays 751 through 762 are connected to +50 volts. Thus, during the punch cycle initiated by the 5th reference mark and after the associated escapement, the sense pins read the 6th column of the record card and enter that information into the relays 751 through 762.

Each of the relays 751 through 762 is provided with a hold coil 751*h* through 762*h*, one side of which is connected to the n/o *a* contacts of the associated relay 751 through 762 to ground, the other side of the hold coil being connected by a line 763 through the contacts of the circuit breaker 634 (FIG. 21) to +50 volts. The circuit breaker 634 is under the control of the cam 635 and when the cam 635 closes the circuit breaker 634, the hold coils 751*h* through 762*h* (FIG. 54) corresponding to pick coils 751 through 762 which are connected to grounded sense pins are energized. In this way the contacts of the relays 751 through 762 which correspond to holes punched in the 6th column of the record card are transferred and are held in their transferred condition until the cam 635 (FIG. 21) again opens the contacts of the circuit breaker 634.

The various contacts of the relays 751 through 762 (FIG. 54) are arranged in a well known manner to convert the information taken from the record card, which is recorded in the well known IBM code, to a seven-bit binary code for storage in the magnetic film. It will be seen that each of the output lines 764 through 769 which have the binary coded values of 1, 2, 4, 8, Z and O, respectively, is normally connected through the normally closed contacts of the various aforementioned relays 751 through 762 to −175 volts. When one or more of these relays is energized, however, according to the coded information sensed in the record card, certain of the associated contacts are opened, thereby disconnecting the −175 volt supply from predetermined output lines 764 through 769 determined by the rules of conversion. For example, if a 3 is sensed in the card, the relay 756 is picked up, and the *b*, *c*, *d*, *e* and *f* contacts thereof are transferred. A 3 is equal to a 1 and a 2 in binary form, and the lines 764 and 765 are disconnected from −175 volts. This, as will be seen hereinafter, removes the bias from corresponding stages of a shift register. Other coded characters taken from the record card are converted to binary form in a similar manner.

In addition to converting the information to binary form, certain contacts of the relays 751 through 762 are arranged to enter a check bit to the shift register, where necessary, to provide the binary coded form of each character entered therein with an odd number of bits. The purpose of the check bit is well known and need not be further explained, and it is felt that it is necessary only to point out that each character is provided with an odd number of bits by means of the above mentioned contacts to provide a system for detecting errors on readout, as will be more fully explained later. In short, the check bit matrix is arranged to disconnect a line 770 from −175 volts whenever certain, predetermined characters are entered into the relays 751 through 762, which characters have an even number of bits when coded in binary form. Thus, as in the prior example, when a 3 is sensed in the record card by the sense pins, the relay 756 is energized, and since a 3 has an even number of bits when coded in binary form, it will be understood that it is desired that a check bit be provided in this case. When the contacts of the relay 756 are transferred, more specifically, when the contacts 756*a* to 756*f* inclusive are transferred, it will be noted that the opening of the *a* contacts of a relay 771 disconnects the line 770 from −175 volts, thereby entering the necessary check bit into the shift register to provide the shift register with an odd number of bits.

It is desired that the relay 771 be picked up only momentarily to thereby permit only a momentary opening of its *a* contacts, and for this reason one side of the relay 771 is connected through a resistor 772 to +150 volts, the resistor being bypassed by a condenser 773, and the other side of the relay 771 being connected through the n/c *a* contacts of a relay 775, through the n/c *a* contacts of a relay 776, and through the n/o *c* contacts of the relay 644 to ground. It will be recalled that the relay 644 (FIG. 25) is energized by the closing of the circuit breaker 647, the cam 648 being arranged to close the contacts of circuit breaker 647 during each punch cycle. The relay 775 (FIG. 25) is connected between +50 volts and through the parallel, n/o *a* contacts of three relays 777, 778 and 779 to ground, and it is sufficient here to note that the relays 777, 778 and 779 are not energized when operating on the read-in mode and that, therefore, the relay 775 is not energized at this time. The relay 776 (FIG. 25) is connected between +50 volts and through the n/o *a* contacts of a relay 780 to ground. The relay 780 is not energized when the selector switch is on the read-in mode and, therefore, the relay 776 is not energized during read-in. Thus, each time the circuit breaker 647 is closed while on read-in, the relay 644 is energized and its *c* contacts (FIG. 54) are transferred, thereby grounding one side of the relay 771. Prior to this time, the condenser 773 charges to +150 volts, the time constant of the condenser 773 and the resistor 772 being arranged to permit only a momentary energization of the relay 771 when the *c* contacts of the relay 644 are transferred. As soon as the condenser 773 is discharged, the relay 771 drops out. Thus, it will be seen that the check bit line 770 is disconnected from −175 volts only during the momentary energization of the relay 771.

As explained above, the first column of the record card which contains the first digit of the address is read into the address storage relays 658 and 661 (FIG. 22*a*) during a false punch cycle caused by the zero punch in the first column of the program card. The next four columns, which contain the last four digits of the address, are successively entered into the corresponding address storage relays 665 through 668 and 678 through 689 under control of reference marks generated by the clock track. It should be noted here that the aforementioned relay 741 (FIG. 22*a*), a latch relay, which is connected between ground and one side of the circuit breaker 713, is energized and latched down during each card feed cycle and, therefore, that its contacts are latched in their transferred condition prior to the time that the record card is positioned with the first column thereof at the sensing station. The latch winding 741L (FIG. 22*b*) of the relay 741 (FIG. 22*a*) is connected between the *f* contact of the primary home row of contacts 654 of the stator and +50 volts, the *f* contact of the rotor 651 being connected through the n/o *b* contacts of the relay 741 to ground. Each of the remaining *f* contacts of the stator is connected through a line 782 and through the interrupter contacts 783 (FIG. 22*b*) of the coil 712 of the stepping switch to one side of the coil 712. While the relay 741 is latched down, it will be understood that the rotor of the stepping switch is advanced step by step to its primary home position, at which time the latch coil 741L is energized and the rotor is positioned with its contacts in engagement with the contacts of the row 654 of the stator. Thus, the contacts of the relay 741 remain transferred until the rotor reaches its primary home position.

Figure 20D:
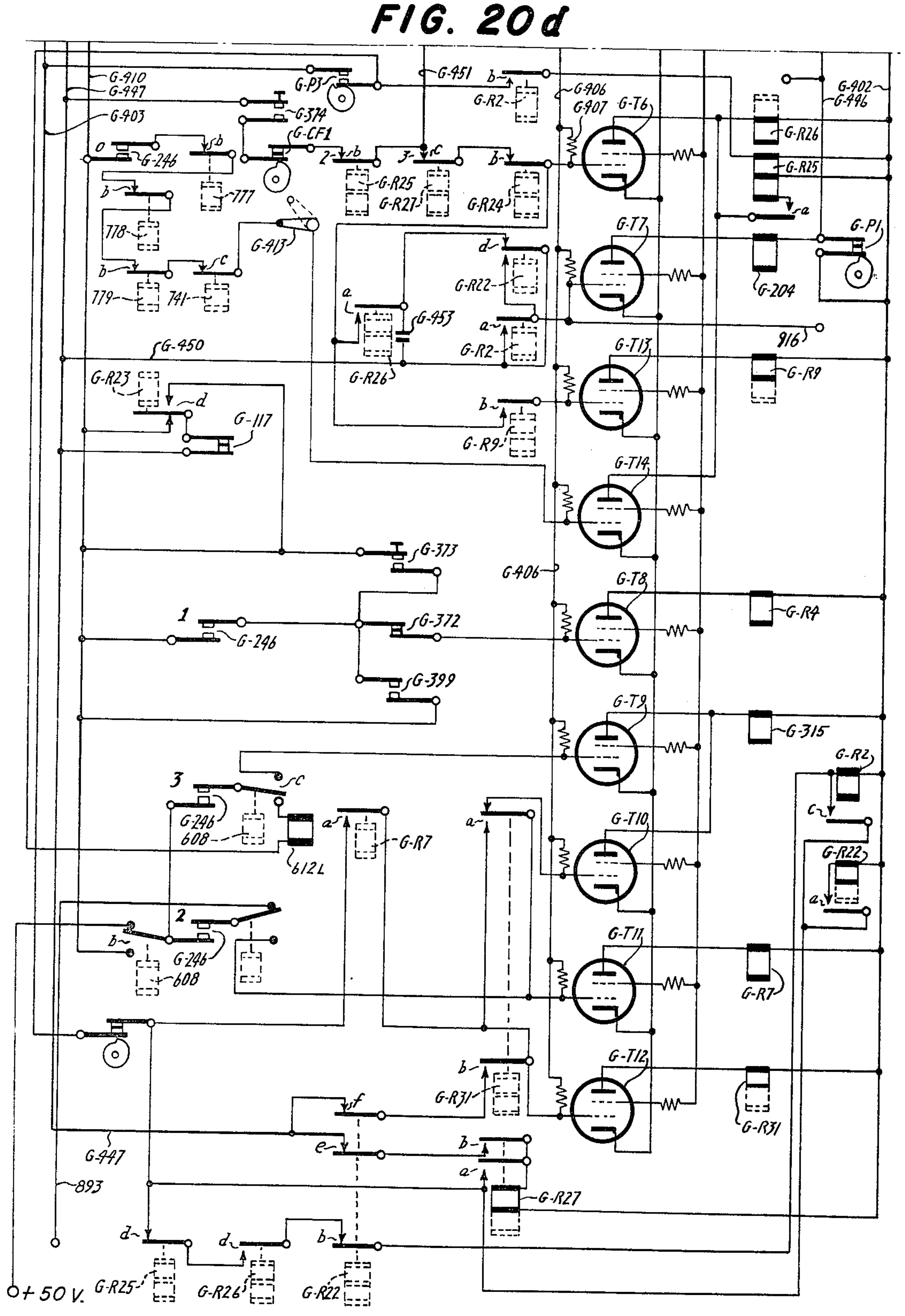

When the relay 741 is latched down, its *a* contacts (FIG. 23*b*) are open and the gate 740 is closed to prevent the passage of reference marks therethrough until the rotor is in its home position. During the interval that the rotor is being homed, it is also desired to prevent the above described initial false punch cycle since the data taken from the first column of the record card is to be entered into the address storage relays 658 and 661 which are associated with the primary home position of the rotor. Referring to FIG. 20*d*, it will be seen that one side of the zero program contacts is serially connected through the n/c *b* contacts of the relays 777, 778 and 779, which relays are not energized on read-in, and through the n/c *c* contacts of the relay 741 to the control grid of the tube G–T14. When the relay 741 is latched down, therefore, the control grid of tube G–T14 cannot be grounded through the zero program contacts and a false punch cycle cannot, therefore, take place under the control of the zero program contacts until the rotor of the stepping switch reaches its primary home position. When the relay 741 is unlatched, a false punch cycle is initiated and the first column address data is entered into the storage relays 658 and 661. Also at this time the gate 740 is opened, thereby permitting the passage of reference marks therethrough. As explained above, the 5th reference mark advances the record card to place the 6th column thereof at the pin sensing station and additionally enters the information recorded in the 6th column into the recoder relays 751 through 762 for entry into the shift register.

The shift register is illustrated in FIG. 27 and comprises eight stages, each of which includes two bistable triggers of the type illustrated in FIG. 30. The output lines 764 through 770 from the coder shown in FIG. 54 are connected to the #5 tap of a corresponding trigger 791 through 797, respectively. Each of the triggers 791 through 797 is reset each cycle in such a way that the #7 taps thereof are initially low, since the #4 taps thereof are each returned through the n/c *q* contacts of the relay 612 to −175 volts. During the reading of the first 5 columns of the card, the contacts of the relay 612 are transferred, thereby maintaining the *q* contacts thereof open, as earlier described, and just before the 6th column is read, the relay 612 is unlatched, thereby restoring the bias on the #4 taps of the triggers 791 through 797. It was noted above that each of the lines 764 through 770 is normally connected to −175 volts through the recoder matrix shown in FIG. 54, and it will be clear that when one or more of these lines are opened, the corresponding trigger is controlled to reverse its condition of stability. Thus, when information has been entered from the record card into the relays 751 through 762, it is recoded and entered into the triggers 791 through 797 (FIG. 27) since the #7 tap of the corresponding trigger goes up when the associated line 764 through 770 is disconnected from the −175 volt supply, as described in connected with the recoding matrix. To resume with the example discussed earlier, it was shown that when a 3 was entered from the card into the relays 751 through 762 (FIG. 54), each of the lines 764 and 765 was disconnected from the −175 volt supply. This results in the #7 taps of the triggers 791 and 792 (FIG. 27), respectively, being raised. Additionally, when the relay 771 (FIG. 54) is energized, the #7 tap of the trigger 797 (FIG. 27) goes up to enter the check bit in the shift register. It will now be understood that data read from the 6th column of the record card plus a check bit, where necessary, is entered in the triggers 791 through 797, and such data remains there until the machine is ready to enter it into the magnetic storage unit.

At the proper time, which time will be explained shortly, shift pulses which are derived from the aforementioned clock pulses are entered into the shift register through a line 798 (FIG. 27) and are applied to the #9 tap of a power amplifier 799 (disclosed in detail in FIG. 44). These shift pulses, negative-going in form, are taken from the #3 and #4 taps of the tube 799 as positive-going pulses. The #4 tap of the tube 799 is connected to the #6 taps of the triggers 791 through 797, and also to the #6 tap of another trigger 800. It was explained above that the #7 taps of the triggers 791 through 797 are normally low but that when a bit is stored therein, the corresponding #7 taps are high. The #7 tap of each of the triggers 791 through 797 is connected to the #3 tap of an associated trigger 801 through 807, each of these triggers being reset in the same manner in which the triggers 791 through 797 are reset. Thus, the negative-going edge of each shift pulse applied to the #6 taps of the triggers 791 through 797 causes those of these triggers having bits stored therein to reverse their condition of stability, the #7 taps of such triggers being controlled to drop at this time. It will be assumed that when one of the various shift register triggers has a bit stored therein, it is "on" and, conversely, it is "off" when no bit is stored therein. When one or more of the triggers 791 through 797 is turned off by the negative-going edge of a shift pulse applied to the #6 tap thereof, the corresponding triggers 801 through 807 are turned on.

The shift pulses taken from the #3 tap of the amplifier 799 are applied to the #9 tap of a similar power amplifier 810, the #4 tap of which is connected to the #6 taps of the triggers 801 through 807. The shift pulses taken from the #4 tap of the amplifier 810 are 180° out of phase with the shift pulses taken from the #4 tap of the amplifier 799. The negative-going edge of each such pulse is arranged to turn off all of the triggers 801 through 807 that are on at that time. Thus, it will be seen that the leading edge of a shift pulse applied to the #6 taps of the triggers 791 through 797 transfers bits stored therein to the corresponding trigger 801 through 807 and one-half shift pulse later the triggers 801 through 807 containing such transferred bits are turned off. When one of the triggers 801 through 807 is turned off, the next succeeding trigger 791 through 796 or 800 is turned on since the #7 taps of the triggers 801 through 807 are connected to the #3 taps of the next successive triggers 791 through 796 and 800, respectively.

The #8 tap of the trigger 800 is connected through a line 811 to the write amplifier (FIG. 26). The #8 tap of the trigger 800 (FIG. 27) is normally high; however, when a bit is stored therein, said tap is low. Thus, a binary coded pulse train corresponding to the character read from the record card and entered into the shift register is taken from the #8 tap of the trigger 800 and is fed through the line 811 to the write amplifier when eight shift pulses are applied to the #9 tap of the amplifier 799.

Thus far, it has been shown how information is read from the 6th column of the card into the triggers 791 through 797 of the shift register, at which location this information remains until shift pulses are provided to shift it serially therefrom into the write amplifier. It will be understood that it is not desired to shift information out of the shift register until the transducers are located adjacent the correct track of the proper magnetic disc. When the servomechanism described previously locates the proper track, it will be recalled that the relay contacts 526, 527, 528 and 529 (FIG. 18*b*) of the relays 404, 401, 405 and 402 are all closed, thereby connecting +50 volts to the line 812.

Referring now to FIG. 23*a*, it will be seen that the line 812 from the servo is connected to the #6 tap of a trigger 813 (disclosed in detail in FIG. 31). Since the line 812 is connected to +50 volts when the transducer is positioned adjacent the desired track, the #6 tap of the trigger 813 goes up sufficiently to reverse the condition of stability of said trigger at this time, thereby causing the #8 tap thereof to drop in potential. The trigger 813 is reset by removing the bias from the #9 tap thereof each card feed cycle in such a way that the #8 tap thereof is initially high. A relay 814 (FIG. 22*a*) connected between ground and the circuit breaker contacts 713 is energized each card feed cycle due to the action of the cam 714. One side of the *a* contacts (FIG. 25) of the relay 814 is connected through the armature and contacts of the second deck 600*b* of the selector switch 600 to −100 volts, the other side being connected through a line 817 to the #4 tap of the trigger 813. Thus, during each card feed cycle the trigger 813 is reset, to render the #8 tap thereof high, due to the opening of the *a* contacts of the relay 814. Also, said trigger is reset each time the selector switch 600 is moved to a new position. The #8 tap of the trigger 813 (FIG. 23*a*) is connected to the #3 tap of a trigger 815 (illustrated in detail in FIG. 30). The #7 tap of the trigger 815 is normally low since that trigger is reset by disconnecting the −100 volts normally connected to the #4 tap thereof each card feed cycle, the #4 tap being connected to −100 volts by means of the line 817. Thus, when the track-located signal causes the #8 tap of the trigger 813 to drop, the trigger 815 reverses its condition of stability, thereby raising the #7 tap thereof. The #7 tap of the trigger 815 is connected to the #9 tap (FIG. 23*b*) of a gate tube 816 (disclosed in detail in FIG. 34), and as long as the #7 tap of the trigger 815 is high, the gate 816 is open to permit passage of positive signals applied to the #6 tap thereof.

It will be recalled that reference marks are taken from the #7 tap of the tube 739 (FIG. 23*a*) and are applied to the #9 tap of the gate tube 740 (FIG. 23*b*). The #7 tap of the gate tube 740 is connected both to the #9 tap thereof, through a voltage-dropping resistor, and to the #6 tap of the gate 816, and reference marks are therefore applied to the #6 tap of the gate 816. As long as the gate 816 is open, reference marks pass therethrough and are taken from the #5 tap thereof as negative-going pulses. The #5 tap of the gate tube 816 is connected to the #6 tap of a trigger 818, the #2 tap of which is connected through a line 819 to the #6 tap of a gate tube 820 (FIG. 23*a*)—disclosed in detail in FIG. 34. The detailed circuit diagram of the trigger 818 (FIG. 23*b*) is disclosed in FIG. 30, and said trigger is reset in the same manner in which the triggers 813 and 815 are reset. Thus, when the trigger 818 is reset, the #2 tap thereof is low and the negative-going edge of the first reference mark generated after the track-located signal reverses the condition of stability thereof, thereby raising the potential of the #2 tap. The #2 tap remains high until after the 80th column of the card has been read, as will be explained later.

It was noted above that the pulses from the clock track are taken from the #6 tap of the Schmitt trigger 735 (FIG. 23*a*), which tap, in addition to being connected to the #5 tap of the detector 736, is connected to the #9 tap of the gate 820, and it will be understood that as long as the gate 820 is open, as it is from the time of the first reference mark after the track-located signal until the 80th column of the card has been read, the clock pulses pass therethrough and are taken from a line 821 connected to the #5 tap thereof. Thus, when, but not until, the first reference mark after the track-located signal has been generated, clock pulses are taken from the #5 tap of the gate 820 through the line 821, which line is connected to the #3 and #6 taps of a trigger 822 (FIG. 29) which comprises a portion of the locator circuits to be described later herein.

The clock pulses taken from the #6 tap of the trigger 735 (FIG. 23*a*) are also applied to the #5 tap of an inverter tube 823 (shown in detail in FIG. 45), the #7 tap of which is connected to the #9 tap of a gate tube 824 (shown in detail in FIG. 34). When the #6 tap of the gate 824 is high, clock pulses applied to the #9 tap thereof are taken from the line 798 connected to the #4 tap and are applied to the #9 tap of the amplifier 799 of the shift register (FIG. 27). The #7 tap of the gate tube 816 (FIG. 23*b*), which tap is connected to the #9 tap thereof through a voltage-dropping resistor, is connected to the #6 tap of a gate tube 826 (FIG. 23*a*) (disclosed in detail in FIG. 36). Thus, the gate 826 is opened by the track-located signal since the #6 tap thereof goes up when the #7 tap of the trigger 815 goes up, and this occurs, it will be recalled, when the proper track has been located by the servo.

Referring now to FIG. 29, the locator circuits generally comprise a divide-by-8 counter, a divide-by-75 counter and a divide-by-4 counter. The #5 tap of the gate 820 (FIG. 23*a*) is connected through the line 821 to the #3 and #6 taps of the trigger 822 (FIG. 29), which trigger is the first of three stages of the divide-by-8 counter, the remaining stages comprising triggers 827 and 828. The #4 tap of each of the triggers 822, 827 and 828 is connected through a line 830 to one side of the n/c *a* contacts (FIG. 25) of the relay 814, and since the relay 814 is energized during each card feed cycle the triggers 822, 827 and 828 (FIG. 29) are reset each card feed cycle in such a way that the #8 taps thereof are initially low, the #2 tap of the trigger 828 being initially high. The divide-by-8 counter is of a well known variety, and it will be understood that the leading, negative-going edge of each 8th clock pulse supplied thereto through the line 821 causes the #2 tap of the trigger 828 to rise in potential. Similarly, for a purpose to be more fully described later therein, the #8 tap of the trigger 828 drops at the beginning of each 8th clock pulse.

The #2 tap of the trigger 828 is connected to the #6 tap of an inverter 831 of the type shown in FIG. 40, and when the #2 tap of the trigger 828 rises, i.e., on the leading edge of each 8th clock pulse, a negative impulse is taken from the #8 tap of the tube 831, which impulse is inverted by an inverter 832 and amplified by an amplifier 833 and is taken from the #4 tap of said amplifier as a negative impulse. (The inverter 832 is disclosed in detail in FIG. 45 and the amplifier 833 is disclosed in detail in FIG. 50.) Thus, on the leading edge of each 8th clock pulse, the #4 tap of the amplifier 833 momentarily drops in potential.

The #4 tap of the amplifier 833 is connected to the #6 tap of each of three triggers 834, 835 and 836 which are connected as a ring counter in a well known manner. The triggers 834 and 836 are reset during each card feed cycle in such a way that the #8 taps thereof are initially low, and the trigger 835 is similarly reset in such a way that the #8 tap thereof is initially high, the triggers 834 and 836 having their #4 taps connected to the line 830 and the trigger 835 having its #5 tap connected to the line 830. In this way, a "1" is set in this ring counter initially, and the second impulse after reset taken from the #4 tap of the amplifier 833 lowers the potential of a line 837 connected to the #2 tap of the trigger 836, and thereafter every 3rd pulse taken from the #4 tap of the amplifier 833 controls the potential of the line 837 to drop. The triggers 834, 835 and 836 comprise a divide-by-3 counter which, along with two divide-by-5 counters to be described shortly, make up the divide-by-75 counter mentioned previously.

The line 837 is connected through an amplifier 838 to the #6 tap of each of five triggers 839 through 843 which form the first of the two divide-by-5 counters, the #2 tap of the trigger 843 being connected through another amplifier 844 to the #6 tap of each of five triggers 845 through 849 which form the second aforementioned divide-by-5 counter. The triggers 839 through 843 and 845 through 849 are reset in the same manner described above in connection with the triggers 822, 828, 829 and 834 through 836 in such a way that the #8 taps of the triggers 839 and 845 are initially high and the #8 taps of the triggers 840 through 843 and 846 through 849 are initially low, the #2 tap of the trigger 843 being initially high. Each of the divide-by-5 counters, like the divide-by-3 counter, is of the ring counter variety, and it will be understood that 592 clock pulses after reset, the #8 tap of the trigger 849 drops in potential. Additionally, the #8 tap of the trigger 849 drops every 600 clock pulses thereafter. As was explained earlier in the description, there are four records on each track of each disc, each record containing sufficient space to store 75 digits, and since there are 8 bits per character each record contains storage space for 600 bits. Thus, without an additional entry, as will be explained, it will be clear that the #8 tap of the trigger 849 first drops in potential on the leading edge of the 592nd clock pulse.

The #8 tap of the trigger 849 is connected to the #3 and #6 taps of a trigger 851 which, along with a trigger 852, comprises the aforementioned divide-by-4 counter. The triggers 851 and 852 are reset during the card feed cycle immediately preceding a read-in operation, in the same manner that the other locator triggers are reset, described above, in such a way that the #8 and #7 taps, respectively, thereof are initially low. Each time the #8 tap of the trigger 849 drops in potential, trigger 851 reverses its condition of stability, and each time the #8 tap of the trigger 851 drops in potential, i.e., every second time the #8 tap of trigger 849 drops, the trigger 852 is controlled to reverse its condition of stability. Thus, the #7 tap of the trigger 852 drops in potential every fourth time the #8 tap of the tube 849 drops.

The #5 taps of the triggers 851 and 852 are connected through the *a* contacts of the relays 661 and 662, respectively, to —100 volts. It will be recalled that the relays 661 and 662 are part of the aforementioned address storage unit and that these relays are provided to store that portion of an address which defines the desired record. It will be recalled that the triggers 851 and 852 are reset in such a way that the #8 and #7 taps thereof are normally low; however, a momentary energization of either or both of the relays 661 and 662 changes this condition. It was explained hereinbefore that each track is divided into four sectors called records (see FIG. 7). For the purposes of this description, the records lying in the first sector to pass the transducer after the reference mark are referred to as the No. 3 records, the records lying in the second sector being called the No. 2 records, etc., as shown in FIG. 7, it being assumed that the disc shown therein is rotated in a clockwise direction. Thus, for example, if it is assumed that an address defines a No. 3 record, both of the relays 661 and 662 will have been momentarily energized and the #8 and #7 taps of the triggers 851 and 852 will be set high initially, thereby entering a 3 into the divide-by-4 counter at the start. Under these circumstances it will be seen that the #7 tap of trigger 852 drops in potential at the beginning of the 74th digit of the No. 3 record, i.e., after 592 clock pulses. Thus, the #7 tap of the trigger 852 drops at the beginning of the last digit of the selected one of the four records.

The #7 tap of the trigger 852 isconnected to the #3 tap of an "and" gate 853, shown in detail in FIG. 48. The #5 tap of the "and" gate 853 is connected through the n/c *a* contacts of a relay 854 to +150 volts, and as long as the *a* contacts of the relay 854 are in the condition shown, the "and" gate 853 is closed since the #6 and #7 taps thereof are held down. Under these conditions both halves of the gate 853 are arranged to conduct; however, when the relay 854 is energized, the *a* contacts thereof are opened and the tube associated with the #5 tap of the gate 853 is cut off. Thus, when the *a* contacts of the relay 854 are opened, the gate 853 is open and a negative impulse applied to the #3 tap thereof passes therethrough and is taken as a positive impulse from the #6 and #7 taps.

The relay 854 (FIG. 20*c*) is connected between ground and through the circuit breaker contacts associated with the cam G–P1 to +50 volts. Thus, as long as these circuit breaker contacts are closed, the relay 854 is energized and the gate 853 (FIG. 29) is open. Since information is read from and into the magnetic file only while the punch cams are at rest, and since the circuit breaker contacts associated with the cam G–P1 are closed at this time (see FIG. 56), the gate 853 is open during the read-in and read-out portion of each cycle.

When the #7 tap of the trigger 852 drops, it will be understood that the #6 and #7 taps of the gate 853 rise momentarily, if the gate is open as described above. The #6 and #7 taps of the gate 853 are connected to the #9 tap of an amplifier 855 (disclosed in FIG. 50). Thus, when the gate 853 is open and the #7 tap of the trigger 852 goes down, a negative impulse is present on a line 856 connected to the #3 tap of the amplifier 855.

Referring back to FIG. 23*a*, it will be noted that the #6 tap of the Schmitt trigger 738 is connected through a line 857 to the #3 tap of a trigger 858 (FIG. 29), the #7 tap of said trigger being connected to the #3 tap of the inverter 831. The inverter 831 is connected as an "or" gate, and a positive-going impulse placed on either the #6 or #3 tap thereof causes the #9 and #8 taps to drop momentarily. It will be recalled that reference marks are taken from the #6 tap of the Schmitt trigger 738 (FIG. 23*a*) and each such reference mark is therefore applied through the line 857 to the #3 tap of the trigger 858 (FIG. 29). The #6 tap of the trigger 858 is connected by a line 859 to a reset circuit, to be described, which is arranged to drive the #6 tap negative at the beginning of a read cycle if the punch mechanism is ready to read, as will be explained later. Thus, assuming that the trigger 858 has been reset, the negative-going, leading edge of each reference mark applied to the #3 tap thereof raises the potential of the #7 tap and thereby applies a positive pulse to the #3 tap of the "or" gate 831. This pulse simulates 8 clock pulses and has the effect of advancing the pulse taken from the #3 tap of the amplifier 855 by 8 clock pulses or one digit. The overall operation of the locator circuits will be explained in connection with the actual entry of information taken from the record card onto the discs.

The #6 tap of a trigger 862 (FIG. 23*a*), of the type disclosed in FIG. 30, is connected through a line 863 to the #4 tap of the amplifier 833 (FIG. 29). Also, the #3 tap of the trigger 862 (FIG. 23*a*) is connected through the line 856 to the #3 tap of the amplifier 855 (FIG. 29). It will be recalled that the #4 tap of the amplifier 833 drops in potential on the leading edge of each 8th clock pulse, i.e., on the 8th, 16th, 24th, etc., clock pulses. Assuming that the information stored in the 6th column of the record card, i.e., the first column of data stored in the record card, is now to be entered into a record located in the zero sector of a given track of one of the magnetic discs, a negative impulse is applied through the line 856 to the #3 tap of the trigger 862 (FIG. 23*a*) at the beginning of the 75th digit of the zero record, i.e., after 2400—8 or 2392 clock pulses. Since the trigger 862 is reset by disconnecting the #4 tap thereof from the —100 volt bias supply during each card feed cycle, the #7 tap thereof is initially low and the negative pulse applied to the #3 tap reverses the condition of stability of this trigger, thereby raising the potential of the #7 tap. Eight clock pulses later the negative impulse taken from the #4 tap of the amplifier 833 (FIG. 29) and applied to the #6 tap of the trigger 862 (FIG. 23*a*) reverses the condition of said trigger and causes the #7 tap thereof to go down. The resulting positive pulse taken from the #7 tap is therefore of 8 clock pulses duration and, since it defines the location at which the information stored in the record card is to be stored in the magnetic file, it is referred to as the "appropriate digit gate."

The #7 tap of the trigger 862 is connected to the #9 tap of the gate 826. It will be recalled that the #6 tap of the gate 826 is raised, thereby opening said gate, when the track-located signal is received by the trigger 813. Thus, as long as the #6 tap of the gate 826 is high, i.e., after the track-located signal and until the #7 tap of the gate 816 drops, as will be explained, the appropriate digit gates pass therethrough and are applied to the #9 tap of an amplifier 864 of the type shown in FIG. 44. The #3 tap of the amplifier 864 is connected to the #6 tap of the gate 824 and since the #3 tap of the amplifier 864 is high for the duration of the appropriate digit gate, the clock pulses applied to the #9 tap of the gate 824 pass therethrough during the appropriate digit gate.

It was mentioned earlier herein that the #4 tap of the gate 824 is connected through the line 798 to the amplifier 799 (FIG. 27) and it is through this line that the clock pulses reach the shift register. Thus, for the duration of each appropriate digit gate, and only during this time, are clock pulses entered into the shift register, and information stored in the shift register is shifted serially therefrom to the write amplifier by each such clock pulse generated during each appropriate digit gate.

The line 811 (FIG. 27) extends from the #8 tap of trigger 800 to each of the control grids of a trigger 865 (FIG. 26), and each bit shifted out of the trigger 800 (FIG. 27) reverses the condition of stability of the trigger 865. Depending upon its prior condition, the plates of the trigger 865 are either high or low, and since the non-return-to-zero type of magnetic recording is utilized herein, it makes no difference what the initial condition of stability is. For example, let it be assumed that the plate of the right-hand tube is initially high and that the plate of the left-hand tube is accordingly low. It will be understood that a bit pulse reverses this condition. The plate of the right-hand tube of the trigger 865 is connected to the #3 grid of a gate tube 866, the plate of the left-hand tube of the trigger 865 being connected to the #3 grid of another gate tube 867. The control grids of the gates 866 and 867 are normally low, thereby normally preventing any bit pulses from the trigger 865 from passing therethrough. However, when the control grids of the gates 866 and 867 are up, bit pulses cause one or the other of the plates of the gates 866 and 867 to drop, the particular one to drop being dependent upon the initial condition of the trigger 865. The plates of the gates 866 and 867 are connected to the control grids of two amplifiers 868 and 869, respectively, the plates of which are connected to the control grids of four cathode followers 870, **870*a*, 871 and 871*a***, substantially as shown in the drawing.

Assuming, as above, that the plate of the right-hand tube of the trigger 865 is initially high, it will be understood that the first bit applied to the control grids thereof when the gates 866 and 867 are open causes the potential of the control grids of the cathode followers 870 and **870*a* to drop and similarly causes the potential of the control grids of the cathode followers 871 and 871*a* to rise. When this occurs, the potential of the cathodes of the cathode followers 870 and 870*a* goes down and, also, the potential of the cathodes of the cathode followers 871 and 871*a* goes up. The cathodes of the cathode followers 870 and 870*a* are connected to a line 872, the cathodes of the cathode followers 871 and 871*a* being connected to a line 873. As will become clear, the lines 872 and 873 are connected across the coil of one of the two data transducers when operating on the read-in mode of operation. Thus, each bit shifted from the shift register into the write amplifier while the control grids of the gates 866 and 867 are high causes the current through the lines 872 and 873** to reverse its direction, as will become clear hereinafter, thereby effecting magnetic recordation of bits at the proper locations on the disc, since the shift register is under the control of the clock pulses generated by the clock track.

The potential of the control grids of the gates 866 and 867 is controlled by the potential of the #7 tap of a trigger 875 (FIG. 23*a*) of the type shown in FIG. 30, these control grids being connected by a line 874 to the #7 tap of the trigger 875. A trigger 876 (disclosed in detail in FIG. 30), the #8 tap of which is connected to the #6 tap of the trigger 875, has its #3 tap connected through a line 877 to the #8 tap of the trigger 828 (FIG. 29). It will be recalled that the #8 tap of the trigger 828 is arranged to drop in potential at the beginning of each 8th clock pulse reaching the locator circuits. The #8 tap of the trigger 876 (FIG. 23*a*) is initially low, the #6 tap thereof being connected to the #8 tap of the Schmitt trigger 735, since each clock pulse taken from the #8 tap of the Schmitt trigger 735 resets the trigger 876 in this manner. Thus, at the beginning of the 8th clock pulse generated during the appropriate digit gate the #3 tap of the trigger 876 is hit with a negative-going impulse which results in raising the potential of the #8 tap thereof, and one-half clock pulse later the #6 tap of the trigger 876 drops, thereby again reversing the condition of the trigger and lowering the potential of the #8 tap thereof.

The negative-going edge of the first shift pulse taken from the #4 tap of the amplifier 810 (FIG. 27), which tap is connected by a line 878 to the #3 tap of the trigger 875 (FIG. 23*a*), raises the potential of the #7 tap thereof, and the #7 tap remains high until the #8 tap of the trigger 876 drops, which occurs, as was explained above, on the negative-going edge of the 8th clock pulse applied to the #6 tap of the trigger 876 during the appropriate digit gate. Thus, it will now be clear that in the middle of the first clock pulse following the creation of the appropriate digit gate the #7 tap of the trigger 875 is raised, thereby opening each of the gates 866 and 867 (FIG. 26) to permit the bits being shifted from the shift register to pass therethrough to one of the two transducer coils, as explained earlier, and the negative-going edge of the 8th clock pulse again closes these gates.

As mentioned above, the lines 872 and 873 (FIG. 26) are connected across one of the two data transducers when using the read-in mode of operation, the particular transducer utilized in a particular case being dependent upon the disc address. The lines 872 and 873 are connected through the n/o *a* and *b* contacts, respectively, of a relay 879 and through the n/c *a* and *b* contacts, respectively, of a relay 880 to alternate sides of the winding 881 of one of the data transducers. The relay 879 is called the read-write relay and is connected between +50 volts and one side of the n/o *o* contacts of the relay 611, the other side of these contacts being grounded. The relay 611 is energized during read-in and, therefore, the relay 879 is energized at this time. Thus, under the conditions shown, the lines 872 and 873 are connected across the winding 881 when using the read-in mode.

Energization of the relay 880 disconnects the lines 872 and 873 from across the winding 881 and connects them across the winding 882 of the second data transducer. Relay 880 is connected between ground and one side of the n/o *h* contacts of the relay 678, the other side of which is grounded, and since the relay 678 is of the latch type, it will be understood that after it has been energized the lines 872 and 873 are connected across the winding 882. The desired disc is defined by the second and third digits of an address and is therefore stored in the relays 665 through 681 (FIG. 22*a*).

Each side of each of the discs is given a number, and they are numbered consecutively from *l* through *n*. Thus, all odd numbered disc addresses lie on the same sides of the various discs, even numbered disc addresses being arranged to lie on the other sides of the discs. The two data transducers are arranged to straddle each of the various discs, and it should be clear that the particular transducer to be utilized is determined by the disc address, i.e., whether it is odd or even. If a disc address is odd, then the "1" relay 678 in the units column of the disc address storage relays 678 through 681 is energized and the write amplifier is connected through the lines 872 and 873 to the winding 882; however, if the disc address is even, the relay 678 is not picked up and the write amplifier is connected across the winding 881. In this way the proper data transducer is chosen.

After the information in the 6th column of the record card has been entered into the magnetic storage unit as described above, it is necessary for the card punch to go through a punch cycle to thereby advance the card to the 7th column. The end of the appropriate digit gate is utilized for this purpose since at this time the last bit of the digit stored in the 6th column has been shifted from the shift register into magnetic storage. It will be recalled that the appropriate digit gate is present on the #3 tap of the amplifier 864 (FIG. 23*a*). The #4 tap of the amplifier 864 is connected to the #3 tap thereof through a resistor and the #4 tap is connected by a line 883 to the #3 tap of a single-shot multivibrator 884 (FIG. 23*b*) which is disclosed in detail in FIG. 38. The trailing, negative-going edge of the appropriate digit gate fires the single-shot 884 which generates a 20-millisecond positive-going pulse. This pulse is taken from the #7 tap thereof and is applied to the #9 tap of a gate 885 (shown in FIG. 34). The 20-millisecond pulses generated by the single-shot 884 are referred to hereinafter as "punch commands."

During read-in, the gate 885 is maintained open to permit the passage of the punch commands since the #6 tap thereof is maintained high. The #6 tap of the gate 885 is connected to the #7 tap of a trigger 886 (shown in detail in FIG. 30), which tap is high during read-in due to the fact that the #5 tap thereof is floating, the #5 tap being connected through the n/c *p* contacts of the relay 611 to −100 volts and the relay 611 being picked up when the read-in mode is being utilized, as described previously.

During read-in, the punch commands generated by the single-shot 884 are taken from the #4 tap of the gate 885 as negative-going pulses. The #4 tap of the gate 885 is connected to the #5 tap of an inverter 888 (shown in detail in FIG. 49). The #7 tap of the inverter 888 is connected to the #9 tap of a gate 889 and when the gate 889 is open the negative-going punch commands passing therethrough and taken from the #4 tap thereof are applied to the #3 tap of the other half of the inverter 888. During read-in it is desired that the gate 889 be maintained open to permit the passage of these pulses therethrough, and it is for this reason that the #6 tap thereof is connected to the #2 tap of a trigger 890. During read-in the #2 tap of the trigger 890, and thus the #6 tap of the gate 889, is maintained high since the #4 tap of the trigger 890 is floating during read-in due to the energization of the relay 611 and the corresponding opening of the *q* contacts thereof. Thus, the punch commands passing through the gate 889 are taken from the #6 tap of the inverter 888 as positive pulses, which pulses are applied through a line 891 to the #5 tap of the "or" gate 743. Each punch command applied to the #5 tap of the "or" gate 743 causes the #6 tap thereof to drop, which results, as explained earlier herein, in a punch cycle. During each punch cycle, the record card escapes to the next column and the information recorded in that column is read therefrom into the shift register.

It should be noted that, in addition to generating the punch command, the end of the appropriate digit gate closes the gate 824 to prevent additional clock pulses from going to the shift register, and it is not until another appropriate digit gate is generated that further clock pulses go to the shift register. In this way the information entered into the shift register via the sense pins cannot be shifted out until the appropriate time which is determined by the appropriate digit gate.

Referring back to the locator circuits shown in FIG. 29, it will be recalled that it is desired to reset the trigger 858 after each digit is read from the shift register into magnetic storage, and for this reason the #6 tap thereof is connected through the line 859 to the #4 tap of a gate 892 (FIG. 23*b*). The #9 tap of the gate 892 is connected to the #2 tap of the trigger 818, the #6 tap of the gate 892 being connected to the #7 tap of the inverter 888. It will be recalled that the #2 tap of the trigger 818 is high from the time of the receipt of the first reference mark after the 5th column until the end of the 80th column. Thus, the #9 tap of the gate 892 is high during this period and positive pulses applied to the #6 tap thereof may be taken from the #4 tap as negative-going pulses. The punch commands generated by the single-shot multivibrator 884 which pass through the gate 885 and are inverted by the inverter 888 are taken from the #7 tap of the inverter 888 as positive pulses, and since the #7 tap of the inverter 888 is connected to the #6 tap of the gate 892, negative-going punch commands are taken from the #4 tap of the gate 892 and are applied through the line 859 to the #6 tap of the trigger 858 (FIG. 29), thereby resetting the trigger 858 after the appropriate digit gate has terminated.

When a punch cycle is initiated by a punch command, the record card is controlled first to escape to the next column, and the sense pins are thereafter controlled to sense the information in the next column and to enter it into the shift register as described previously. It is desired that successive appropriate digit gates occur 8 clock pulses earlier in the cycle and that this occur for each successive character read from the record card to thereby generate the write gate at a time which will permit that character to be entered into successively preceding digit locations on the magnetic record. This is accomplished by entering the reference marks taken from the #6 tap of the Schmitt trigger 738 (FIG. 23*a*) into the divide-by-75 counter of the locator. The #6 tap of the Schmitt trigger 738 is connected through the line 857 to the #3 tap of the trigger 858 (FIG. 29). It was explained earlier that each punch command which causes the record card to escape to a successive column is arranged also to reset the trigger 858 in such a way that the #7 tap thereof is low. Thus, each reference mark applied to the #3 tap of the trigger 858 after it has been reset by a punch command raises the #7 tap thereof, and thereby enters a count into the divide-by-75 counter. This is equivalent to 8 clock pulses and will thereby cause the pulse taken from the #3 tap of the amplifier 855 to occur 8 clock pulses earlier in the next cycle, i.e., at the beginning of the next preceding digit storage position. Assuming, for example, that the 6th column of the record card has been entered into the 75th character storage position on a given record of one of the discs, the next appropriate digit gate is created at the beginning of the 74th storage position to permit the entry of the 7th column of information into this position. Successive characters are entered into successively preceding pockets in a similar manner.

It was mentioned earlier that the #5 tap of the "and" gate 853 (FIG. 29) is connected through the n/c *a* contacts of the relay 854 to +150 volts, and as long as the *a* contacts of the relay 854 are closed, it will be clear that any pulse taken from the #7 tap of the trigger 852 cannot pass therethrough, since under these conditions the #6 and #7 taps of the "and" gate 853 cannot rise. Thus, unless the relay 854 is picked up, the appropriate digit gate cannot be generated. The purpose of the *a* contacts of the relay 854 is to prohibit the creation of the appropriate digit gate until the record card punch has signaled that it is ready to proceed. It will be recalled that the relay 854 is connected between ground and the line G-446 (FIG. 20*c*), and when during a punch cycle the circuit breaker contacts G–Pl (FIG. 20*d*) are closed, the relay 854 (FIG. 20*c*) is energized. The circuit breaker contacts G–Pl are controlled to again close during the latter part of the punch cycle after the card has escaped to the next column, as will be seen by referring to FIG. 56. Thus, after the punch command and after the record card has advanced to the next successive column, the *a* contacts of the relay 854 (FIG. 29) are opened, thereby opening the "and" gate 853 to permit the passage of the pulses which are utilized to create the appropriate digit gates.

The first reference mark after the punch command causes the #7 tap of the trigger 858 to go up, thereby entering the equivalent of 8 clock pulses into the divide-by-75 counter. Further reference marks applied to the #3 tap of the trigger 858 can have no effect unless there has been a punch command to reset the trigger 858 immediately prior thereto. Thus, the locator circuit continues to try to generate the leading edge of the appropriate digit gate until the relay 854 is picked up, and it is not until this time that said gate is created. Each punch command applied o the trigger 858 resets the trigger, and since each said punch command signifies that the information has been entered into magnetic storage, the reference mark next following each punch command will step the locator circuits ahead 8 clock pulses to thereby control the entry of information from the record card into the successively preceding digit locations of the appropriate record, as is desired.

When the record card has been advanced to the 80th column by the punch command generated after the recording of the information from the 79th column in magnetic storage, the #2 program contact G-246 (FIG. 20d) is closed due to the provision of a 2 hole in the 79th column of the program card (see FIG. 55). When the #2 program contacts are closed, +50 volts is connected through a line 893 to the #3 tap of a trigger 894 (FIG. 23*a*). The normal condition of the trigger 894 is such that the #7 tap thereof is low since this trigger is reset by opening the bias supply to the #5 tap thereof. Thus, when the #2 program contacts are closed, the #7 tap of the trigger 894 goes up, thereby opening a gate 895, the #9 tap of which is connected to the #7 tap of the trigger 894. When the gate 895 is open, positive pulses applied to the #6 tap thereof are taken from the #5 tap as negative pulses and are applied to the #6 and #3 taps of the triggers 815 and 818, respectively, the leading, negative-going edge of such pulses being arranged to reverse the condition of stability of these triggers for a purpose to be explained shortly. The #6 tap of the gate 895 is connected to the #6 tap of the inverter 888 (FIG. 23*b*) from which, it will be recalled, punch commands are taken. Thus, when the gate 895 is open, the leading edge of punch commands applied to the #6 tap thereof will reverse the condition of stability of the triggers 815 and 818 and, since the gate 895 is open only when a record card is positioned with the 80th column thereof at the sensing station, only the 80th punch command switches the aforementioned triggers.

It will be recalled that the #7 tap of the trigger 815 goes up when the track-located signal is received, and it will now be clear that it again drops when the 80th column punch command is generated. Thus, the gate 816 is open to permit the passage of reference marks therethrough only from the time that the track-located signal is received from the servo until the 80th column of the card has been read and entered into magnetic storage. The #2 tap of the trigger 818 is caused to go up by the leading edge of the first reference mark after the track-located signal, and since the 80th punch command is arranged to reverse the condition of stability of this trigger, the #2 tap will drop at this time, thereby closing the gate 892 to prevent additional punch commands from going to the trigger 858 (FIG. 29) and also closing the gate 820 (FIG. 23*a*) to prevent additional clock pulses from going to the locator. Additionally, it should be noted that when the #7 tap of the trigger 815 is lowered by the 80th punch command, the #7 tap of the gate 816 is also lowered and the gate 826 is closed to prevent the creation of an appropriate digit gate. Since the punch command associated with the 80th column of the record card is generated by the trailing edge of the appropriate digit gate associated with the 80th column, information stored in the 80th column will have been entered into magnetic storage prior to the closing of the various aforementioned gates. As taught in the aforementioned Patent No. 2,647,581, the 80th punch command causes the card to escape from the sensing station, to then be stored in the hopper, and additionally places the first column of the next record card at the pin sensing station for entry into magnetic storage in a manner similar to that described above. This completes the description of those portions of the circuits utilized for the read-in mode of operation.

In order to read out the information stored in a given record, it will be understood that it is necessary first to control the servomechanism to locate the transducer adjacent the desired portion of the particular disc involved. Next, it is necessary to locate the desired record of the track and to read the information therefrom serially into the shift register. It is then necessary only to convert the information taken from the magnetic discs and stored in the shift register in binary form to the well known IBM code for controlling the record card punch to punch the information into a record card. To read out, the operator must supply cards to the card hopper of the punch and, while the selector switch (FIG. 25) is in the second or normal operation position 602, to release a card for registration at the punch station. The operator next moves the selector switch to the desired one of the three read-out positions 603, 604 or 605 and then keys the address at which the desired information is located into the keyboard.

Information to be punched in a given column of a record card may be taken from any one of three places, i.e., from magnetic storage, from relay storage, or from a preceding card by autoduplication as taught in the Gardinor et al. patent. Under some conditions it may be desired to utilize information taken from all three of these places when puching a card. The #4 through #9 program contacts G-246 have been removed from the circuit as originally drawn in the Gardinor patent and have been arranged as shown in FIG. 25*a*, for controlling, under the direction of the program card, from which of the three sources the information to be punched in the record card is taken. The #4 and #7 program contacts G-246 are associated with the first of the three read-out modes of operation, and when operating in this read-out mode, i.e., with the selector switch in position 603, the arrangement of the punched holes in rows 4 and 7 of the program card controls the source of the information to be punched in the record card.

Referring to FIG. 25*a*, one side of the #4 program contacts G–246 is connected through the n/o *c* contacts of the relay 777 to ground, the other side of these program contacts being connected to the control grid of each of two tubes 901 and 902. Similarly, one side of the #7 program contacts is connected to ground through the *d* contacts of the relay 777, the other side of these program contacts being connected to the control grid of each of two tubes 903 and 904. The three readout positions of the selector switch, i.e., positions 603, 604 and 605 (FIG. 25), determine which one of the three relays 777, 778 or 779 is energized, since these relays are provided in series between their respective selector switch taps and +50 volts. Thus, when the selector switch is in one of the positions 603, 604 or 605, the relay 777, 778 or 779 corresponding thereto is energized.

The tubes 901 through 904 are normally biased at or below cutoff, and when the control grid of one of these tubes is grounded, it will be understood that that tube will conduct. Provided in series with the plates of the tubes 901 through 904 are relays 905 through 908, respectively, and when one of these tubes conducts its corresponding relay is energized. The contacts *a* through *l* (FIG. 20*b*) of the relays 905 and 907 are arranged in series between their corresponding pin contacts and interposer magnets, and when either of these relays 905 or 907 is energized, the circuit between the pin contacts and their associated interposer magnets is opened. Conversely, when both of these relays are deenergized, the circuits between the pin contacts and the interposer magnets are complete and information read by the sense pins is entered into the interposer magnets. This is the case where information to be punched in the record card is taken from a preceding record card by autoduplication.

When the relay 906 is deenergized and the relay 908 is energized, the interposer magnets are connected to the output of the storage relays, as will become clear later. Additionally, as will also become clear later, the interposer magnets are connected to the output of the magnetic storage when the relay 906 is energized and the relay 908 is deenergized. If both these relays are in the same condition, i.e., if both are either energized or deenergized, neither of these sources of information is connected to the interposers. Thus, when the selector switch is in position 603, thereby energizing the relay 777, the *c* and *d* contacts of the relay 777 are transferred and one side of each of the #4 and #7 program contacts is grounded and, depending upon whether or not there are 4 punches, 7 punches, neither, or both in a given column of the program card, predetermined combinations of the various relays 905 through 908 are energized during that column. If there is a 4 punch only in a column, the relays 905 and 906 are picked up and the interposers are connected to the output of the magnetic storage. A 7 punch only results in the connection of the interposer magnets to the output of the relay storage, due to the energization of the relays 907 and 908; a 4 and 7 punch results in the interposer magnets being disconnected, thereby preventing information from being entered therein; and neither a 4 nor a 7 punch results in connecting the sense pins directly to the interposers for autoduplication.

It will now be understood that the 4 and 7 rows of the program card may be prepunched to control the source of information to be punched in the various columns thereof, and in a similar manner rows 5 and 8 and rows 6 and 9 may be prepunched with different programs to permit a selection of the desired one of the three programs by means of the selector switch. (See FIG. 55 for three exemplary programs.) Throughout the description of the read-out mode of operation, it will be assumed that the selector switch is in position 603, thereby placing the programming under the control of the 4 and 7 rows of the program card, and that there are 7 punches in the first 5 columns of the programs card, as shown in FIG. 55, thereby connecting the output of the relay storage to the interposer magnets during the first 5 columns. Additionally, it will be assumed that there are 4 punches in columns 6 through 80 of the program card, thereby connecting the output of the magnetic storage to the interposer magnets during the last 75 columns. When the selector switch is in one of the positions 603, 604 or 605, the corresponding one of the three relays 777, 778 or 779 is energized. Depending upon which readout mode is being utilized, the *a* contacts of one of the relays 777, 778 or 779 will be closed and the relay 775 is energized. This relay remains energized as long as the selector switch is at any one of the positions 603, 604 or 605.

Referring to FIG. 20*a*, it will be seen that each of the bail contacts G–3881–0 to –9 inclusive is connected through a group of lines designated generally as 917 to one side of the n/o contacts *b* through *k* (FIG. 21) of the relay 775, respectively, the other side of these contacts being connected to one side of the n/o contacts *c'* through *l'* of the relay 612. The other side of the contacts 612 *c'* through *l'* is connected to the #7 tap of each of the ten aforementioned thyratrons 613 through 622. Thus, it will be seen that during the first 5 columns of the card, the 0 through 9 bail contacts are connected to the #7 taps of the thyratrons since at this time the relay 612 is energized and the relay 775 is energized. As explained earlier herein, the relay 612 is unlatched at the 5th column, and it is at this time that the bail contacts are disconnected from the #7 taps of the thyratrons.

It was mentioned above that when the card is registered in the punch station, i.e., when the zero column of the card is in the punching position, the operator may key in the address of the information sought. When the first number of the addres is keyed into the keyboard by depressing the proper numeric key, the corresponding bail contacts are closed, which results in the #7 tap of the appropriate thyratron being grounded through the transferred bail contacts, through one of the lines generally indicated as 917, through the n/o contacts *b* through *k* of the relay 611, and through the n/o contacts *c'* through *l'* of the relay 612. Since the circuit breaker contacts 634 are closed prior to the initiation of the punch cycle, the #5 taps of the thyratrons 613 through 622 are connected to +50 volts at this time, and the tryratron corresponding to the depressed key is rendered conductive, thereby energizing the associated relay 623 through 632.

As described previously in connection with the description of the read-in mode of operation, the information entered into the relays 623 through 632 is recoded to binary form and is entered into the appropriate order of the address storage relays upon energization of the relay 642. It will be recalled that relay 642 is picked up when the cams 646 and 648 close their associated circuit breakers, thereby energizing the relay 644 and connecting one side of the step coil 712 and one side of the relay 642 to ground. Since each of the circuit breakers associated with the cams 646 and 648 is open prior to the initiation of the punch cycle, it will be understood that in order to enter the information from the recoding matrix into the address storage relays it is first necessary to energize the punch clutch. Since it is desired, as will be more fully explained later, to enter the complete address prior to its being punched in the card, it is necessary that there be no escapement of the card during the entry of the address and that, therefore, false punch cycles be utilized in this connection.

A group of n/o contacts 623*x* through 632*x* (FIG. 21) of the relays 623 through 632 are connected in parallel between one side of a relay 909 and one side of a current limiting resistor 910, the other side of the relay 909 being grounded and the other side of the resistor 910 being connected to +50 volts. A condenser 911 is connected from the relay contact side of the resistor 910 to ground. Prior to the closing of any of the contacts 623*x* through 632*x*, it will be understood that the condenser 911 charges to +50 volts, and when one of the relays 623 through 632 is energized, as it is when a number of an address is entered via the keyboard, its associated contacts are transferred and the condenser discharges through the relay 909, thereby picking it up. The resistor 910 is sufficiently large normally to prevent the relay being picked up, and it is only during the momentary discharge of the condenser 911 that the contacts of the relay 909 are transferred.

The *a* contacts (FIG. 20*c*) of the relay 909 complete a circuit between ground and one side of the keyboard restore magnet G–352 when the relay 909 is energized, and when the keyboard restore magnet is energized the keyboard is reset for the entry of another digit, as explained in the patent. Thus, when a key is depressed, the associated thyratron is fired, thereby energizing the appropriate relay 623 through 632. As soon as this relay picks up, the relay 909 is momentarily energized, thereby resetting the keyboard.

Referring to FIG. 23*b*, energization of the relay 909 also closes its *b* contacts, and since the relay 775 is always energized on read-out, it will be seen that a circuit is momentarily completed from −100 volts through the transferred *b* contacts of the relay 909 and through the transferred *l* contacts of the relay 775 to the #6 tap of a gate tube 912. The negative impulse applied to the #6 tap of the gate 912 is used to generate a false punch command, as will now be explained.

The #9 tap of the gate 912 is connected to the #8 tap of a single-shot multivibrator 914, which tap is normally high. The #6 tap of the gate 912 is connected through a resistor 915 to +150 volts and, therefore, the #5 tap is normally low. When, however, the negative impulse is applied to the #6 tap of the gate 912, the #5 tap thereof rises sharply. The #5 tap is coupled through a line 916 to the control grid of the tube G–T7 (FIG. 20*d*), thereby permitting that tube to conduct, which results in the energization of the punch clutch magnet G–204 and initiates the false punch cycle.

As explained above, energization of the punch clutch magnet G–204 results in the energization of the coil 712 of the stepping switch and also of the relay 642, due to the operation of the cams 646 and 648 which are under the control of the punch clutch magnet. Assuming that the rotor of the stepping switch is in its primary home position, energization of the relay 642 (FIG. 22*b*) closes its *a* contacts (FIG. 21) and thereby permits energization of the appropriate relays 658 through 662 (FIG. 22*a*) in the record column of the address storage unit. Timing is so arranged that the *a* contacts of the relay 642 are opened prior to the opening of the circuit breaker contacts 645, thereby removing +50 volts from the lines 638 through 641 prior to the deenergization of the coil 712 of the stepping switch. When the circuit breaker contacts 645 are opened, the rotor of the stepping switch is advanced to the second position and is ready to receive the second number of the address for entry thereby into the second column of the address storage relays in a similar manner. Each of the five digits of the address is entered into the address storage relays in a similar manner until all five digits are stored therein.

When the 5th digit of the address has been entered through the keyboard into the address storage relays as described, the rotor 651 (FIG. 22*a*) of the stepping switch is in engagement with row 672 of the stator, i.e., row 6, since it escapes from row 5 to row 6 during the 5th false punch cycle. At this time it is necessary for the operator to depress a button 920 (FIG. 25) which is referred to hereinafter as the "keyboard operate button." Referring to FIG. 25, it will be seen that one side of the keyboard operate button 920 is connected to +50 volts, the other side thereof being connected to one side of the pick coil of a relay 921 and also through several sets of n/c relay contacts to one side of the pick coil of a relay 922 as well as to one side of a relay 918. The other side of each of the relays 921 and 922 is connected to ground. The various aforementioned contacts provided in series with the relay 922 are controlled by various of the address storage relays, and the matrix is so arranged that if an improper address digit is keyed into the keyboard, i.e., numbers are keyed which define a non-existent address, the circuit through the keyboard operate button 920 to the pick coil of the relay 922 is opened. Thus, when the keyboard operate button 920 is actuated, the address being a proper one, the relays 921 and 922 are picked up and latched in this condition, thereby latching their associated contacts in their transferred condition.

When the relay 921 picks up, its *a* contacts (FIG. 22*a*) are transferred and the *e* contact of the rotor 651 is connected therethrough to ground. The *e* contacts of rows 672 through 676 of the stator are common and are connected through the line 782 and through the interrupter contacts 783 (FIG. 22*b*) of the stepping switch to one side of the coil 712 of the stepping switch. It will be understood that when the *e* contact of the rotor is in engagement with the *e* contact of any one of the rows 672 through 676 of the stator, the coil of the stepping switch is energized, thereby opening the interrupter contacts 783 and causing the rotor to advance to the next successive set of contacts. This operation is repeated until the contacts of the rotor are in engagement with row 923 (FIG. 22*a*) of the stator, i.e., in position #11, the "secondary home" position. The *g* contact of the rotor 651 is connected to ground, and the *g* contact of the row 923 of the stator is connected through the n/o *m* contacts of the relay 775 to one side of the pick coil of the relay 649, the other side of the relay 649 being connected to +50 volts. Since the relay 775 is energized during read-out, as explained above, its *m* contacts are closed at this time, and when the rotor of the stepping switch reaches the 11th row of contacts of the stator, the relay 649 is energized due to the grounding of one side thereof through the *g* contact of the rotor.

A condenser 924 (FIG. 23*b*) is connected between −100 volts and the #6 tap of the gate 912 through the n/o *e* contacts of the relay 649 and through the n/o *a* contacts of the relay 922. Since the *a* contacts of the relay 922 are closed when the keyboard operate button 920 is actuated and since the *e* contacts of the relay 649 are transferred when the rotor reaches its secondary home position, i.e., position #11, it will be understood that the short negative pulse resulting from the discharge of the condenser 924 is applied to the #6 tap of the gate 912. As explained above, this results in a false punch command, thereby causing the punch to go through a punch cycle without escapement. The *b* contacts (FIG. 22*b*) of the relay 922 are also opened when that relay is picked up, and this results in preventing this punch cycle from causing the escapement of the rotor of the stepping switch, since the ground circuit of the coil of the stepping switch is opened.

As was mentioned earlier herein, the stator of the stepping switch (FIG. 22*a*) is provided with 20 rows of contacts, each row having 7 contacts, labeled *a* through *g* in the drawing. These contacts are successively engaged by the corresponding contacts *a* through *g* of the rotor. The relays 658 through 709 were previously referred to herein as address storage relays; however, it should be noted that only the relays 658 through 689 are utilized for this purpose, the relays 690 through 709 being utilized for supplementary storage of data entered via the keyboard. It is for this reason that the relays 690 through 709 are referred to as the keyboard storage relays hereinafter. Supplementary information to be punched in a card may be entered via the keyboard into the keyboard storage relays and is entered into the record card under the control of the program card, as will become clear.

The *a*, *b*, *c* and *d* contacts of the last 10 rows of contacts of the stator, i.e., the row 923 and rows 925 through 933, are used for read-out of the information stored in the relays 658 through 709. A relay 936 (FIG. 22*b*) is provided to permit the address stored in the address storage relays 658 through 689 (FIG. 22*a*) to be taken from the contacts of the rows 923 and 925 through 928 or from the contacts of the rows 929 through 933, depending upon whether or not the relay 936 is energized. Similarly, the information stored in the keyboard storage relays 690 through 709 may be taken from the contacts of the rows 929 through 933 or from the contacts of the rows 923 and 925 through 928, depending upon the condition of the relay 936.

One side of each of the n/o *a* contacts (FIG. 22*b*) of the address storage relays 658 through 689 is connected to +50 volts, the other sides thereof being connected through the corresponding n/c contacts *a* through *t* of the relay 936 to the *a*, *b*, *c* and *d* contacts of the rows 929 through 933 of the stator, as indicated in the drawing. The transfer sides of the contacts *a* through *t* of the relay 936 are connected in a like manner to the corresponding *a*, *b*, *c* and *d* contacts of the rows 923 and 925 through 928 of the stator. Thus, when the relay 936 is deenergized and its contacts are in the condition shown, the various contacts of the rows 929 through 933 of the stator are connected through the associated n/o *a* contacts of the address storage relays 658 through 689 to +50 volts. When, however, the contacts of the relay 936 are transferred, the contacts of the rows 923 and 925 through 928 are connected through the associated n/o *a* contacts of the address storage relays 658 through 689 to +50 volts. The relay 936 is connected between +50 volts and one side of a switch 937, the other side of which is grounded, and it will therefore be understood that when the switch 937 is closed, the address information is taken from the rows 923 and 925 through 928 of the stator, the address information being taken from the rows 929 through 933 of the stator when the switch 937 is open.

The various contacts of the keyboard storage relays 690 to 709 inclusive are similarly connected between +50 volts and through the corresponding contacts *a'* to *t'* inclusive of the relay 936 to the *a*, *b*, *c* and *d* contacts of either the rows 923 and 925 through 928 or 929 through 933 of the stator, depending upon the condition of the relay 936. Thus, when the switch 937 is closed, the contacts of rows 923 and 925 to 928 inclusive are connected through the contacts of the address storage relays to +50 volts, the contacts of the rows 929 to 933 inclusive being connected through the contacts of the keyboard storage relays to +50 volts. It should be clear that when the switch 937 is open, the opposite condition exists.

When the relay 649 (FIG. 22*b*) is energized, as it is when the rotor of the stepping switch reaches position #11, i.e., when its contacts are in engagement with the contacts in the row 923 of the stator, the contacts *a* through *d* of the rotor are connected through the transferred contacts *a* to *d* inclusive of the relay 649 to one side of the corresponding one of four relays 940 through 943, respectively, the other side of said relays being grounded. The various contacts of these relays are arranged in a recoding matrix for recoding the binary coded information taken from either the address or keyboard storage relays to the well known IBM code for entry into the interposer magnets G–188 (FIG. 20*b*) of the punch mechanism.

Assuming now that the rotor of the stepping switch is in position #11 and that the switch 937 is closed, +50 volts is connected through the n/o *a* contacts of the address storage relays 658 through 662 to the corresponding coder relays 940 through 943, and those of these relays associated with relays 658 through 662 which are latched down, are picked up, thereby entering the information taken from the relays 658 through 662 into the recoder relays 940 through 943. As the rotor of the stepping switch is advanced to successive positions, successive data from successive orders of the storage relays are entered into the recoder relays 940 through 943 in a similar manner.

The recoder matrix is conventional (FIG. 22*a*) and need not be further described. The output of the recoder is connected through lines 944 to 953 inclusive, through the n/c contacts *a* through *j* (FIG. 28) of the relay 906, through the n/o contacts *c* through *l* of the relay 908, through the n/c contacts *f* through *o* of the relay 608 (FIG. 20*a*) by means of a group of lines designated generally as 954, and through the n/c contacts *c* through *l* (FIG. 20*b*) of the relay 609 to each of the 0 through 9 interposer magnets G–188. Thus, assuming for the moment that a 3 is stored in the first column of the address storage relays, i.e., that the relays 658 and 659 are latched down and, further, that the relay 936 is energized, the *a* contacts of the relays 658 and 659 are both transferred and the relays 940 and 941 are connected across +50 volts, thereby transferring the contacts associated therewith. The armature of the *a* contacts of the relay 940 is connected through the n/o *b* contacts of the relay 642 to ground and, upon energization of the relay 642, as described above, it will be seen that the armature of these *a* contacts is grounded, thereby grounding the line 947. Assuming now that the relay 906 (FIG. 25*a*) is in the condition shown and that the relay 908 is energized, the relays 608 and 609 being deenergized during read-out, one side of the #3 interposer G–188 (FIG. 20*b*) is grounded, thereby entering the 3 into the interposer where it remains until it is punched into the record card during the next following punch cycle.

The above mentioned false punch command that was initiated when the *e* contacts (FIG. 23*b*) of the relay 649 were transferred energized the punch clutch magnet G–204, which resulted in a punch cycle without escapement. It is during this false punch cycle that the relay 642 (FIG. 22*b*) is energized, thereby closing its *b* contacts (FIG. 22*a*) and entering the information from relay storage through the recoder matrix into the interposer magnets. One side of the relay 715 (FIG. 25) is connected to #50 volts, the other side of the relay being connected through the n/o *b* contacts of the relay 922, through the n/c *n* contacts of the relay 611, through the n/o *n* contacts of the relay 612 and through the contacts of the circuit breaker 647 to ground. The circuit breaker 647 is closed by the action of the punch cam 648 during the interval indicated in FIG. 56, since the cam 648 is mounted on and driven by the same shaft that drives the rest of the punch cams. Thus, during the false punch cycle just described, the relay 715 is energized since at this time the *n* contacts of the relay 612 are closed (these contacts are transferred during the first 5 columns) and the *b* contacts of the relay 922 are closed (these contacts are closed when the keyboard operate button 920 is actuated).

It will be recalled that when the relay 715 is energized, the *a* contacts thereof are transferred and the gate 740 (FIG. 23*b*) is opened to permit the passage of reference marks therethrough, which marks are utilized as punch commands, as described previously. Thus, during the false punch cycle initiated when the rotor of the stepping switch is moved to position #11, the cam 648 closes the circuit breaker contacts 647 and, since the relays 612 and 922 are each energized at this time, the relay 715 is picked up, thereby permitting the reference marks to pass through the gate 740. As explained above, each punch cycle causes the rotor to advance to the next column and also causes the card to be advanced to the next column. During each such cycle, the record card is punched with the information taken during the previous cycle from the address storage relays. Also, near the end of each cycle the information stored in the next successive column of the address storage relays is entered into the interposers for punching in the next column of the record card. The relay 612 is unlatched at the 5th column, and it will be understood that the opening of the *p* contacts of the relay 612 closes the gate 740 to prevent further punch commands from this source.

As described previously, the servo is controlled to position the transducers adjacent the track defined by the address when the relay 612 is deenergized, i.e., after the record card has been moved from the 5th column to the 6th column. Also, as described previously, the servo is controlled to place +50 volts on the #6 tap of the trigger 813 (FIG. 23*a*) when it has located the track defined by the address. This signal has been referred to as the track-located signal.

The reference marks are taken from the #7 tap of the gate 740 (FIG. 23*b*) and applied to the #6 tap of the gate 816 and these reference marks pass through the gate 816 to the #6 tap of the trigger 818 as long as the #9 tap of the gate 816 is high. The #9 tap of the gate 816 is high, thereby maintaining said gate open, from the track-located signal until the 80th column signal from the #2 program contacts, as explained in connection with the read-in mode of operation. Thus, the #7 tap of the trigger 818 is controlled to go up by the first reference mark after the track-located signal. This, it will be recalled, opens the gate 820 (FIG. 23*a*) to permit the passage of clock pulses to the locator and additionally opens the gate 892 (FIG. 23*b*) to permit the passage of punch commands therethrough during the period defined by the track-located signal to 80th column signal.

When the gate 820 (FIG. 23*a*) is opened, the clock pulses taken from the line 821 are entered into the first stage of the locator (FIG. 29) and, depending upon the record address entered by the operator, the first pulse taken from the line 856 occurs at the beginning of the last digit position in one of the four records. Assuming that the information sought is stored in the third sector to pass beneath the transducer after the reference mark, i.e., the sector indicated by "1" in the drawing, the relay 661 will have been momentarily energized, thereby rendering the #8 tap of the trigger 851 of the divide-by-4 counter high initially, and after 1800—8 clock pulses, i.e., at the beginning of the last digit of the sector, a pulse taken from the #3 tap of the amplifier 855 is applied through the line 856 to the #3 tap of the trigger 862 (FIG. 23*a*). This creates the leading edge of the appropriate digit gate, the trailing edge being created 8 clock pulses later by the pulse taken from the #4 tap of the amplifier 833 (FIG. 29) and applied to the #6 tap of the trigger 862 (FIG. 23*a*). It will be recalled that the appropriate digit gate raises the #6 tap of the gate 824 and thereby permits the passage of clock pulses through said gate into the shift register.

The read amplifier (FIG. 26) is substantially identical to the clock pulse amplifier described earlier and shown in FIG. 24. The input leads 956 and 957 (FIG. 26) of the read amplifier are connected through the n/c *a* and *b* contacts, respectively of the read-write relay 879 to each side of one or the other of the two data transducers 881 or 882, which one being dependent upon the condition of the odd-even relay 880 as described earlier. Since the read-write relay 879 is deenergized on read-out, the relay 611 being picked up only on read-in, the input to the read amplifier is connected across one of the transducers 881 or 882 determined by the disc address as described before. Thus, the signals detected by the appropriate transducer are amplified by the read amplifier and are taken therefrom through a line 958 as positive pulses.

The line 958 is connected to the #3 tap of a Schmitt trigger 959 (FIGS. 23*a* and 23*b*), and each time the line 958 goes up, as it does when a bit is sensed, the #6 tap of the Schmitt trigger similarly rises sharply and remains up as long as the #3 tap is high. The Schmitt trigger 959 is provided to shape the bit pulses. The #6 tap of the Schmitt trigger is connected to the #9 tap of a gate 960, the output tap #4 of which is connected through an inverter 961 to the #8 tap of another gate 962. The gate 960 is open or closed depending upon whether the #6 tap thereof is high or low. The #6 tap is connected to the #7 tap of a trigger 963 which is high on-read-out during the appropriate digit gate, as will now be explained.

The #5 tap of a trigger 965 is connected during read-out through the n/c *r* contacts of the relay 611 to —100 volts, and under this condition the #7 tap of the trigger 965 is high. It will be recalled that when utilizing the read-in mode of operation the relay 611 is energized, thereby transferring its *r* contacts and connecting —100 volts through the n/o *r* contacts to the #4 tap of the trigger 875. In this way the #7 tap of the trigger 965 is low during read-in. The #7 tap of the trigger 965 is connected to the #9 tap of a gate 966. It will be seen that the #6 tap of the gate 966 is connected to the #3 tap of the amplifier 864, which tap is high for the duration of the appropriate digit gate, thereby raising the #6 tap of the gate 966 for that period. Since the #9 tap of the gate 966 is high during read-out, the #4 tap thereof drops for the duration of the appropriate digit gate. The #4 tap of the gate 966 is connected through an inverter 967 to the #6 tap of the trigger 963. It will be seen that the #6 tap of the trigger 963 thereby drops in potential at the end of the appropriate digit gate.

The #3 tap of the trigger 963 is connected through a line 968 to the #4 tap of the amplifier 799 (FIG. 27) from which, it will be recalled, positive-going shift pulses are taken during the appropriate digit gate. The negative-going edge of the first shift pulse applied to the #3 tap of the trigger 963 (FIG. 23*a*) after the creation of the appropriate digit gate reverses the condition of stability of the trigger 963, thereby raising the potential of the #7 tap thereof. Since the #6 tap of the trigger 963 drops at the end of the appropriate digit gate, the trigger 963 is switched back to its previous condition at this time, thereby again lowering the potential of the #7 tap thereof at the end of the appropriate digit gate. As mentioned above, the #7 tap of the trigger 963 is connected to the #6 tap of the gate 960 (FIG. 23*b*), thereby opening the gate 960 for the duration of the appropriate digit gate to thereby permit the passage of bit pulses therethrough only during this time. It will be understood that the gate 960 is closed during read-in since at this time the *r* contacts (FIG. 23*a*) of the relay 611 are then transferred, thereby maintaining the gate 966 closed to prohibit the passage of the appropriate digit gate therethrough. When reading out, therefore, the bit pulses are applied to the #9 tap of the gate 962 and will pass therethrough only when the #6 tap thereof is high. These pulses are taken from the #4 tap thereof for use as will be described. The gate 962 is controlled by pulses applied to the #6 tap thereof, which pulses are referred to herein as "data strobe pulses."

Since discs are utilized for the magnetic recording media, it will be understood that adjacent bits recorded on an inside track are more closely spaced than are adjacent bits recorded on an outside track. This being the case, it should be clear that there is more "slopover" of the magnetization of recorded bits into adjacent bit positions when recording on the inside tracks. In order to obtain a maximum bit density it is understandable that a rather high level of clipping is necessary. Further, since the slopover into adjacent bit positions on interiorly located tracks may add up to exceed a feasible clipping level in the case of very closely spaced bits, the data strobe pulse has bene provided to gate the bits read from the disc only during periods which coincide very closely with bit positions to thereby permit the positive determination of the presence or absence of a bit in an ordinary bit position by looking only at a narrow portion of each such bit position. Thus, when a signal which occurs during the data strobe pulse exceeds the clipping level, there is assurance that a bit is recorded in that position, and no signal exceeding the clipping level which occurs at a time other than that time which coincides with the bit position can pass through the gate 962.

In the present embodiment the strobe is a 7-microsecond pulse which is arranged to open the gate 962 (FIG. 23*a*) for 3½ microseconds on either side of the point of maximum flux density of a recorded bit. In other words, it is arranged to open the gate 962 for 7 microseconds during the period that the signal from the read amplifier is at its maximum. There is a definite time lag relationship between the clock pulses which define the bit positions and a point of maximum flux density of a recorded bit, the time lag being dependent upon the particular recording apparatus being used.

The #4 tap of the amplifier 810 (FIG. 27) from which the negative-going shift pulses are taken for the duration of the appropriate digit gate is connected to the #7 tap of a single-shot multivibrator 969 (FIG. 23*a*) by a line 970. The single-shot 969 fires on the leading, negative-going edge of each shift pulse applied to the #7 tap thereof, and a negative-going pulse of predetermined duration is taken from the #9 tap and is applied through an inverter 971 to the #7 tap of another single-shot 972, which is similar to the single-shot 969. The single-shot 972 is fired by the negative-going edge of the pulse applied to the #7 tap thereof, and when it fires, the #3 tap drops for the period defined by the time constant thereof. It will be seen that the #3 tap of the single-shot 972 is connected through an inverter 973 to the #6 tap of the gate 962. The period of the single-shot 972 is 7 microseconds, the period of the single-shot 969 being determined by the time necessary to delay the strobe after the shift pulse to permit the strobe to lap only the desired portion of each bit pulse. Each shift pulse, therefore, generates a data strobe pulse which is applied to the #6 tap of the gate 962, thereby opening the gate to permit the passage of bit pulses during the interval defined by this strobe. Thus, 7-microsecond, negative-going bit pulses are taken from the #4 tap of the gate 962.

The #4 tap of the gate 962 is connected through a line 974 to the #3 tap of the trigger 797 (FIG. 27). It will be recalled that the trigger 797 is the first stage of the shift register and, therefore, it will be understood that the bit pulses taken from magnetic storage are entered serially into the shift register, succeeding shift pulses being arranged to shift the bits to successive stages for the duration of the appropriate digit gate. The locator described previously in connection with the read-in mode of operation functions in the same manner as there described to control the creation of the appropriate digit gate one digit earlier each revolution of the disc to thereby permit the successively preceding digits recorded thereon to be read therefrom in that order.

One digit is read into the shift register each revolution, and at the end of the appropriate digit gate the complete digit is stored in the corresponding stages of the shift register. The negative-going edge of the last shift pulse during each appropriate digit gate applied to the triggers 791 through 797 of the shift register shifts the information therefrom and into the triggers 801 through 807. When a bit is present in a trigger 801 through 807, the #7 tap thereof is low, the #7 tap being high in the absence of a bit. The #7 tap of each of the triggers 802 through 806 is connected to the #3 tap of a corresponding "and" gate 979 through 983, the #7 tap of the trigger 801 being connected to the #7 tap of an "and" gate 978. In order for the #7 taps of the "and" gates 979 through 983 to rise, it will be understood that it is necessary that a bit be stored in the corresponding trigger 802 through 806 and that the #8 tap of the associated "and" gate 979 through 983 be low since the #7 taps of these "and" gates cannot rise unless both the #3 and #8 taps are low. Similarly, the #8 tap of the "and" gate 978 cannot rise unless the #3 and #7 taps are both low.

The #7 taps of the "and" gates 979 through 983 are connected to the #7 taps of corresponding thyratrons 984 through 988, respectively, the #8 tap of the "and" gate 978 being connected to the #7 tap of a thyratron 989. The #3 tap of the "and" gate 978 is connected through a line 990 to the #4 tap of the gate 892 (FIG. 23*b*), and the #8 taps of the "and" gates 979 through 983 (FIG. 27) are connected to the #4 tap of the "and" gate 978. The #4 tap of the "and" gate 978 is connected through a resistor (see FIG. 32) to the line 990. It will now be clear that when a bit is present in one of the triggers 801 through 806 the #7 tap of the thyratron associated therewith goes up when the line 990 drops. The potential of the line 990 is controlled by a signal which is called the "read-out command," generated in a manner to be described.

Several recoding relays 991 through 996 are provided in series with the #9 tap of their associated thyratrons 989 and 984 through 988, and when the #7 tap of one or more of the thyratrons goes up, the corresponding relay 991 through 996 is energized, since the #5 taps of the thyratrons are connected by a line 997 through the circuit breaker contacts 634 (FIG. 21) to +50 volts. When the cam 635 controls the circuit breaker contacts 634 to open, as it does during a punch cycle, the thyratrons are extinguished and the corresponding relays deenergized.

The contacts of the relays 991 through 996 (FIG. 27) are disposed in a matrix (FIG. 28) arranged to recode the binary information taken from magnetic storage to the well known IBM code in a well known manner, the 12 output lines 1001 through 1012 of the matrix being connected through the n/o contacts *a'* through *l'* of the relay 906, through the n/c contacts *a* through *l* of the relay 908, through the n/c contacts *d* through *o* (FIG. 20*a*) of the relay 608 and through the n/c contacts *a* through *l* (FIG. 20*b*) of the relay 609 to one side of each of the 12 interposer magnets G–188. The common side of the matrix (FIG. 28) is connected through the n/o *a* contacts of a relay 1013 and through the n/o *d* contacts of the relay 644 to ground, and when, for example, a binary coded 3 is taken from the shift register, the relays 996 and 995 are picked up, and it should be clear that the output line 1006 of the recoding matrix is connected to ground upon energization of the relays 1013 and 644.

It will be recalled that information to be punched in a given column of a record card being processed is entered into the interposer magnets during the punch cycle in which the preceding column is being punched, and since there is no information ready to be entered into the interposer magnets when the 5th column of the card is being punched, the transducer not yet being positioned by the servomechanism to read the 6th column of information from magnetic storage, it is necessary that the above described recoder, comprising the contacts of the relays 991 through 996, be disabled until the information to be entered into the 6th column is in the shift register. This time occurs after the last digit of the address has been read from the address storage relays through the stepping switch into the interposer magnets. The recoder matrix is disabled during the first 5 columns by the provision of the pair of n/o *a* contacts of the relay 1013 provided in series between the common side of the matrix and the *d* contacts of the relay 644

Referring now to FIG. 23*b*, it will be recalled that upon receipt of the first reference mark after the 5th column the #2 tap of the trigger 818 goes up to thereby create a gate from this time until the end of the 80th column, as described previously. The #2 tap of the trigger 818 is connected to the #8 tap of an amplifier 1014, the #4 tap of which is connected through the relay 1013 to +150 volts. When the #2 tap of the trigger 818 goes up, the #8 tap of the amplifier 1014 is raised sufficiently to permit it to conduct, thereby energizing the relay 1013. Thus, the *a* contacts (FIG. 28) of the relay 1013 are transferred for a period of time beginning with the first reference mark after the 5th column until the end of the 80th column, and in this way the zero which is inherently present in the recoder matrix is not entered into the interposer magnets while the 5th column of the record card is being punched with the 5th digit of the address.

As explained earlier herein, bit pulses taken from magnetic storage are entered into the shift register through the line 974 (FIG. 23*a*) connected to the #4 tap of the gate 962. These bit pulses are additionally entered through a line 1015 connected to the #4 tap of the gate 962 into the bit checker trigger 886 (FIG. 23*b*), the line 1015 being connected to the #3 and #6 taps thereof. On read-out the *p* contacts of the relay 611 are closed, the relay 611 being energized only during read-in, thereby connecting the #5 tap of the trigger 886 to −100 volts. The #4 tap of the trigger 886 is connected through a line 1016 to an electronic reset circuit to be described. Thus, when the trigger 886 is reset, as it is each cycle, the #7 tap thereof is initially low, the #2 tap being initially high, and the negative-going edge of each bit pulse applied to the #6 and #3 taps reverses this condition. The potential of the #7 and #2 taps is utilized to control the gate 885 and a gate 1017, the gate 885 being termed the "odd" gate and the gate 1017 the "even" gate.

It will be recalled that each digit entered in the magnetic storage unit is provided with an odd number of bits, a bit being supplied to make the number odd if necessary. If an even number of bits is received for any one digit, it will be understood that there has been an error. Since the #2 tap of the trigger 886 is initially high, it will be understood that an even number of bit pulses applied to the #6 and #3 taps of this trigger will result in the #2 tap being high and, conversely, that the #7 tap will be low at this time. When the #2 tap of the trigger 886 is high, an error has been made and this error is indicated in the following manner. The #2 tap of the trigger 886 is connected to the#9 tap of the gate 1017, the #4 tap of which is connected to one side of a neon bulb 1018, the other side of the bulb 1018 being connected to +150 volts. The #6 tap of the gate 1017 is connected to the #7 tap of the gate 885 which, it will be recalled, is resistance coupled to the #9 tap of said gate. As described earlier herein, punch commands are applied to the #9 tap of the gate 885 and therefore may be taken from the #7 tap thereof at the end of each appropriate digit gate. Each punch command causes the #6 tap of the gate 1017 to go up, and if high, the #4 tap thereof drops, thereby igniting the neon bulb 1018.

In addition to conditioning the ignition of the neon bulb 1018 when there is an error, the bit checker trigger 886 is arranged to close the gate 885, since the #6 tap of the gate 885 is low at this time, and punch commands applied to the #9 tap thereof cannot pass therethrough. This prevents the resetting of the trigger 858 (FIG. 29), which, in turn, prevents the entry of further reference marks into the locator circuits until after the error has been corrected. This permits the incorrect data to be rescanned. Additionally, the failure of a punch command to pass through the gate 885 prevents the occurrence of a punch cycle and thereby prevents escapement of the record card. At the end of the appropriate digit gate the bit checker 886 is reset and the erroneous digit is again scanned, the bits thereof again being entered into the bit checker. If an error is again detected, the procedure above indicated is repeated; however, if the digit is read correctly, the #7 tap of the bit checker trigger 886 goes up, thereby opening the gate 885 to permit the passage of punch commands therethrough as described earlier. It should be noted that an error over-ride switch 1019 is provided in series between the #5 tap of the bit checker trigger 886 and the −100 volt supply, and in the case of a repetitive error the switch 1019 may be opened to permit the machine to go on and read the remainder of the record. Opening the switch 1019 removes the bias from the #5 tap of the trigger 886 and thereby raises the potential of the #7 tap thereof.

Referring now to the trigger 890, it will be seen that on read-out the #4 tap is connected through the closed *q* contacts of the relay 611 to −100 volts. It will be recalled that on read-in the *q* contacts of the relay 611 are open, thereby allowing the #4 tap of the trigger 890 to float and maintaining the #2 tap of said trigger high. When the trigger 890 is reset, as it is at the end of each cycle, and when the relay 611 is not energized, as is the condition on read-out, the #2 tap of the trigger 890 is low. It is not until the trailing, negative-going edge of the first punch command is applied to the #6 tap thereof that the #2 tap rises, thereby opening the gate 889 to permit the passage of punch commands therethrough. When the #2 tap of the trigger 890 goes up, the #7 tap which is initially high goes down. The #7 tap of the trigger 890 is connected to the #3 tape of the single-shot multivibrator 914, and the leading, negative-going edge of the pulse taken from the #7 tap of the trigger 890, which occurs on the trailing edge of the first punch command, causes the #8 tap of the single-shot 914 to drop for a period determined by the circuit constants thereof. The #8 tap of the single-shot 914 is connected to the #9 tap of the gate 912. It will be recalled that the #6 tap of the gate 912 is returned through a resistor to +150 volts, thereby maintaining this gate normally open. Since the #8 tap of the single-shot 914, and thus the #9 tap of the gate 912, is normally high, the #5 tap of the gate 912 is normally low, and the trailing edge of the first punch command causes the #5 tap of the gate 912 to rise sharply.

As mentioned earlier herein, the #5 tap of the gate 912 is coupled to the control grid of the tube G–T7 (FIG. 20*d*), and when the #4 tap goes up a false punch command is generated. The generation of a false punch command at this time is necessary since the *d* contacts (FIG. 28) of the relay 644 are not transferred until the circuit breaker contacts 647 (FIG. 25) are closed by the action of the punch cam 648, which occurs during punch cycles. Thus, the generation of the false punch command results in the energization of the relay 644 and the resultant entry of the information taken from the shift register into the interposer magnets for punching after escapement of the record card to the 6th column.

As noted above, the information stored in the triggers 801 through 806 of the shift register (FIG. 27) is not entered into the relays 991 through 996 until the potential of the line 990 connected to the #3 tap of the "and" gate 978 drops. The line 990 is connected to the #4 tap of the gate 892 (FIG. 23*b*), which gate is open to permit the passage of punch commands therethrough from the first reference mark after the 5th column until the 80th column, as previously described. Thus, the first punch command after the 5th column lowers the potential of the #4 tap of the gate 892 and therefore raises the potential of the #7 taps of the thyratrons 984 through 989 (FIG. 27) corresponding to triggers 801 through 806 in which bits are stored, thereby causing read-out from the shift register of the character stored therein into the recorder relays at this time. Also, at this time the punch command taken from the #6 tap of the inverter 888 (FIG. 23*b*) is passed through the "or" gate 743 and through the amplifier 744 to the control grid of the tube 746, thereby causing said tube to conduct, which results in the energization of the relay 747. When the relay 747 is energized, its *a* contacts (FIG. 20*c*) are closed and the control grid of the tube G–T4 is grounded, thereby rendering it conductive and energizing the escape magnet. When the escape magnet is energized, a punch cycle is initiated and the information which was taken from the shift register and entered into the interposer magnets during the preceding false punch cycle is punched into the 6th column of the card. The next succeeding character is read from magnetic storage and is entered into the shift register during the full punch cycle, and the next punch command applied to the control grid of the tube 746 controls the card to escape one more column and controls the punch to perforate the card in the manner determined by the identity of said character.

Successive digits are entered from magnetic storage into the card in a similar manner.

As described above in connection with the read-in mode of operation, the program card is provided with a 2 hole in the 79th column, and when the 79th column of the card is punched, at which time the information for the 80th column is entered into the shift register, the program contacts relating to the #2 star wheel are closed, thereby raising the potential of the line 893 connected to the #3 tap of the trigger 894 (FIG. 23*a*). When the #3 tap of the trigger 894 goes up, the #7 tap goes up, thereby opening the gate 895, and the next punch command taken from the #6 tap of the inverter 888 causes the #5 tap of the gate 895 to drop.

It will be recalled that the bit checker trigger 886 (FIG. 23*b*) normally maintains the gate 885 closed, and when closed, punch commands cannot pass therethrough. After an odd number of bits in a given character have been sensed, however, the gate 885 is opened. Additionally, when the record card is moved to the position for punching the 80th column thereof, the information for controlling the punch selection having been entered during the previous punch cycle, all information relating to the given address has been taken from magnetic storage. This being true, it is entirely possible that no bit pulses will be applied to the #6 and #3 taps of the bit checker 886 during the 80th column cycle, and the gate 885 will remain closed to prevent the passage of a punch command at this time and will thereby prevent the punch cycle necesary to punch the 80th column of the record card. For this reason a gate 1020 is provided. This gate is arranged in parallel with the gate 885 and the #7 tap thereof is connected to the line 893. Thus, when the #2 program contacts are closed, as they are when the card is moved to the 79th column, the potential of the line 893 is raised and the gate 1020 is opened. At the end of the appropriate digit gate for the 80th column, the punch command created thereby is applied to the #6 tap of the gate 1020, the #6 tap being connected to the #7 tap of the gate 885, and is taken from the #4 tap of the gate 1020 and applied to the #5 tap of the inverter 888. In this way the punch command for the 80th column is applied to the #5 tap of the inverter 888 for use as described earlier herein regardless of the condition of the bit checker trigger 886.

The aforementioned electronic reset circuit (FIG. 23*b*) which is provided for resetting the bit checker trigger 886 comprises an inverter 1022, the #5 tap of which is connected to the #7 tap of the single-shot 884 which generated the punch commands. The inverter 1022 is shown in detail in FIG. 45, and the #7 tap thereof is connected to the #5 tap of a similar inverter 1023, the #7 tap of the inverter 1023 being connected to the #3 tap of a single-shot multivibrator 1024 (see FIG. 38) arranged to generate a positive, 120-microsecond pulse when the #3 tap thereof drops. The #3 tap of the single-shot 1024 drops for 20 milliseconds at the end of each punch command since it is at this time that the #5 tap of the inverter 1022 drops, and a positive, 120-microsecond pulse taken from the #7 tap of the single-shot 1024 is applied to the #6 tap of an inverter 1025 (see FIG. 35). When this occurs, a negative-going, 120-microsecond pulse is taken from the #8 tap of the inverter 1025 and is applied to the #6 tap of a power tube 1026. The power tube 1026 is shown in detail in FIG. 42, and it is so biased that it normally conducts.

The reset line 1016, which is connected between the #4 tap of the bit checker trigger 886 and the #4 tap of the power tube 1026, is normally at −100 volts, and when a reset pulse is generated by the single-shot 1024, the power tube 1026 is cut off and the line 1016 is raised to ground potential, the negative-going, 120-microsecond pulse applied to the #6 tap of the power tube 1026 being arranged to cut it off. A regulator tube 1027 (shown in detail in FIG. 39) is provided to maintain the potential of the reset line 1016 at −100 volts in the absence of a reset pulse, the #8 tap thereof being connected through the arm of a potentiometer 1028 to the #3 tap of the power tube 1026 and the #4 tap thereof being connected to the #6 tap of the power tube. The potentiometer is adjusted to place the potential of the line 1016 at −100 volts under normal operating conditions, and it will be understood that if this voltage increases, i.e., becames less negative, the #8 tap of the regulator tube will become less negative, thereby raising the potential of the #4 tap of the regulator tube 1027. When the #4 tap goes up, the #6 tap of the power tube goes up, thereby lowering the #3 tap thereof and accordingly lowering the potential on the reset line 1016. It will be seen that should the reset line 1016 go down, the #6 tap of the power tube 1026 goes down in a similar manner, thereby maintaining the reset line 1016 at the desired potential of −100 volts. Thus, the trailing edge of each punch command generated by the single-shot 884 causes the reset line 1016 to rise to ground potential, thereby resetting the bit checker trigger 886 in the desired manner at this time.

The bit checker trigger is also reset whenever the selector switch 600 (FIG. 25) is moved from the off position 601 to any one of the positions 603 through 607 since the armature of the deck **600*b* of the selector switch 600 is connected to −100 volts and each of the positions 603 through 607 of the deck 600*b* of the switch is connected to the #4 tap of the inverter 1023** (FIG. 23*b*) by means of a line 1021. Thus, whenever the machine of the invention is turned on by moving the selector switch to any one of the positions 603 through 607 thereof, the #4 tap of the inverter 1023 drops to −100 volts and a reset pulse is generated to reset the bit checker trigger 886.

After the 80th column is punched with the information taken from magnetic storage as described, a card feed cycle is initiated in the manner taught in the aforementioned Gardinor patent, thereby releasing the punched record card to the sensing station and positioning a fresh card at the punch station. During this card feed cycle the card feed cam 714 (FIG. 22*a*) is arranged to close the circuit breaker contacts 713 to thereby place +50 volts on one side of the relay 741, thereby latching the contacts of said relay in their transferred condition. In addition to energizing the relay 741, the closing of the circuit breaker contacts 713 energizes the latch winding 649L of the relay 649, thereby releasing its contacts *a* through *d* to assume their normal position as shown in the drawing. The latch windings of the relays 658 through 709 are represented by the numeral 711L and are connected between ground and one side of an n/c switch 1030, the other side of which is connected through the circuit breaker contacts 713 to +50 volts, and when these contacts are closed as above described, the relays 658 through 709 are unlatched unless the switch 1030 is open. The switch 1030 is provided to prevent the unlatching of the relays 658 through 709 if it is desired to maintain that information in the relays for use at another time, since when the switch 1030 is open the circuit breaker contacts 713 cannot energize their associated latch windings. It will be recalled that when the relay 741 is latched down and when the rotor 651 of the stepping switch is in a position other than its primary home position, the rotor is advanced to its primary home position, at which time the latch winding 741L (FIG. 22*b*) of the relay 741 is energized, thereby transferring the contacts associated therewith to their normal position.

As an additional feature of the invention, means have been provided for addressing the machine automatically to thereby permit a sequential scan of the data recorded in magnetic storage. In this way it is possible to control the machine to punch cards for all or any predetermined portion of the magnetically stored records. Referring now to FIG. 22*b*, five relays 1032 through 1036 are connected between a line 1037 and the corresponding *e* contact (FIG.

22*a*) of each of the rows 654, 663, 669, 670 and 671 of the stator of the stepping switch by means of conductors 1039*a* through 1039*e*, the relay 1032 being connected to the *e* contact of the row 654, etc. The line 1037 (FIG. 22*b*) is connected through the n/o *a* contacts of the relay 776 and through the n/c *c* contacts of the relay 642 to +50 volts. It will be recalled that the *e* contact (FIG. 22*a*) of the rotor 651 is connected through the n/o *a* contacts of the relay 921 to ground. The *e* contact of the rotor is additionally connected through the n/o *b* contacts of the relay 776 to ground. Thus, it will be understood that when the relay 776 is picked up, as it is when the selector switch is in position 607, and when the rotor 651 is in one of the first five positions of the stepping switch, the relays 1032 through 1036 corresponding to the particular position of the rotor is picked up.

Referring now to FIG. 53*a*, nine 10-position switches 1040 through 1048 are provided for controlling the sequential scan operation. The settings of the switches 1040 through 1044 determine the initial address of those addresses to be sequentially set up, the switches 1045 through 1048 being provided to determine the final address in a given scan. The machine is arranged to scan records lying in one sector only of the various discs. Only the first four taps of the switch 1044 are utilized, each of these positions defining the corresponding one of the four sectors of the various discs. As noted above, the scan mechanism is arranged to set up addresses sequentially, the switches 1042 and 1043 being utilized to determine the initial disc address and the switches 1040 and 1041 being utilized to determine the initial track address. In a similar manner, the switches 1047 and 1048 determine the final disc address and the switches 1045 and 1046 determine the final track address. Thus, for example, if it is desired to scan all of the No. 2 records lying between disc 22, track 22 and disc 44, track 44, the switch 1044 is set to its 2 position, the switches 1040 through 1043 are set to their 2 position, and the switches 1045 through 1048 are set to position 4, as shown in the drawing.

With the exception of the switch 1044, the switches 1040 through 1048 are arranged in pairs, as indicated in the drawing, and the corresponding contacts 0 through 9 of each pair are arranged in parallel with the associated contacts 0 through 9 of four decade counters 1050 through 1053. Additionally, the 10 contacts of each switch 1040 through 1048 are connected through the n/o contacts *a* through *j* (FIG. 53b) of the associated relay 1032 through 1036 to the #8 taps of the aforementioned thyratrons 613 through 622, respectively, (FIG. 21) by means of a group of lines designated generally by the reference numeral 1049. The armatures 1050*a* through 1053*a* (FIG. 53*a*) of the counters 1050 through 1053 are connected through the n/o *b* contacts of the relay 776 to +50 volts and, therefore, when there contacts are transferred, +50 volts is connected through the armatures of the counters 1050 through 1053 and through the contacts with which they are then in engagement to one side of the corresponding contacts *a* through *j* of the relays 1032 through 1036. Thus, when one of these relays is picked up, +50 volts is applied to the #8 tap of the thyratron 613 through 622 (FIG. 21) corresponding thereto. The thyratrons 613 through 622, it will be recalled, control the relay matrix for recoding the address to binary form for entry into the address storage relays 658 through 689. These thyratrons perform a similar function in connection with the sequential scan operation, each digit of the address supplied by the sequential scan mechanism being recoded by the relay matrix for entry into the address storage relays.

When it is desired to operate the machine utilizing the sequential scan mode of operation, the selector switch 600 (FIG. 25) is placed in the 7th position 607, thereby grounding one side of the relay 780 which results in the energization thereof. When the relay 780 picks up, its *a* contacts are transferred and the relay 776 is energized. The relay 776 remains energized throughout the sequential scan operation. Referring back to FIG. 53*b*, it will be seen that when the *b* contacts of the relay 776 are transferred and when a switch 1054 is closed, which switch is the "on-off" switch for the sequential scan mode of operation, a relay 1055 is picked up. When the relay 1055 picks up, its *a* contacts are transferred, thereby placing 50 volts across a relay 1056 through the circuit defined by the transferred *a* contacts of the relay 1055, the winding of the relay 1056, the n/c *a* contacts of a relay 1057 and through the *a* contacts of one or more of four relays 1058 through 1061 to ground. Energization of the relay 1056 transfers its *a* contacts, thereby completing the circuit from +50 volts through the *a* contacts of the relay 1056, through the winding of the relay 1057 and through n/c *a* contacts of one or more of the relays 1058 through 1061 to ground. When the relay 1057 is energized, the *a* contacts thereof are opened, thereby opening the circuit to the relay 1056 and causing the relay 1056 to drop out. Similarly, when the *a* contacts of the relay 1056 return to their normal position, the relay 1057 drops out. This results in the reenergization of the relay 1056. The relays 1056 and 1057 are picked up and dropped out in this manner until the *a* contacts of each of the relays 1058 through 1061 are opened.

Each time the relay 1056 is energized, its *b* contacts are closed, thereby placing 50 volts on a line 1062 which is connected through the n/c *b* contacts of each of the relays 1058 through 1061 to one side of the winding of the corresponding counter 1050*b* through 1053*b*, the other side of each of these windings being grounded. Thus, each time the relay 1056 picks up, a 50 volt pulse is placed across the windings of the counters 1050 through 1053 corresponding to the *b* contacts of the relays 1058 through 1061 which are not transferred, thereby causing each such counter to advance one step. It will be understood that each of these counters is advanced in this manner until the *b* contacts of the relays 1058 through 1061 corresponding thereto are transferred.

The armatures of the switches 1040 through 1043 (FIG. 53*a*) are connected to one side of the corresponding relays 1058 through 1061 (FIG. 53*b*), the other side of each of these relays being grounded. When the armatures 1050*d* through 1053*a* of the various counters 1050 through 1053 are in a position corresponding to the setting of the associated switch 1040 through 1043, 50 volts is connected across the corresponding relay 1058 through 1061, thereby energizing that relay and transferring its contacts. The relays 1058 through 1061 are of the latch type and their contacts, therefore, are latched in a transferred condition upon energization thereof.

When utilizing the sequential scan mode of operation, each of the switches 1040 through 1043 is set according to the initial address in the series of addresses to be scanned. The switches 1040 and 1041 define the initial track address, the switches 1042 and 1043 define the initial disc address, and the switch 1044 defines the record to be scanned on each of the various discs. In a similar manner each of the switches 1045 through 1048 is set to the last address of the sequence to be scanned, the switches 1045 and 1046 defining the last track and the switches 1047 and 1048 defining the last disc. In accordance with the prior example, let it be assumed that it is desired to scan all of the No. 2 records from disc 22, track 22, to disc 44, track 44. In this case the switches 1040 through 1044 are positioned with their armatures in engagement with the #2 contacts thereof. Assuming that the armatures of the four decade counters 1050 through 1053 are initially in the zero position when the start switch 1054 is closed, it will be understood that the relays 1056 and 1057 are picked up and dropped out, as described above, until the armature of each of the decade counters 1050 through 1053 reaches the #2 position, at which time 50 volts is connected across each of the relays 1058 through 1061, thereby picking up said relays and latching their contacts in their transferred condition. This prevents further energization of the relays 1056 and 1057 and thereby prevents further advancement of the counters 1050 through 1053 in this manner, and at this time it will be understood that there is +50 volts on each of the lines extending from the #2 contacts of the various counters 1050 through 1053.

Assuming that the rotor of the stepping switch is in its primary home position, it will be seen that the relay 1032 (FIG. 22*b*) is then connected between 50 volts and ground, the relay 776 being energized during sequential scan. When the relay 1032 picks up, its contacts *a* through *j* (FIG. 53*b*) are transferred and +50 volts is connected through the line 1064 extending from the #2 contact of the switch 1044 to the #8 tap of the thyratron 614 (FIG. 21), thereby entering a 2 into the address storage relays 658 and 661. (It should be noted at this time that the address provided by the sequential scan apparatus shown in FIG. 53 cannot be punched in the first 5 columns of the card, although it is possible to read the information from relay storage for punching into the card in another group of columns if desired.)

It will be recalled that when one of the recoder relays 623 through 632 (FIG. 21) is energized, the relay 909 is picked up momentarily. Also, when the relay 1055 (FIG. 53*b*) is first energized, its *c* contacts (FIG. 25) are transferred, and since the *n* contacts of the relay 612 are transferred during the first 5 columns, it will be understood that the relay 715 is energized when the circuit breaker contacts 647 are closed by the action of the cam 648. This occurs, it will be recalled, during a punch cycle. As in the case of read-in, a zero punch in the first column of the program card is provided to initiate a false punch cycle, during which the relay 715 is energized and its contacts are latched in their transferred condition. When, during the first 5 columns, the relay 715 is latched down, the gate 740 (FIG. 23*b*) is opened to permit reference marks to pass therethrough. Also, during this false punch cycle the rotor of the stepping switch is advanced to the next successive row in the manner previously described.

The first reference mark to pass through the gate 740 causes a full punch cycle with a corresponding escapement of the record card to the next column. Also, when the rotor of the stepping switch was advanced to the next row of the stator, the relay 1033 (FIG. 22*b*) was picked up and a 2 was entered into relay storage through the thyratrons as described previously. Near the end of each such cycle, the rotor is controlled to advance to the next position where the next column of the address is entered into relay storage. After the fifth digit of the address is entered into relay storage in this manner, the gate 740 is again closed, the relay 612 being unlatched at this time, thereby controlling the servomechanism to locate the record defined by the address. The card is then punched according to the data taken from magnetic storage and when completed, a card feed cycle is initiated as described earlier.

During each card feed cycle the card feed cam 714 (FIG. 22*a*) closes its associated circuit breaker contacts 713, thereby placing 50 volts across a relay 1074. When the relay 1074 is energized, its *a* contacts (FIG. 53*b*) are closed momentarily and 50 volts is applied through the n/c *a* contacts of one or more of four relays 1075 through 1078 to one side of the winding 1050*b* of the decade counter 1050, thereby causing it to advance one digit to thereby set up the address for the next track to be scanned. In the present example, the counter 1050 is advanced from a 2 to a 3, thereby advancing the track address from 22 to 23. It will be understood that during each card feed cycle, i.e., after each card has been punched with the information taken from the record scanned, the decode counter 1050 is advanced one position.

Each time the counter 1050 goes from position 9 to position 0, a carry is entered through a line 1079 and through the n/o *c* contacts of the relays 1060 and 1059 into the next successive counter 1051, thereby advancing it to the next position. Carries from the counters 1051 and 1052 are similarly entered into the next successive counter. The *a* contacts of the relays 1075 through 1078 are arranged in parallel, and when all of these relays have been energized, as is the case when the positions of the armatures of the counters 1050 through 1053 correspond to the setting of the switches 1045 through 1048, the winding of the counter 1050 is disconnected from the 50 volt supply, since the *a* contacts of the relays 1075 through 1078 are latched open. This prevents the entry of additional counts therein. The *b* contacts of the relays 1075 through 1078 are arranged in series between 50 volts and one side of the latch windings of the relays 1058 through 1061 and 1075 through 1078, the other side of these windings being connected to ground. Therefore, when each of the relays 1075 through 1078 has been latched down, the relays 1058 through 1061 and 1075 through 1078 are unlatched. At this time all of the No. 2 records lying between disc 22, track 22, and disc 44, track 44, have been read out and punched into the record cards. The records lying in the other sectors of the various discs may be scanned in a similar manner.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. A magnetic transducer mounting apparatus comprising:
- a pair of rotatably mounted record members each having oppositely disposed recording surfaces thereon;
- means to rotate said record members in spaced apart parallel relation to one another;
- a pair of electromagnetic transducers;
- a gimbal structure mounting said transducers in side by side relationship and permitting each of said transducers to move freely about two perpendicularly disposed pivot points;
- means operatively associated with said gimbal mounting structure for moving said transducers in between adjacent opposite surfaces of said pair of parallel record members; and
- means for moving said last-named means so as to move the transducers in opposite directions and position them into air bearing juxtaposed relation with respective opposite recording surfaces of said parallel record members.

2. A magnetic transducer mounting apparatus comprising:
- a pair of rotatably mounted record members each having recording surfaces thereon;
- means to rotate said record members in spaced apart parallel relation to one another;
- a pair of electromagnetic transducers;
- a gimbal structure mounting said transducers and permitting each of said transducers to move freely about a pivot axis;
- means operatively associated with said gimbal mounting structure for moving said transducers radially of said surfaces of said record members; and
- means for moving said transducers perpendicular to said recording surfaces to position them in air bearing juxtaposed relation with said recording surfaces.

3. In combination, a recording medium adapted for high speed motion;
- a transducer member including a transducer element for recording and/or reproducing information on said recording medium, and a bearing surface;

said transducer member being adapted to float with respect to said recording medium with said transducer element communicating with said recording medium;

said transducer member having leading and trailing edges as defined by the direction of motion of said recording medium; and a gimbal support member for pivotally supporting said transducer member freely on an axis through the leading and trailing edges of said transducer member with said bearing surface adjacent to and spaced from said recording medium.

4. In combination, a recording medium adapted for high speed motion;

a transducer member including a transducer element for recording and/or reproducing information on said recording medium, and a bearing surface;

said transducer member being adapted to float with respect to said recording medium with said transducer element communicating with said recording medium;

said transducer member having leading and trailing edges as defined by the direction of motion on said recording medium;

and a gimbal support member for pivotally supporting said transducer member freely on an axis through the leading and trailing edges of said transducer member with said bearing surface adjacent to and spaced from said recording medium;

said support member further includes a biasing member for urging said transducer toward the recording surface to oppose the force of moving fluid against said bearing surface.

5. A selective storage device for signals, comprising a frame;

a plurality of discs rotatably mounted about an axis in said frame, each of said discs having a signal storing surface adapted to carry a plurality of tracks on at least one face thereof;

a plurality of transducer means in said frame each of which is adapted for sensing, recording and erasing signals on the signal storing surface of a corresponding one of said discs;

a plurality of selector means in said frame operable to selectively move at least one selected one of said transducer means independently of the others in a plane parallel with the signal storing surface of the corresponding disc to align said selected transducer means with a selected track on the corresponding disc;

a plurality of shifting means in said frame operable to selectively move at least one selected one of said tranducer means independently of the others substantially parallel with said axis into and out of operative relationship with the signal storing surface of the corresponding disc;

driving means in said frame for effecting a relative movement about said axis between said plurality of signal storing discs and said plurality of transducer means; and control means operatively connected with each of said transducer means for selectively causing at least one selected one of said transducer means to effect senssing, recording and erasing of signals during a selected phase of said relative movement.

6. In a selective signal storage device, in combination, supporting means;

a plurality of replaceable storage discs each having a magnetic signal storing surface on at least one face thereof, each said surface including a plurality of concentric circular recording tracks;

mounting means removably mounting said plurality of discs about an axis in said supporting means;

driving means coupled to said plurality of discs to rotate them about said axis;

a plurality of magnetic transducing means each of which is mounted to cooperate with a corresponding one of said magnetic signal storing surfaces of said discs;

loading means having a spring constant operable to resiliently maintain each of said transducing means in operative relationship with said corresponding signal storage surface;

accessing means operable to selectively move each said transducing means along a line extending radially of said axis and parallel to said magnetic signal storing surface;

means for supplying a track address signal; and access control means responsive to said track address signal to operate said accessing means to position said magnetic transducing means in cooperative relationship with a selected one of said plurality of recording tracks.

7. A selective storage device for signals comprising, in combination, a frame;

a plurality of replaceable storage discs removably rotatably mounted about an axis in said frame, each of said plurality of discs having a signal storing surface adapted to carry a plurality of concentric tracks on at least one face thereof;

a plurality of transducing means in said frame each of which is adapted for sensing, recording and erasing signals on the signal storing surface of a corresponding one of said discs;

a plurality of selector means in said frame operable to selectively move at least one selected one of said transducing means independently of the others in a plane parallel with the signal storing surface of the corresponding disc to align a selected transducing means with a selected track on a selected signal storing surface of the selected corresponding disc;

a plurality of shifting means in said frame operable to selectively move at least one selected one of said transducing means independently of the others substantially parallel with said axis into and out of operative relationship with the signal storing surface of the selected corresponding disc;

driving means in said frame for effecting a relative movement about said axis between the signal storing surfaces of said plurality of discs and said plurality of transducing means; and control means operatively connected with each of said tranducing means for selectively causing at least one selected one of said transducing means to effect sensing, recording and erasing of signals during a selected phase of said relative movement.

8. In a selective signal storage device, in combination, supporting means;

a plurality of discs each having a magnetic signal storage surface on at least one face thereof, each said surface including a plurality of concentric circular recording tracks;

mounting means mounting said plurality of discs about an axis in said supporting means;

driving means coupled to said plurality of discs to rotate them about said axis;

a plurality of magnetic transducing means each of which is mounted to move in a radial direction of said plurality of discs to cooperate with a corresponding one of said magnetic signal storing surfaces of said discs;

loading means adapted to maintain said magnetic transducing means in said cooperative relationship with said magnetic signal storing surface; and accessing means for selectively moving said magnetic transducing means in said radial direction to selectively position said magnetic transducing means in cooperative relationship with a selected one of said plurality of tracks.

9. In a selective signal storage device, in combination, a frame;

a plurality of storage discs rotatably mounted about an axis in said frame, each of said plurality of discs having a signal storing surface adapted to carry a plurality of tracks on at least one face thereof;

a plurality of arms movably mounted in said frame, each of said arms having an end adapted to move in a radial direction of a corresponding disc in a plane parallel with the signal storing surface of the corresponding disc;

a plurality of transducing means each of which is adapted for sensing, recording and erasing signals on the signal storing surface of a corresponding one of said discs, each of said transducing means being mounted on the end of a corresponding one of said arms;

a plurality of selector means in said frame operable to selectively move at least one selected one of said arms in radial directions of said plurality of discs in planes parallel with the signal storing surfaces of said plurality of discs to align a selected transducing means with a selected track on the signal storing surface of the selected corresponding disc;

driving means in said frame for effecting a relative movement between the signal storing surfaces of said plurality of discs and said plurality of transducing means; and control means operatively connected with each of said transducing means for selectively causing at least one selected one of said transducing means to effect sensing, recording and erasing of signals during a selected phase of said relative movement.

10. Apparatus for positioning a magnetic transducer in cooperative relationship with a selected one of a plurality of uniquely designated concentric circular recording tracks of a magnetic surface of a disc in response to an externally supplied track address signal specifying said selected concentric circular recording track, comprising:

motive means operable to rotate said dis about an axis at a constant speed;

spring loading means operable to resiliently maintain said magnetic transducer in operative relationship with said magnetic surface of said disc;

accessing means operable to selectively move said magnetic transducer along a line extending radially of said axis and parallel to said magnetic signal storing surface; and access control means responsive to said track address signal to operate said accessing means to position said magnetic transducer in cooperative relationship with said selected one of said plurality of concentric circular recording tracks.

11. The apparatus of claim 10 including:

transmission control means operatively connected with said magnetic transducer to cause said magnetic transducer to effect the transducing of information with said selected recording track.

12. The apparatus defined by claim 10 wherein said loading means comprises:

biasing means for resiliently maintaining said magnetic transducer in closely spaced operative relationship with said magnetic surface of said disc; and shifting means for moving said magnetic transducer into and out of said operative relationship with said disc.

13. A selective storage device for signals, comprising:

a frame;

a plurality of discs rotatably mounted about an axis in said frame, each of said discs having a signal storing surface adapted to carry a plurality of concentric circular recording tracks on at least one face thereof;

a plurality of transducer means in said frame each of which is adapted for communicating signals with the signal storing surface of a corresponding one of said discs;

selector means in said frame operable to selectively move at least one of said transducer means in a plane parallel with the signal storing surface of the corresponding disc to align said transducer means with a selected recording track on the corresponding disc;

a plurality of shifting means in said frame operable to move at least one of said transducer means independently of the others substantially parallel with said axis into and out of operative relationship with the signal storing surface of the corresponding disc;

driving means in said frame for effecting a relative movement about said axis between said plurality of signal storing discs and said plurality of transducer means; and control means operatively connected with each of said transducer means for selectively causing at least one selected one of said transducer means to effect communication of signals with the signal storing surface of the corresponding disc during a selected phase of said relative movement.

14. The selective storage device of claim 13 wherein:

said discs have a signal storing surface on each of opposite faces thereof;

said plurality of transducer means are adapted for communicating signals with a corresponding signal storing surface of said discs;

said selector means is operable to selectively move at least one of said transducer means in a plane parallel with the corresponding signal storing surface to align said transducer means with a selected recording track of the corresponding signal storing surface;

said plurality of shifting means is operable to move at least one of said transducer means independently of the others substantially parallel with said axis into and out of operative relationship with the corresponding signal storing surface; and said control means is operatively connected with each of said transducer means for selectively causing at least one selected one of said transducer means to effect communication of signals with the corresponding signal storage surface during a selected phase of said relative movement.

15. A selective storage device for the storage of signals on a plurality of discs, each of said discs having a signal storing surface adapted to carry a plurality of concentric circular recording tracks on at least one face thereof, said device comprising:

a frame;

mounting means for mounting said plurality of discs for rotation about an axis in said frame;

a plurality of transducer means in said frame each of which is adapted for communicating signals with the signal storing surface of a corresponding one of said discs;

selector means in said frame operable to selectively move at least one of said transducer means in a plane parallel with the signal storing surface of the corresponding disc to align said transducer means with a selected recording track on the corresponding disc;

a plurality of shifting means in said frame operable to move at least one of said transducer means substantially parallel with said axis into and out of operative relationship with the signal storing surface of the corresponding disc;

driving means in said frame for effecting a relative movement about said axis between said plurality of signal storing discs and said plurality of transducer means; and control means operatively connected with each of said transducer means for selectively causing at least one selected one of said transducer means to effect communication of signals with the signal storing surface of the corresponding disc during a selected phase of said relative movement.

16. Apparatus for positioning a magnetic transducer in cooperative relationship with a selected one of a plurality of uniquely designated concentric circular recording tracks of a magnetic surface of a disc in response to an externally supplied track address signal specifying said selected concentric circular recording track, comprising:

motive means operable to rotate said disc about an axis at a constant speed;

a magnetic transducer; and spring loading means operable to resiliently maintain said magnetic transducer in operative relationship with said magnetic surface of said disc; and positioning means responsive to said track address signal for selectively positioning said magnetic transducer to the selected said one of said concentric circular recording tracks corresponding to said track address signal by movement along a line extending radially of said axis and parallel to said magnetic surface of said disc.

17. The apparatus defined by claim 16 wherein said loading means comprises:

biasing means for resiliently maintaining said magnetic transducer in operative relationship with said magnetic surface of said disc; and shifting means for moving said magnetic transducer into and out of said operative relationship with said magnetic surface of said disc.

18. The apparatus of claim 17 wherein:

said positioning means additionally includes means for withdrawing said magnetic transducer out of the cylinder defined by the outer periphery of said disc parallel to said axis; and said shifting means, upon said withdrawal, moves said magnetic transducer out of said operative relationship with said magnetic surface of said disc.

19. The apparatus defined by claim 17 wherein:

said positioning means includes a track address storage means for receiving said track address signal and a control means responsive to a signal in said track address storage means for controlling the operation of said positioning means.

20. The apparatus of claim 19 additionally including:

transmission control means operatively connected with said magnetic transducer to cause said magnetic transducer to effect the transducing of information with said recording track.

21. A magnetic disc file comprising in combination:

a magnetic disc having a magnetic signal storage surface on at least one face thereof, each said surface including a plurality of concentric circular recording tracks;

motive means operable to rotate said disc about an axis at a constant speed;

a magnetic transducer;

spring loading means operable to resiliently maintain said magnetic transducer in operative relationship with said magnetic surface of said disc; and positioning means for selectively positioning said magnetic transducer to a selected one of said concentric circular recording tracks uniquely specified by an externally supplied track address signal by movement along a line extending radially of said axis and parallel to said magnetic surface of said disc.

22. The apparatus defined by claim 21 wherein said loading means comprises:

biasing means for maintaining said magnetic transducer in operative relationship with said magnetic surface of said disc; and shifting means for moving said magnetic transducer into and out of said operative relationship with said magnetic surface of said disc.

23. The apparatus defined by claim 22 wherein:

said positioning means includes a track address storage means for receiving said track address signal and a control means responsive to a signal in said track address storage means for controlling the operation of said positioning means.

24. The apparatus of claim 23 additionally including:

transmission control means operatively connected with said magnetic transducer to cause said magnetic transducer to effect the transducing of information with said recording track.

25. The apparatus of claim 22 wherein:

said positioning means additionally includes means for withdrawing said magnetic transducer out of the cylinder defined by the outer periphery of said disc parallel to said axis; and said shifting means, upon said withdrawal, moves said magnetic transducer out of said operative relationship with said magnetic surface of said disc.

References Cited

UNITED STATES PATENTS

| | | | |
|---|---|---|---|
| 2,416,445 | 2/1947 | Jensen | 340—174.1 |
| 2,751,274 | 6/1956 | Andrews | 340—174.1 |
| 2,832,841 | 4/1958 | Eldridge | 340—174.1 |
| 2,811,709 | 10/1957 | Haselton et al. | 340—174.1 |
| 3,119,110 | 1/1964 | Coombs | 340—174.1 |

BERNARD KONICK, Primary Examiner

V. P. CANNEY, Assistant Examiner

UNITED STATES PATENT OFFICE

CERTIFICATE OF CORRECTION

Patent No. 3,503,060 March 24, 1970

William A. Goddard et al.

It is certified that error appears in the above identified patent and that said Letters Patent are hereby corrected as shown below:

Column 1, line 6, after "95030" insert -- assignors to International Business Machines Corporation, New York, N. Y., a corporation of New York --.

Signed and sealed this 25th day of August 1970.

(SEAL)
Attest:

Edward M. Fletcher, Jr.
Attesting Officer

WILLIAM E. SCHUYLER, JR.
Commissioner of Patents